United States Patent
Maeda et al.

(10) Patent No.: US 6,703,953 B2
(45) Date of Patent: *Mar. 9, 2004

(54) SEMICONDUCTOR DEVICE, METHOD OF MANUFACTURING SEMICONDUCTOR DEVICE AND COMMUNICATION METHOD

(75) Inventors: Shigenobu Maeda, Tokyo (JP); Takashi Ipposhi, Tokyo (JP); Hirotada Kuriyama, Tokyo (JP); Hiroki Honda, Tokyo (JP)

(73) Assignee: Renesas Technology Corp., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,721

(22) Filed: Dec. 10, 1999

(65) Prior Publication Data
US 2003/0160715 A1 Aug. 28, 2003

(30) Foreign Application Priority Data
Jun. 24, 1999 (JP) .......................... 11-178173

(51) Int. Cl.[7] .......................... H03M 1/66; H01L 21/336
(52) U.S. Cl. ...................... 341/144; 257/532
(58) Field of Search .................. 341/155; 257/65; 313/309; 349/43

(56) References Cited

U.S. PATENT DOCUMENTS

| | | | | |
|---|---|---|---|---|
| 4,988,891 A | * | 1/1991 | Mashiko .................. 307/201 |
| 5,070,383 A | * | 12/1991 | Sinar et al. .................. 257/537 |
| 5,345,420 A | * | 9/1994 | Yasuda et al. .......... 365/189.01 |
| 5,789,763 A | * | 8/1998 | Kato et al. .................. 257/72 |
| 5,859,443 A | * | 1/1999 | Yamazaki et al. ............ 257/65 |
| 5,956,105 A | * | 9/1999 | Yamazaki et al. ............ 349/43 |
| 6,037,923 A | * | 3/2000 | Suzuki .................. 345/92 |
| 6,052,324 A | * | 4/2000 | Tobita .................. 365/207 |
| 6,072,345 A | * | 6/2000 | Ooishi .................. 327/157 |
| 6,144,144 A | * | 11/2000 | Cleeves et al. .............. 313/309 |
| 6,147,385 A | * | 11/2000 | Kim et al. .................. 257/369 |
| 6,424,562 B1 | * | 7/2002 | Rosner et al. .............. 365/158 |

FOREIGN PATENT DOCUMENTS

| JP | 61-1900 | 1/1986 | .......... H01L/27/10 |
|---|---|---|---|
| JP | 6-326315 | 11/1994 | .......... H01L/29/784 |
| JP | 7-99207 | 4/1995 | .......... H01L/21/336 |
| JP | 8-293611 | 11/1996 | .......... H01L/29/786 |

OTHER PUBLICATIONS

"Nikkei Electronics", No. 736, Feb. 8, 1999, pp. 155–162.
"An Analytical Method of Evaluating Variation of the Threshold Voltage Shift Caused by the Negative–Bias Temperature Stress in Poly–Si TFT's", by S. Maeda, et al., IEEE Transations on Electron Devices, vol. 45, No. 1, Jan. 1998, pp. 165–171.
"Mechanism of Negative–Bias Temperature Instability in Polycrystalline–Silicon Thin Film Transistors", by S. Maeda et al., Journal of Applied Physics, vol. 76, No. 12, Dec. 15, 1994, pp. 8160–8166.
"Spectrum Kakusan Tsushin Gijutu: Saishin Oyo Roport–Shu", by Yasuo Kadokawa, issued by Nihon Gijutsu Keizai Center, Jan. 30, 1987, pp. 3–25.

* cited by examiner

*Primary Examiner*—Peguy JeanPierre
(74) *Attorney, Agent, or Firm*—McDermott, Will & Emery

(57) ABSTRACT

A channel region (2), a source region (3) and a drain region (4) are formed on a polycrystalline semiconductor layer (1). The characteristic of a polycrystalline TFT (101) is dispersed by the amount of crystal grain boundaries (6) contained in the channel region (2). A drain current is reduced as the amount of the crystal grain boundaries (6) contained in the channel region (2) is increased. In order to utilize a code obtained by encoding the electric characteristic of the TFT (101) for identification of a semiconductor chip, a system or the like, the TFT (101) is mounted on the semiconductor chip, the system or the like along with an encoder circuit. Thus, a barrier against illegal use of a user terminal is improved at a low cost.

37 Claims, 55 Drawing Sheets

|     | BL1 | BL2 | BL3 | BL4 |
|-----|-----|-----|-----|-----|
| WL1 | 1   | 1   | 0   | 0   |
| WL2 | 1   | 0   | 1   | 0   |
| WL3 | 0   | 0   | 0   | 1   |
| WL4 | 0   | 1   | 0   | 0   |

F / G. 26

F/G. 31
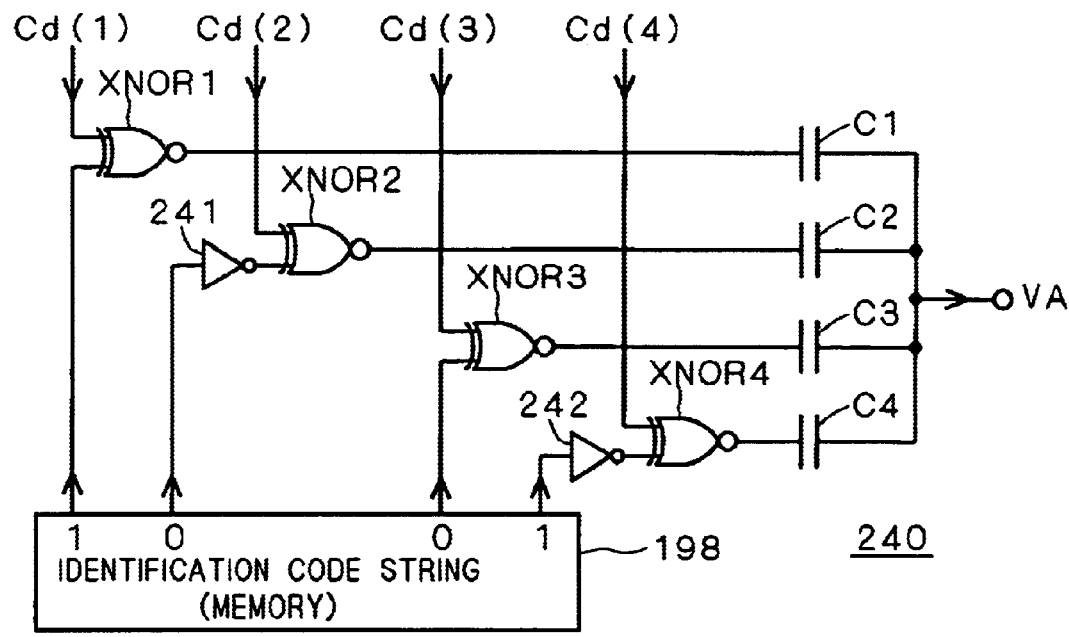
F/G. 32
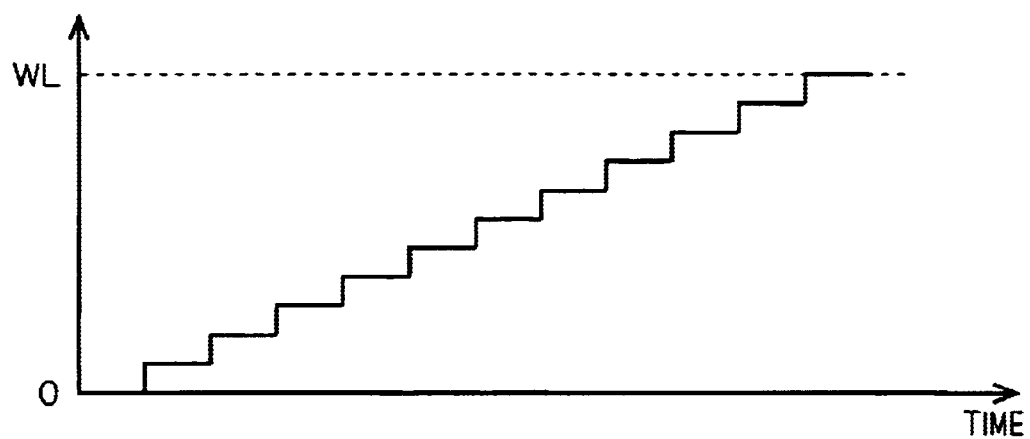

| ACCESS COUNT | TEMPERATURE | VOLTAGE | SHIFT QUANTITY |
|---|---|---|---|
| 1 | 30°C | −1.8 V | −0.001 V |
| 2 | 40°C | −1.8 V | −0.001 V |
| ⋮ | ⋮ | ⋮ | ⋮ |
| n | 80°C | −1.6 V | −0.010 V |
| SHIFT QUANTITY (TOTAL) = −0.02 V | | | |

F I G. 68
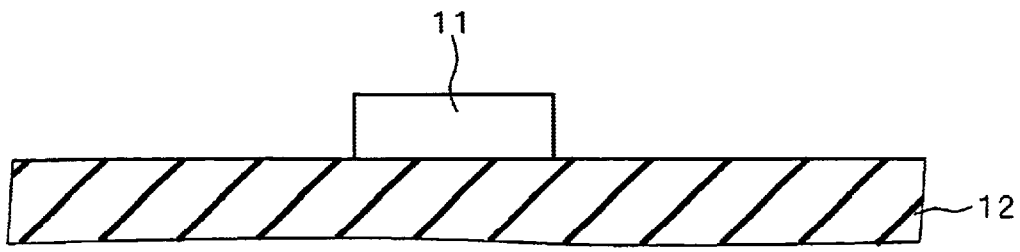
F I G. 69
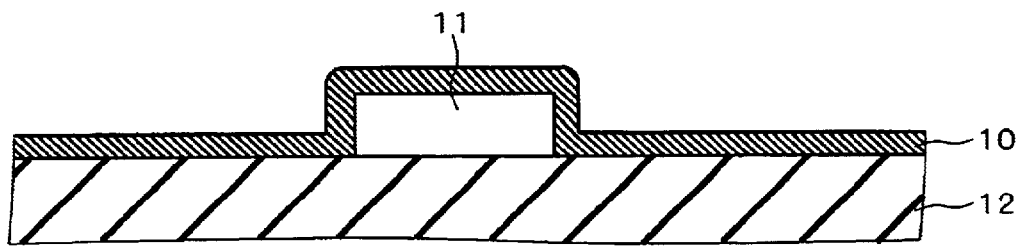
F I G. 70
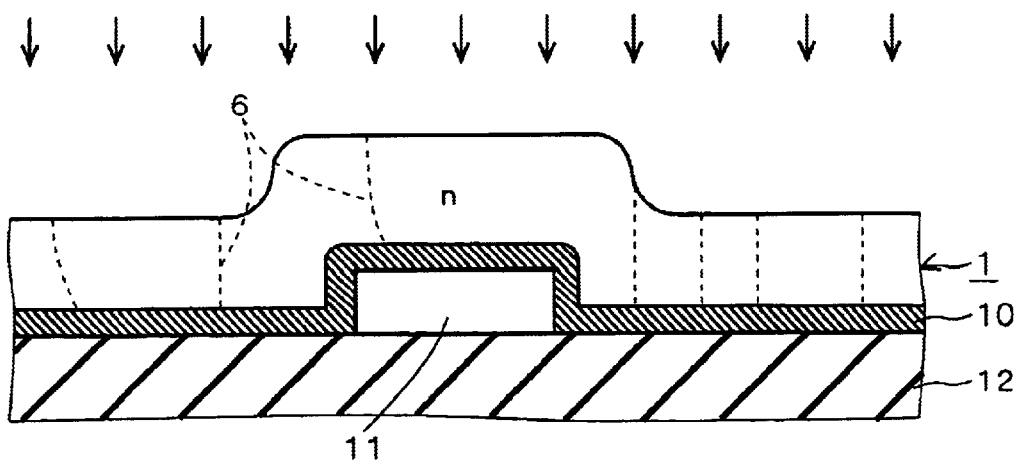

SEMICONDUCTOR DEVICE, METHOD OF MANUFACTURING SEMICONDUCTOR DEVICE AND COMMUNICATION METHOD

BACKGROUND OF THE INVENTION

1. Field of the Invention

The present invention relates to a semiconductor device suitably applicable to a user terminal such as a portable telephone and a method of manufacturing the same as well as a communication method suitable for utilizing the semiconductor device.

2. Description of the Background Art

It is said that illegal use of a user terminal such as a portable telephone, i.e., a criminal act of pretending that one's user terminal belongs to another person in a communication network by changing the identification number or the like to evade paying the communication charges is recently on the increase. While such illegal use must be socially controlled through legal action similarly to other crimes as a matter of course, it is recognized as one of particularly important countermeasures for preventing such a crime to make illegal use technically difficult, i.e., to improve a technical barrier (security) against the illegal use.

FIG. 93 is an explanatory diagram quoted from a report in "Nikkei Electronics" No. 736 dated Feb. 8, 1999, pp. 155 to 162 (hereinafter referred to as literature 1), showing an exemplary countermeasure against illegal use currently carried out in relation to a portable telephone. As described in literature 1, the method shown in FIG. 93 is regarded as providing the highest security among the current countermeasures against illegal use, and utilizes a procedure of "authentication".

In this method, each portable telephone 903 is provided with a serial number (ESN: Electronic Serial Number) for the portable telephone 903, shared secrete data (SSD) shared by the portable telephone 903 and an authentication center 901 of a communications common carrier and a mobile identification number (MIN). The identification number is encoded to a cipher referred to as AUTHREQ on the basis of a CAVE (Cellular Authentication and Voice Encryption) algorithm 904. In this encryption, a random number referred to as RAND output from a mobile exchange center 902 of the communications common carrier is employed.

The communications common carrier decodes the cipher AUTHREQ transmitted from the portable telephone 903 on the basis of the CAVE algorithm 905. The decoded identification number is compared with an identification number including the shared secret data SSD held only by the authentication center 901 so that a determination on authorization or unauthorization of communication is made in response to the result of the comparison. Thus, whether or not the user of the portable telephone 903 is legal is checked, i.e., authenticated on the basis of the shared secret data SSD shared only by the portable telephone 903 and the communications common carrier.

Also for the authentication system shown in FIG. 93 regarded as the strongest countermeasure against illegal use at present, however, it is said that illegal use is now spreading while avoiding the authentication. It is said that the main technical factor resides in that the identification number supplied to the portable telephone 903 is written in a reloadable flash memory (flash ROM), as described in literature 1.

FIG. 94 is a block diagram briefly showing the internal structure of a conventional portable telephone 903. The conventional portable telephone 903 comprises a communication circuit 907 and a flash memory 908. The communication circuit 907 operates in accordance with a program written in the flash memory 908. The flash memory 908 also holds an identification ID, and the communication circuit 907 performs encoding on the basis of the identification number ID read from the flash memory 908 for transmitting a cipher AUTHREQ generated by encoding to the communications common carrier.

The reloadable flash memory 908 is employed as a storage medium since it is necessary to cope with program change by the communications common carrier such as change to a program corresponding to a new communication system, for example. If an unreloadable mask ROM is employed, it is impossible to cope with program change, and the identification number must be recorded with a mask pattern responsive to the identification number varying with each individual in the process of manufacturing the mask ROM, to result in reduction in the manufacturing efficiency and increase in the manufacturing cost.

SUMMARY OF THE INVENTION

According to a first aspect of the present invention, a semiconductor device comprises a semiconductor element having a polycrystal and an encoder circuit converting an electric characteristic of the semiconductor element to a digital signal so that the value is dispersed in derivation from dispersion of the crystal structure of the polycrystal thereby generating and outputting a code.

According to the first aspect, the value of the code is dispersed among individuals, whereby the code can be utilized as an identification code for a system or the like assembled with the device of the present invention. Further, the code is generated by utilizing dispersion of crystal structures of polycrystals manufactured through the same step among the individuals, whereby manufacturing of the device is simplified. In addition, the characteristic of the semiconductor element forming the basis of the code cannot be externally changed and hence the semiconductor device implements a high barrier against illegal change of the code.

According to a second aspect of the present invention, the semiconductor device further comprises a comparator circuit regarding the code output from the encoder circuit as a first code, comparing an externally input second code with the first code, determining agreement or approximation between the codes and outputting a prescribed signal indicating the result of determination.

According to the second aspect, the comparator circuit determines agreement or approximation between the codes, whereby the codes can be utilized for authentication.

According to a third aspect of the present invention, the semiconductor device further comprises a prescribed circuit including a circuit part selectively entering an operating or non-operating state in response to the prescribed signal.

According to the third aspect, the semiconductor device comprises the prescribed circuit including the circuit part selectively entering an operating or non-operating state on the basis of the determination of the comparator circuit, whereby a prescribed operation of a system can be authorized and unauthorized in response to the result of determination of a password or authentication of the code by forming part of a circuit implementing functions of the system by the prescribed circuit and utilizing the code as the password or a code for authentication.

According to a fourth aspect of the present invention, the semiconductor element and the encoder circuit are formed on a single semiconductor substrate.

According to the fourth aspect, the semiconductor element and the encoder circuit are formed on the single semiconductor substrate, whereby not only characteristic data of the semiconductor element is unchangeable but also output of the encoder circuit can be prevented from being changed by external input of a signal in the encoder and hence the barrier against illegal use of the system assembled with the inventive device is further improved.

According to a fifth aspect of the present invention, the encoder circuit includes a conversion circuit converting an electric characteristic of the semiconductor element to a digital signal so that the value is dispersed in derivation from dispersion of the crystal structure of the polycrystal thereby generating a code, and a code memory formed on the single semiconductor substrate for storing the code generated by the conversion circuit in a nonvolatile manner and reading the code thereby outputting the same as the code output from the encoder circuit.

According to the fifth aspect, the semiconductor device comprises the code memory, whereby the code does not fluctuate even if the temperature or the power supply voltage fluctuates but a constant code is stably obtained indefinitely. The code memory is formed on the semiconductor substrate in common with the semiconductor element and the encoder circuit, and hence the code stored in the code memory cannot be illegally rewritten from outside.

According to a sixth aspect of the present invention, the semiconductor device further comprises a comparator circuit formed on the single semiconductor substrate for regarding the code output from the encoder circuit as a first code, comparing an externally input second code with the first code, determining agreement or approximation between the codes and outputting a prescribed signal indicating the result of determination.

According to the sixth aspect, the comparator circuit is also formed on the single semiconductor substrate, whereby a code to be input in the comparator circuit cannot be illegally changed from outside. Thus, the barrier against illegal use is further improved.

According to a seventh aspect of the present invention, the semiconductor device further comprises a prescribed circuit, formed on the single semiconductor substrate, including a circuit part selectively entering an operating or non-operating state in response to the prescribed signal.

According to the seventh aspect, the prescribed circuit is also formed on the single semiconductor substrate, whereby the prescribed signal cannot be externally input. Thus, the barrier against illegal use is further improved.

According to an eighth aspect of the present invention, the semiconductor element includes a MOS transistor, at least a channel region of the MOS transistor is made of a polycrystalline semiconductor serving as the polycrystal, and the channel width and the channel length of the MOS transistor are set in the range of 0.5 to 10 times the mean crystal grain size of the polycrystalline semiconductor.

According to the eighth aspect, the channel width and the channel length of the MOS transistor are optimized with respect to the crystal grain size, whereby dispersion of the code between individuals can be increased.

According to a ninth aspect of the present invention, the semiconductor element includes a MOS transistor, at least a channel region of said MOS transistor is made of a polycrystalline semiconductor serving as the polycrystal, and the comparator circuit includes a sweep circuit sweeping a gate voltage of the MOS transistor, an approximation level calculation circuit calculating an approximation level between the first code output from the encoder circuit and the second code in the process of sweeping the gate voltage, and an evaluation circuit determining whether or not the approximation level calculated by the approximation calculation level circuit exceeds a reference value and outputting a signal indicating the result of determination as the prescribed signal.

According to the ninth aspect, whether or not the approximation level exceeds the reference value is determined in the process of sweeping the gate voltage, whereby approximation and agreement of the codes can be correctly determined while eliminating influence by fluctuation of the temperature and the power supply voltage.

According to a tenth aspect of the present invention, the reference value can be set from outside the semiconductor device.

According to the tenth aspect, the reference value for the determination can be externally set and hence the determination can be made at a proper level in response to difference of importance of authentication or the like.

According to an eleventh aspect of the present invention, the comparator circuit includes a measuring circuit measuring the electric characteristic of the semiconductor element and outputting the measured value as a digital signal, a data memory storing the digital signal, a code supervisory circuit determining whether or not the first code suffers fluctuation on the basis of the digital signal output from the measuring circuit and the digital signal stored in the data memory and updating the digital signal stored in the data memory with the digital signal obtained by new measurement, a code correction circuit outputting the first code while correcting the value of the first code when the code supervisory circuit detects the fluctuation or without correcting the value when no fluctuation is detected, and a determination circuit comparing the code output from the code correction circuit with the second code, determining agreement or approximation between the codes and outputting a signal indicating the result of determination as the prescribed signal.

According to the eleventh aspect, fluctuation of the code is automatically corrected, whereby stable determination can be maintained by canceling influence by fluctuation of the electric characteristic of the semiconductor element derived from −BT stress.

According to a twelfth aspect of the present invention, the code supervisory circuit determines presence/absence of the fluctuation and updates the digital signal stored in the data memory with the digital signal obtained by new measurement only when every digital signal obtained by the measuring circuit through a prescribed number of a plurality of times of measurement is different from the digital signal stored in the data memory.

According to the twelfth aspect, fluctuation of the code is determined only when change of the characteristic is recognized over a plurality of times in measurement of the electric characteristic of the semiconductor element, whereby false determination can be suppressed.

According to a thirteenth aspect of the present invention, the semiconductor element includes a first polycrystalline thin-film transistor, and the semiconductor device further comprises a static RAM, formed on the single semiconductor substrate, having a second polycrystalline thin-film transistor in a memory cell.

According to the thirteenth aspect, the semiconductor element and the encoder circuit are integrated into the SRAM utilized for an extensive system, whereby a function of identification can be added to the extensive system.

Further, the SRAM includes the polycrystalline thin-film transistor, whereby the number of manufacturing steps required for adding a new polycrystalline thin-film transistor for identification and the cost therefor can be saved.

According to a fourteenth aspect of the present invention, the semiconductor device further comprises a CDMA (code division multiple access) code generation circuit generating a CDMA code on the basis of the code output from the encoder circuit, a modulation circuit modulating a transmitted signal on the basis of the CDMA code, and a demodulation circuit demodulating a received signal on the basis of the CDMA code.

According to the fourteenth aspect, codes having low correlation are employed for generating the CDMA code, whereby a communication system having a low crosstalk level similarly to a conventionally known communication system using the CDMA system can be implemented at a low cost.

According to a fifteenth aspect of the present invention, the prescribed circuit is a communication circuit transmitting and receiving a signal to and from an external device, and receiving the second code and transmitting the same to the comparator circuit.

According to the fifteenth aspect, the prescribed circuit is the communication circuit receiving and transmitting the second code to the comparator circuit, whereby the semiconductor device is suitable for application to a communication terminal employing the code for authentication.

According to a sixteenth aspect of the present invention, the semiconductor device further comprises a temperature sensor measuring the temperature of the semiconductor element, and a voltage sensor measuring a power supply voltage applied to the semiconductor element, while the communication circuit transmits temperature data obtained by the temperature sensor through measurement and voltage data obtained by the voltage sensor through measurement.

According to the sixteenth aspect, the communication circuit transmits the temperature data and the voltage data, whereby the semiconductor device is suitable for application to a communication terminal implementing stable authentication while canceling influence by the temperature and the voltage or influence by −BT stress.

According to a seventeenth aspect of the present invention, the semiconductor device further comprises an error operation circuit comparing the electric characteristic of the semiconductor element with characteristic data and calculating an error thereof and an error memory storing the error, and the communication circuit receives the characteristic data and transmitting the same to the error operation circuit while reading and transmitting the error stored in the error memory.

According to the seventeenth aspect, the error is calculated and stored while the stored error is read and transmitted, whereby the semiconductor device is suitable for application to a communication terminal implementing stable authentication while canceling influence by −BT stress.

According to an eighteenth aspect of the present invention, a semiconductor device comprises M ($\geq$2) by N ($\geq$1) MOS transistors arranged in the form of a matrix of M rows and N columns, having at least channel regions of said M by N MOS transistors being made of a polycrystalline semiconductor, a power supply line connected to either source electrodes or drain electrodes of the M by N MOS transistors, M bit lines respectively corresponding to said M rows, each one of said M bit lines being connected in common to the other ones of the source electrodes or the drain electrodes of the N MOS transistors belonging to corresponding one of said M rows, and N word lines respectively corresponding to said N columns, each one of said N word lines being connected in common to gate electrodes of the M transistors belonging to corresponding one of said N columns.

According to the eighteenth aspect, the semiconductor device comprises the plurality of MOS transistors connected to be individually specifiable with the word lines and the bit lines and at least channel regions of the MOS transistors are made of a polycrystalline semiconductor, whereby codes of a plurality of bits dispersed among devices can be readily generated.

According to a nineteenth aspect of the present invention, a semiconductor device comprises M ($\geq$2) by N ($\geq$1) resistive elements arranged in the form of a matrix of M rows and N columns, having resistors made of a polycrystalline semiconductor, M bit lines respectively corresponding to said M rows, each one of said M bit lines being connected in common to first ends of the N resistive elements belonging to corresponding one of said M rows, and N word lines respectively corresponding to said N columns, each one of said N word lines being connected in common to second ends of the M resistive elements belonging to corresponding one of said N columns.

According to the nineteenth aspect, the semiconductor device comprises the plurality of resistive elements connected to be individually specifiable with the word lines and the bit lines and having the resistors made of a polycrystalline semiconductor, whereby codes of a plurality of bits dispersed among devices can be readily generated.

The present invention is also directed to a method of manufacturing a semiconductor device. According to a twentieth aspect of the present invention, a method of manufacturing a semiconductor device comprises steps of (a) depositing an amorphous semiconductor layer on an insulator layer by executing chemical vapor deposition with reactive gas at a first temperature, and (b) converting the amorphous semiconductor layer to a polycrystalline semiconductor layer by performing annealing at a second temperature over a prescribed time, while the type of the reactive gas, the first temperature, the second temperature and the prescribed time are so set that the mean crystal grain size of the polycrystalline semiconductor layer is at least 0.1 $\mu$m.

According to the twentieth aspect, the polycrystalline semiconductor layer is so formed that the mean crystal grain size is at least 0.1 $\mu$m, whereby an element having large dispersion of the electric characteristic can be readily formed with the polycrystalline semiconductor layer.

According to a twenty-first aspect of the present invention, a method of manufacturing a semiconductor device comprises steps of (a) forming an impurity layer on a main surface of a semiconductor substrate by selectively introducing an impurity, (b) forming an insulator layer on the main surface of the semiconductor substrate, (c) depositing a polycrystalline semiconductor layer on the insulator layer, (d) separating the polycrystalline semiconductor layer into a first semiconductor layer and a second semiconductor layer by performing patterning so that the second semiconductor layer covers the impurity layer, (e) selectively forming a channel region, a source region and a drain region of a MOS transistor having the first semiconductor layer as a gate electrode in the main surface of the semiconductor substrate, and (f) selectively forming a channel region opposed to the impurity layer as well as a source region and a drain region holding the channel region therebetween by selectively introducing an impurity into the second semiconductor layer.

According to the twenty-first aspect, the gate electrode of the bulk MOS transistor and the semiconductor layer of the thin-film MOS transistor are formed by patterning the common polycrystalline semiconductor layer, whereby a semiconductor device having two types of MOS transistors formed on a common semiconductor substrate can be manufactured through a small number of steps at a low cost.

According to a twenty-second aspect of the present invention, a method of manufacturing a semiconductor device comprises steps of (a) forming an insulator layer on a main surface of a semiconductor substrate, (b) depositing a polycrystalline semiconductor layer on the insulator layer, (c) separating the polycrystalline semiconductor layer into a first semiconductor layer and a second semiconductor layer by patterning, (d) selectively forming a channel region, a source region and a drain region of a MOS transistor having the first semiconductor layer as a gate electrode in the main surface of the semiconductor substrate, and (e) forming a resistor and an electrode holding the same by selectively introducing an impurity into the second semiconductor layer.

According to the twenty-second aspect, the gate electrode of the bulk MOS transistor and a thin-film resistive element are formed by patterning the common polycrystalline semiconductor layer, whereby a semiconductor device having two types of elements formed on a common semiconductor substrate can be manufactured through a small number of steps at a low cost.

According to a twenty-third aspect of the present invention, a method of manufacturing a semiconductor device comprises steps of (a) selectively implanting a main component element of a semiconductor substrate into a main surface of the semiconductor substrate thereby selectively converting the main surface to an amorphous state, (b) converting the portion converted to the amorphous state to a polycrystalline state by annealing, and (c) forming a single-crystalline semiconductor element and a polycrystalline semiconductor element into the semiconductor substrate by selectively forming impurity regions both in a portion of the semiconductor substrate converted to the polycrystalline state and in a remaining portion.

According to the twenty-third aspect, the portion converted to a polycrystalline state is selectively formed on the main surface of the semiconductor substrate through implantation of the element and annealing so that elements are formed respectively, whereby a semiconductor device having a single-crystalline semiconductor element and a polycrystalline semiconductor element of a bulk type on a common semiconductor substrate is obtained.

According to a twenty-fourth aspect of the present invention, a method of manufacturing a semiconductor device comprises steps of (a) forming an insulator layer on a main surface of a semiconductor substrate, (b) depositing a first polycrystalline semiconductor layer on the insulator layer, (c) separating the first polycrystalline semiconductor layer into a first electrode and a second electrode by patterning, (d) forming a first insulator film and a second insulator film to cover the first electrode and the second electrode respectively, (e) depositing a second polycrystalline semiconductor layer to cover the insulator layer and the insulator films, (f) separating the second polycrystalline semiconductor layer into a third electrode on the insulator layer, a fourth electrode covering the first insulator film and a third polycrystalline semiconductor layer covering the second insulator layer by patterning, (g) selectively forming a channel region, a source region and a drain region of a MOS transistor having the third electrode as a gate electrode in the main surface of the semiconductor substrate, and (h) selectively forming a channel region, a source region and a drain region of a MOS transistor having the second electrode as a gate electrode in the third polycrystalline semiconductor layer by selectively introducing an impurity into the third polycrystalline semiconductor layer.

According to the twenty-fourth aspect, an electrode of a capacitive element and the gate electrode of the thin-film MOS transistor are formed while the gate electrode of the bulk MOS transistor, another electrode of the capacitive element and the semiconductor layer of the thin-film MOS transistor are formed by patterning the common first and second polycrystalline semiconductor layers, whereby a semiconductor device having three types of elements formed on a common semiconductor substrate can be manufactured through a small number of steps at a low cost.

The present invention is also directed to a communication method. According to a twenty-fifth aspect of the present invention, a communication method comprises the steps of (a) communications common carrier equipment storing a code identical to the first code of the semiconductor device according to any of the fifteenth to seventeenth aspects, and (b) the communications common carrier equipment and a communication terminal which has the semiconductor device, making communication with each other after the step (a), while the step (b) includes the steps of (b-1) the communications common carrier equipment transmitting the stored code to the communication terminal as the second code, (b-2) the communication terminal receiving the transmitted second code in the communication circuit, (b-3) the comparator circuit determining the agreement or approximation on the basis of the received second code, and (b-4) the communication circuit stopping communication when neither agreement nor approximation is confirmed in the determination.

According to the twenty-fifth aspect, the communication terminal is authenticated with a code randomized by dispersion of the crystal structure of the polycrystal, whereby a barrier against illegal use can be improved at a low cost.

According to a twenty-sixth aspect of the present invention, a communication method comprises the steps of (a) communications common carrier equipment for storing the first code or the electric characteristic of the semiconductor device according to the sixteenth aspect as a function of temperature of the semiconductor element and power supply voltage for the semiconductor element, and (b) the communications common carrier equipment and a communication terminal which has the semiconductor device, making communication with each other after the step (a), while the step (b) includes the steps of (b-1) the communication terminal transmitting the temperature data and the voltage data, (b-2) the communications common carrier equipment receiving the temperature data and the voltage data, (b-3) the communications common carrier equipment calculating a code under conditions expressed by the temperature data and the voltage data on the basis of the first code or the electric characteristic as the stored function, (b-4) the communications common carrier equipment transmitting the calculated code to the communication terminal as the second code, (b-5) the communication terminal receiving the transmitted second code in the communication circuit, (b-6) the comparator circuit determining the agreement or approximation on the basis of the received second code, and (b-7) the communication circuit stopping communication when neither agreement nor approximation is confirmed in the determination.

According to the twenty-sixth aspect, the codes are generated on the basis of the temperature data and the voltage data so that authentication is performed on the basis thereof, whereby stable authentication can be performed while suppressing influence by fluctuation of the temperature and the power supply voltage.

According to a twenty-seventh aspect of the present invention, a communication method comprises the steps of (a) communications common carrier equipment storing the electric characteristic of the semiconductor device according to the sixteenth aspect as a function of temperature of the semiconductor element and power supply voltage for the semiconductor element, and (b) the communications common carrier equipment and a communication terminal which has the semiconductor device, making communication with each other after the step (a), while the step (b) includes the steps of (b-1) the communication terminal transmitting the temperature data and the voltage data, (b-2) the communications common carrier equipment receiving and storing the temperature data and the voltage data, (b-3) the communications common carrier equipment predicting a shift quantity of the electric characteristic derived from −BT stress on the basis of the electric characteristic as the stored function and previously received temperature data and voltage data, (b-4) calculating a code under conditions expressed by the temperature data and the voltage data received in said step (b-2) in consideration of the shift quantity on the basis of the predicted shift quantity and the temperature data and the voltage data received in the step (b-2), (b-5) the communications common carrier equipment transmitting the calculated code to the communication terminal as the second code, (b-6) the communication terminal receiving the transmitted second code in the communication circuit, (b-7) the comparator circuit determining the agreement or approximation on the basis of the received second code, and (b-8) the communication circuit stopping communication when neither agreement nor approximation is confirmed in the determination.

According to the twenty-seventh aspect, the code is calculated on the basis of previous communication history as well as present temperature data and voltage data and authentication is performed on the basis thereof, whereby stable authentication can be performed while suppressing influence by −BT stress in addition to influence by the temperature and the power supply voltage.

According to a twenty-eighth aspect of the present invention, a communication method comprises the steps of (a) communications common carrier equipment storing the electric characteristic of the semiconductor device according to the seventeenth aspect as a function of temperature of the semiconductor element and power supply voltage for the semiconductor element, and (b) the communications common carrier equipment and a communication terminal which has the semiconductor device, making communication with each other after the step (a), while the step (b) includes the steps of (b-1) the communication terminal transmitting the temperature data, the voltage data and the error in precedent communication, (b-2) the communications common carrier equipment receiving the transmitted temperature data, voltage data and error, (b-3) the communications common carrier equipment calculating the electric characteristic under conditions expressed by the temperature data and the voltage data received in said step(b-2) in consideration of a shift quantity derived from −BT stress on the basis of the electric characteristic as the stored function and the temperature data, the voltage data and the error received in the step (b-2), (b-4) the communications common carrier equipment converting the calculated electric characteristic to a code, (b-5) the communications common carrier equipment transmitting the calculated code to the communication terminal as the second code while transmitting the calculated electric characteristic to the communication terminal as the characteristic data, (b-6) the communication terminal receiving the transmitted second code and the characteristic data in the communication circuit, (b-7) the error operation circuit calculating the error on the basis of the received characteristic data, (b-8) the error memory storing the calculated error, (b-9) the comparator circuit determining the agreement or approximation on the basis of the received second code, and (b-10) communication circuit stopping communication when neither agreement nor approximation is confirmed in the determination.

According to the twenty-eighth aspect, the code is calculated on the basis of the error, the temperature data and the voltage data and authentication is performed on the basis thereof, whereby stable authentication can be performed while suppressing influence by −BT stress in addition to influence by the temperature and the power supply voltage.

According to a twenty-ninth aspect of the present invention, a communication method comprises the steps of (a) communications common carrier equipment storing a code identical to the code output from the encoder circuit of the semiconductor device according to the fourteenth aspect, and (b) the communications common carrier equipment and a communication terminal which has the semiconductor device, making communication with each other after the step (a), while the communication step (b) includes the steps of (b-1) the communication terminal generating the CDMA code on the basis of the code generated by the encoder circuit and modulating a transmitted signal while demodulating a received signal on the basis of the generated CDMA code, and (b-2) the communications common carrier equipment generating a CDMA code identical to the CDMA code of the step (b-1) on the basis of the stored code and modulating a transmitted signal while demodulating a received signal on the basis of the generated CDMA code.

According to the twenty-ninth aspect, codes having low correlation are employed for generating the CDMA code, whereby communication having a low crosstalk level similarly to a conventionally known communication system using the CDMA system is implemented at a low cost.

According to a thirtieth aspect of the present invention, a communication method comprises the steps of: (a) preparing a user terminal comprising: a semiconductor element having a polycrystal; an encoder circuit converting an electric characteristic of said semiconductor element to a digital signal so that the value is dispersed in derivation from dispersion of the crystal structure of said polycrystal thereby generating and outputting a code; and a body part for transmitting and receiving a signal to and from a business connection, and transmitting said code to said business connection, (b) said user terminal transmitting said code said business connection; (c) said business connection recording said code; (d) said user terminal and said business connection making communication for electronic business transaction with each other.

Preferably, the communication method further comprises the steps of: (e) after said step (b) and before said step (d), said business connection determining by use of said code transmitted at said step (b) whether or not an access from said user terminal is illegal use by an unrightful user; and (f) said business connection stopping communication with said user terminal when said access is confirmed illegal at said step (e).

According to the thirtieth aspect, the code generated from the polycrystal is applied to an evidence seal in electronic business transaction, whereby a high barrier is implemented against illegal electronic business transaction by unrightful user terminal.

A thirty-first aspect of the present invention is directed to a semiconductor device. According to the thirty-second aspect, the semiconductor device comprises: a semiconductor substrate having a main surface and a polycrystalline region selectively formed in said main surface with remaining part thereof being single-crystalline; a first semiconductor circuit element having single-crystalline semiconductor portion selectively formed in said main surface other than said polycrystalline region; and a second semiconductor circuit element having polycrystalline semiconductor portion selectively formed in said polycrystalline region of said main surface.

According to the thirty-first aspect, both a semiconductor circuit element having single-crystalline semiconductor portion and a semiconductor circuit element having polycrystalline semiconductor portion are, as bulk type elements, integrated into a common semiconductor substrate.

A thirty-second aspect of the present invention is also directed to a semiconductor device. According to the thirty-third aspect, the semiconductor device comprises: a semiconductor substrate having a main surface; an insulator layer selectively formed on said main surface of said semiconductor substrate; a capacitor having: a first electrode formed of polycrystalline semiconductor and selectively formed on said insulator layer; an insulator film covering said first electrode; and a second electrode formed of polycrystalline semiconductor and facing said first electrode through said insulator film, a first MOS transistor having: a gate electrode formed of polycrystalline semiconductor and selectively formed on said insulator layer; a gate insulator film covering said gate electrode; and a polycrystalline semiconductor layer selectively formed over said insulator layer, said polycrystalline semiconductor layer including a channel region facing said gate electrode through said gate insulator film and source-drain regions interposing said channel region therebetween; and a second MOS transistor having: another gate insulator film selectively formed on said main surface of said semiconductor substrate; another gate electrode formed of polycrystalline semiconductor and formed on said another gate insulator film; another channel region selectively formed in said main surface of said semiconductor substrate facing said another gate electrode through said another gate insulator film; and another source-drain regions selectively formed in said main surface of said semiconductor substrate so as to interpose said another channel region therebetween.

According to the thirty-second aspect, three types of circuit elements integrated into a common semiconductor substrate have portions capable of being formed in the same manufacturing step; therefore, the semiconductor device can be manufactured through a small number of steps at a low cost.

An object of the present invention is to provide a semiconductor device capable of improving security against illegal use of a user terminal or the like without increasing the number of manufacturing steps and the manufacturing cost and a method of manufacturing the same. Another object of the present invention is to provide a communication method suitable for utilizing the semiconductor device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 31 is a circuit diagram of another error calculation circuit according to the seventh embodiment of the present invention;

FIG. 32 is an operation explanatory diagram of a sweep circuit according to an eighth embodiment of the present invention;

FIGS. 68 to 71 are step diagrams of a manufacturing method according to a nineteenth embodiment of the present invention;

DESCRIPTION OF THE PREFERRED EMBODIMENTS

First Embodiment

Figure 1:
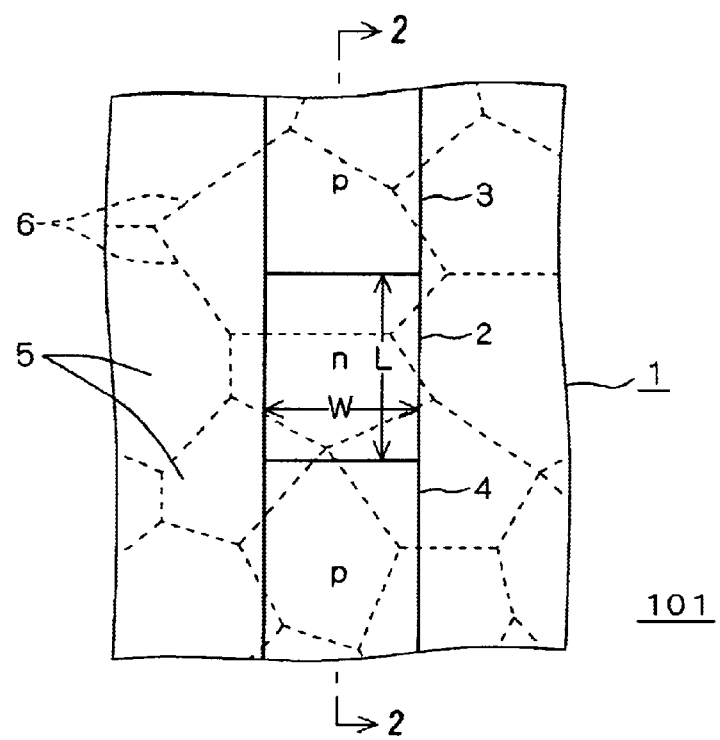
FIG. 1 is a plan view of a TFT included in a semiconductor element according to a first embodiment of the present invention.
Figure 2:
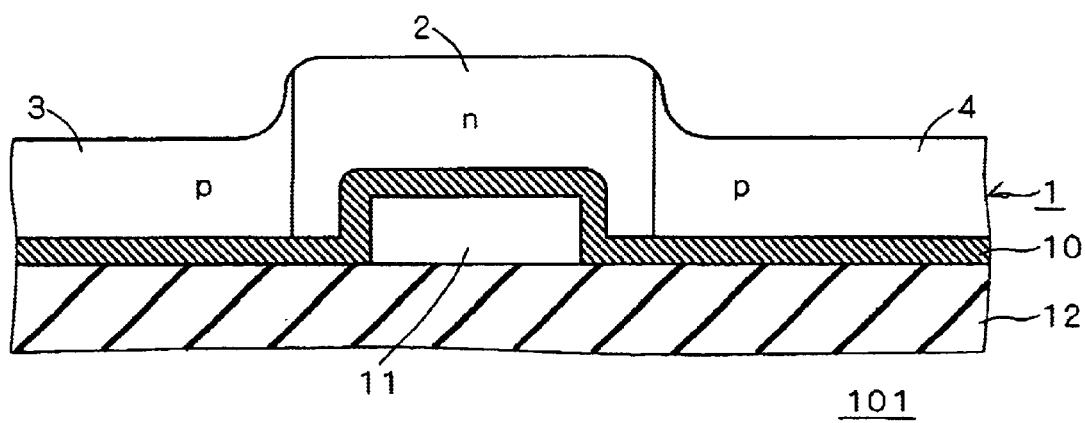
FIG. 2 is a longitudinal sectional view of the TFT shown in FIG. 1.

First, the basic concept of each embodiment of the present invention is described as a first embodiment. FIG. 1 is a plan view showing an exemplary semiconductor element employed in each embodiment. FIG. 2 is a sectional view taken along the line A—A in FIG. 1. This semiconductor element has a thin-film transistor (hereinafter abbreviated as TFT) 101, and a semiconductor layer 1 including its channel region 2 is formed as a polycrystal.

In the TFT 101, a gate electrode 11 is selectively formed on an insulator film 12, while an insulator film 10 covers the overall surfaces of the insulator film 12 and the gate electrode 11. The semiconductor layer 1 is formed on the insulator film 10. For example, the insulator film 12 is made of a silicon oxide, the gate electrode 11 is made of polysilicon doped with an impurity, the insulator film 10 is made of a silicon oxide such as TEOS, and the semiconductor layer 1 is mainly composed of silicon.

The channel region 2 located on the gate electrode 11 as well as a source region 3 and a drain region 4 holding the channel region 2 therebetween are formed in the semiconductor layer 1. Part of the insulator film 10 in contact with the channel region 2 serves as a gate insulator film. In the example shown in FIGS. 1 and 2, the channel region 2 is of an n type and the source and drain regions 3 and 4 are of a p type. In other words, the TFT 101 is formed as a p-channel MOS-TFT, for example. Needless to say, the TFT 101 may alternatively be formed as an n-channel MOS-TFT.

The semiconductor layer 1 is formed as a polycrystalline semiconductor layer containing countless crystal grains 5 and grain boundaries 6 located on the boundary planes therebetween while causing disturbance of crystals. The crystal orientation is uniform in each crystal grain 5, while the crystal orientations are generally different among different crystal grains 5. The sizes and arrangements of the crystal grains 5 are random and variously dispersed in the process of forming the semiconductor layer 1. In other words, the crystal structure of the semiconductor layer 1 varies with each TFT 101 even if a number of such TFTs 101 are manufactured through the same manufacturing steps.

Figure 3:
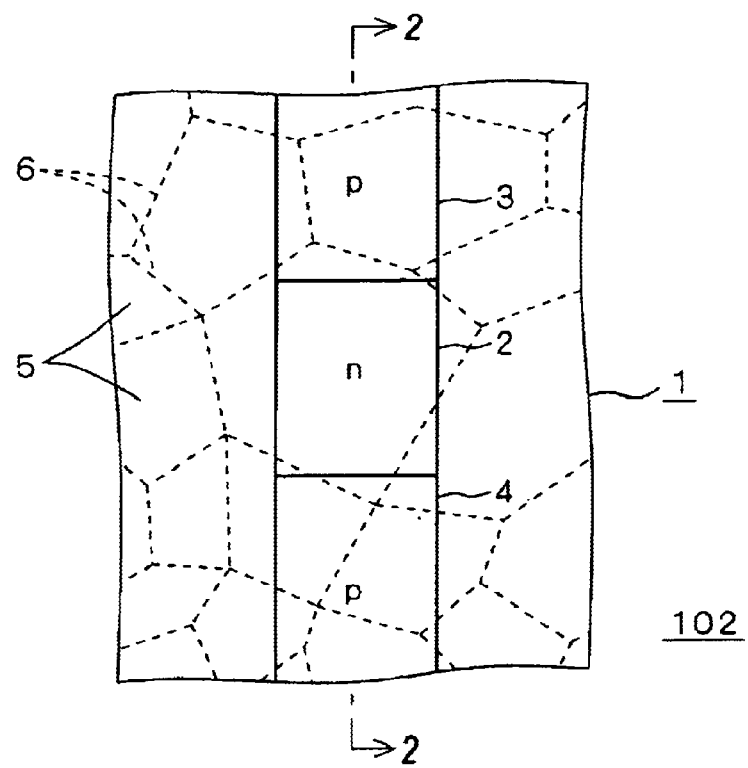
FIG. 3 is a plan view of another individual of the TFT shown in FIG. 1.

Assuming that the TFT 101 expresses an individual and another TFT 102 shown in FIG. 3 produced through the same manufacturing steps is distinguished from the TFT 101, the amounts of the grain boundaries 6 occupying the channel regions 2 are different between the TFTs 101 and 102. Referring to FIG. 3, the TFT 102 contains a smaller amount of grain boundaries 6 in the channel region 2 than the TFT 101.

Figure 4:
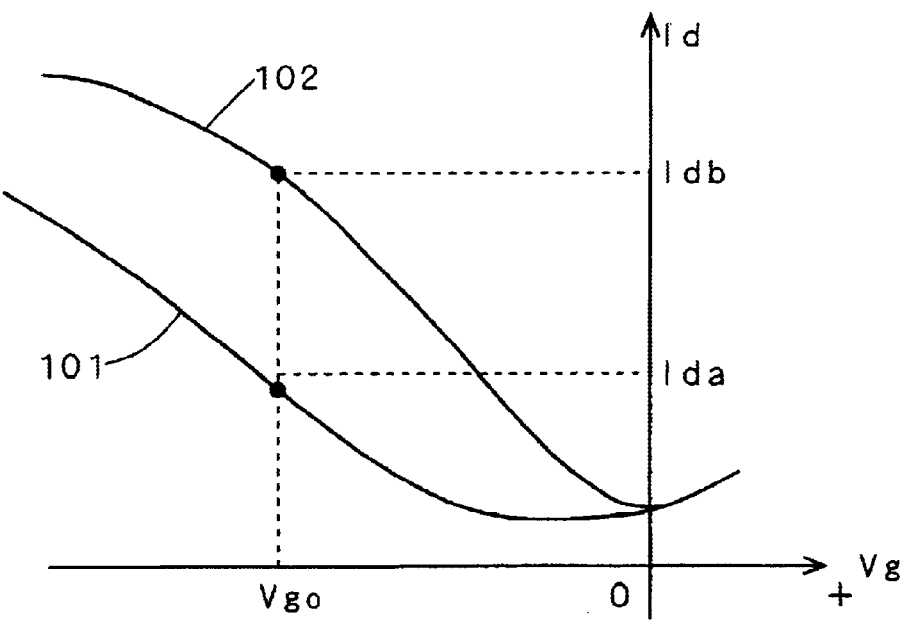
FIG. 4 is a graph showing characteristics of the TFTs shown in FIGS. 1 and 3.

It is known that the characteristics of a polycrystalline TFT vary with the amount of grain boundaries contained in its channel region. This fact is described in IEEE Transactions on Electron Devices, Vol. 45, No. 1, Jan. 1998, pp. 165 to 172 (hereinafter referred to as literature 2), for example. As understood from FIG. 4 showing the relation between gate voltages Vg and drain currents Id in relation to the TFTs 101 and 102, the drain current Id under the same gate voltage Vg0 is smaller in the TFT 101 containing a larger amount of grain boundaries 6 in the channel region 2 as compared with the TFT 102 containing a smaller amount of grain boundaries 6 (i.e., Ida<Idb).

Therefore, dispersion of the characteristics of the TFT 101 can be utilized for identifying a semiconductor chip or the like. According to the present invention, a semiconductor element having a polycrystal illustrated as the TFT 101 is employed for utilizing dispersion of electric characteristics of the semiconductor element derived from dispersion of the crystal structure of the polycrystal for identifying the semiconductor chip or a system. Thus, the present invention can contribute to prevention of illegal use of a user terminal (communication terminal) or the like.

Figure 94:
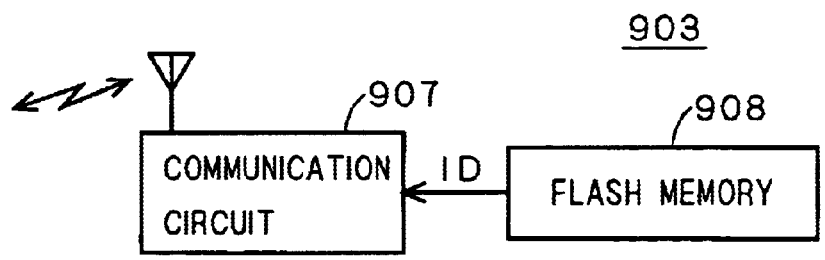
FIG. 94 is a block diagram of a conventional communication terminal.

The electric characteristics varying with the individual, derived from dispersion of the crystal structure of the polycrystal, cannot be externally rewritten dissimilarly to the identification number recorded in the flash memory 908 (FIG. 94). Therefore, security against illegal use of the user terminal or the like can be improved. Dissimilarly to the technique of programming the identification number in the flash memory 908, further, no labor for programming is required. In addition, characteristics varying with individuals can be obtained through the same manufacturing steps dissimilarly to the technique of recording the identification number in a mask ROM, whereby the manufacturing steps are simplified and the number of manufacturing steps as well as the manufacturing cost are reduced.

Only the channel region 2 of the TFT 101 may be made of a polycrystalline semiconductor while the source and drain regions 3 and 4 may be made of single-crystalline semiconductors, although the manufacturing steps are complicated in this case. The characteristics are similarly dispersed at random also in this case.

Figure 5:
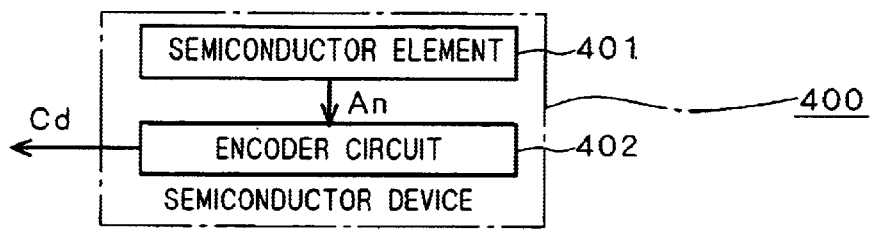
FIG. 5 is a block diagram showing a semiconductor device according to the first embodiment of the present invention.
Figure 6:
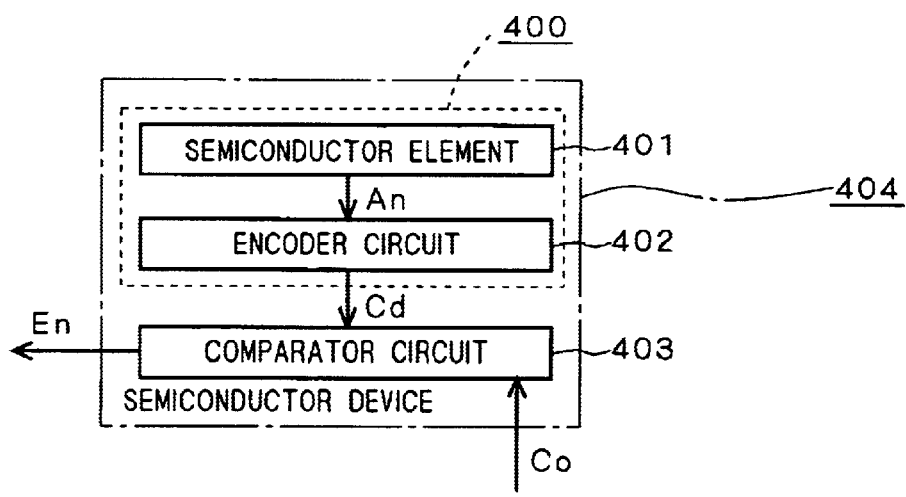
FIG. 6 is a block diagram showing another semiconductor device according to the first embodiment of the present invention.
Figure 7:
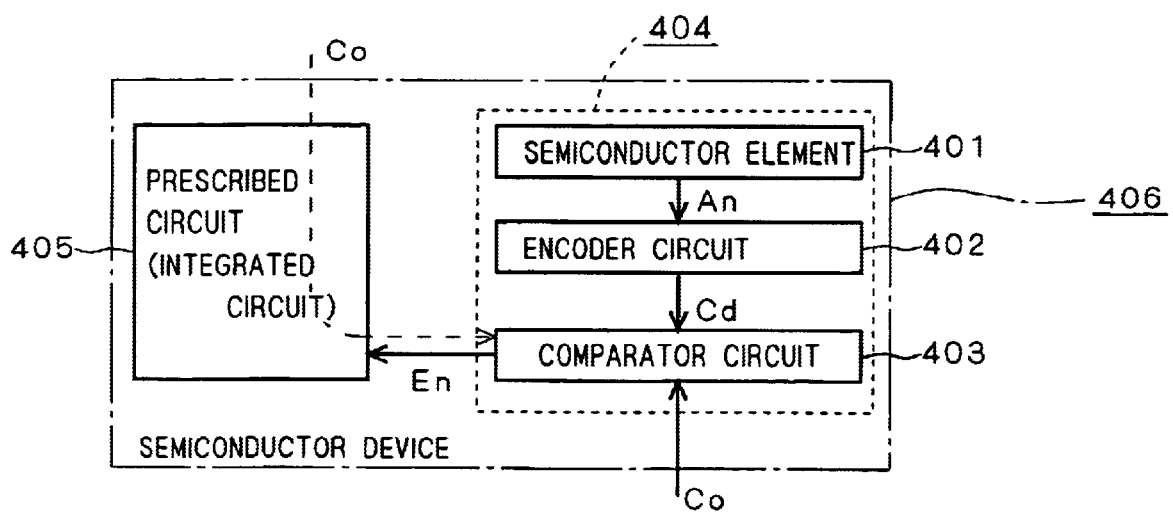
FIG. 7 is a block diagram showing still another semiconductor device according to the first embodiment of the present invention.

FIGS. 5 to 7 are block diagrams showing the structures of semiconductor devices suitable for utilizing the semiconductor element 401 having a polycrystal for authentication. A semiconductor device 400 shown in FIG. 5 comprises an encoder circuit 402 in addition to a semiconductor element 401. The encoder circuit 402 reads a characteristic of the semiconductor element 401 as an analog signal An and converts the signal to a digital signal. The digital signal obtained by conversion is output from the semiconductor device 400 as a code Cd for identification.

Figure 93:
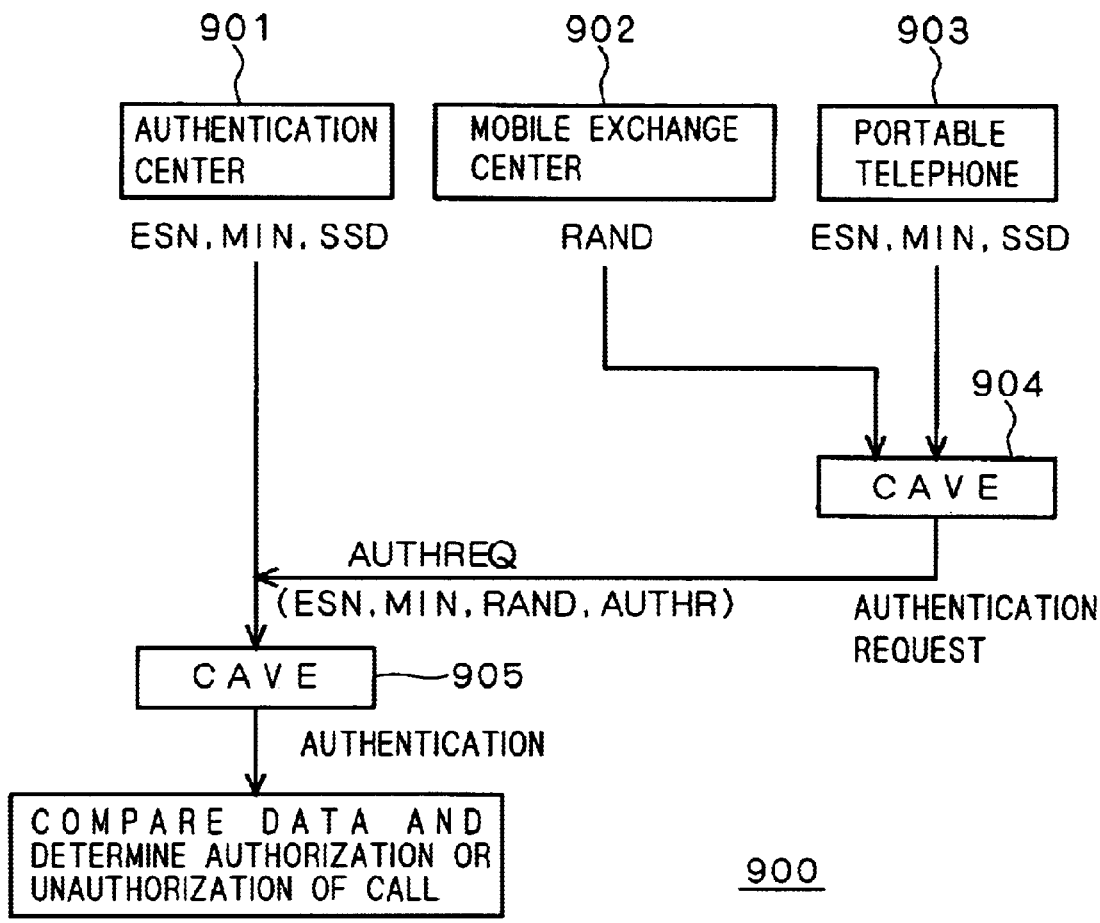
FIG. 93 is a diagram illustrating processing in a conventional communication system.

A system or the like can be identified by providing the semiconductor device 400 in the system and employing the code Cd as an identification code. The analog signal An or the code Cd may be previously read either in the stage of manufacturing the semiconductor device 400 or in a subsequent stage before the system comes into the user's possession, to be known in a limited range such as the authentication center 901 shown in FIG. 93, for example.

Preferably, the semiconductor element 401 and the encoder circuit 402 are formed on a single semiconductor chip (semiconductor substrate). In other words, the semiconductor device 400 is preferably formed as a semiconductor device of a single chip. Thus, not only the characteristic of the semiconductor element 401 is unchangeable but also the code Cd can be prevented from being changed by externally inputting the analog signal An in the encoder circuit 402, for further improving the security.

FIG. 6 shows a semiconductor device 404 comprising a semiconductor element 401 and an encoder circuit 402 as well as a comparator circuit 403. The comparator circuit 403 compares a code Cd output from the encoder circuit 402 with a code Co externally input in the semiconductor device 404, and determines agreement or approximation therebetween. If the codes Cd and Co are determined as agreeing or approximating with each other, a prescribed enable signal En is output from the semiconductor device 404.

A generally known comparator determining whether or not the difference between two codes is zero can attain the determination of agreement. Approximation can be determined by comparing the difference between the codes with a constant reference value. The difference can be evaluated by number of disagreed bits, for example. The semiconductor device 404 may be so formed that the reference value can be externally inputted and the user of the semiconductor device 404 can set the reference value at a desired level.

A system authorizing or unauthorizing operations through authentication of codes can be constructed by providing the semiconductor device 404 in the system. For example, the semiconductor device 404 can be built into the portable telephone 903 used in a communication network employing the authentication system.

The semiconductor device 404 is preferably formed as a semiconductor device of a single chip. Thus, the comparator circuit 403 can be prevented from external input of a code different from the code Cd output from the encoder circuit 402, and the security can be further improved.

FIG. 7 shows a semiconductor device 406 comprising a prescribed circuit 405 in addition to a semiconductor element 401, an encoder circuit 402 and a comparator circuit 403. The prescribed circuit 405, formed by a plurality of circuit elements for satisfying a prescribed function, includes a circuit part selectively entering an operating or non-operating state on the basis of an enable signal En output from the comparator circuit 403. The communication circuit 907 shown in FIG. 94 is an example of the prescribed circuit 405. An externally input code Co is input in the comparator circuit 403 through the prescribed circuit 405 or directly. When formed by the communication circuit 907, the prescribed circuit 405 relays the code Co.

The semiconductor device 406 is preferably formed as a semiconductor device of a single chip. Thus, the prescribed circuit 405 can be prevented from receiving an externally input signal different from the enable signal En output from the comparator circuit 403, and the security can be further improved.

In the following description, more preferred modes are described in relation to the structures of the semiconductor devices shown in FIGS. 5 to 7 or the elements thereof in second to eleventh embodiments of the present invention. Preferable modes of using the semiconductor devices shown in FIGS. 5 to 7 are described with reference to twelfth to eighteenth embodiments of the present invention. Preferable methods of manufacturing the semiconductor elements 401 shown in FIGS. 5 to 7 are described in nineteenth to twenty-fourth embodiments of the present invention.

Second Embodiment

Figures 8, 9:
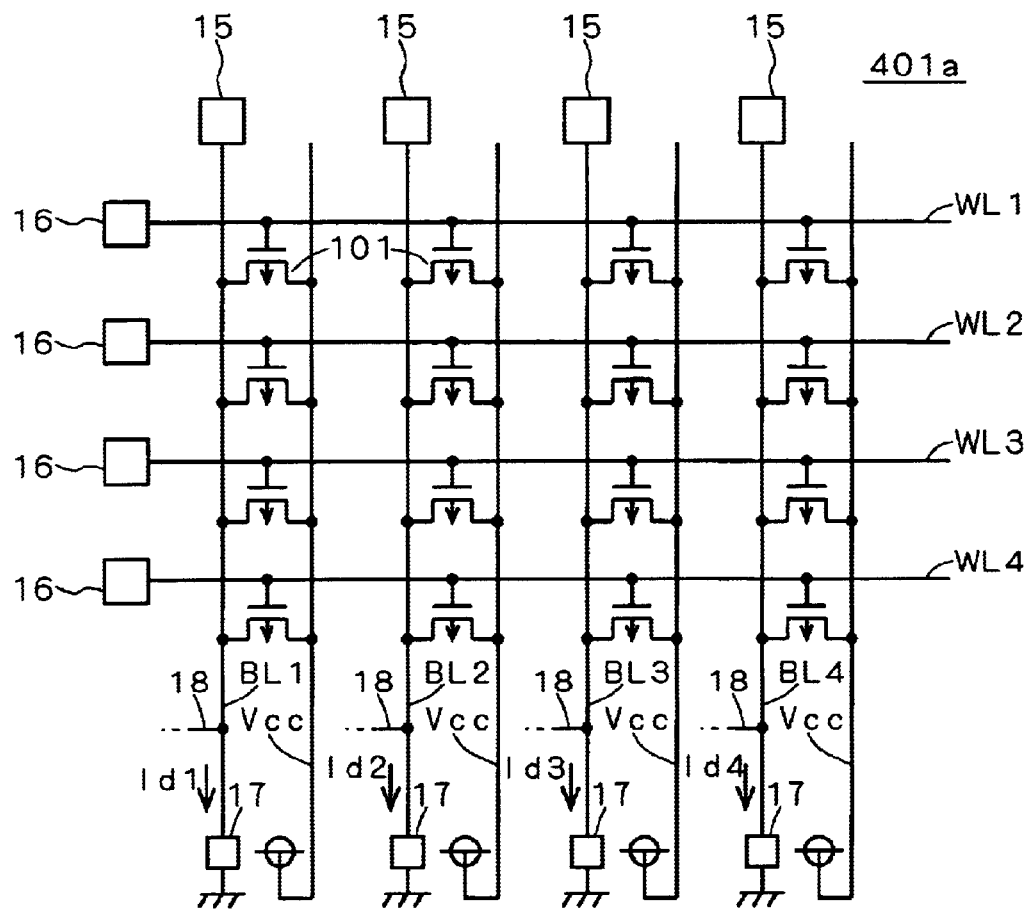
FIG. 8 is a circuit diagram of a semiconductor element according to a second embodiment of the present invention.
FIG. 9 is an explanatory diagram showing operations of the semiconductor element shown in FIG. 8.

The second embodiment is now described with reference to a more preferable mode of the semiconductor device 404 (FIG. 6). FIG. 8 is a circuit diagram showing a preferred example of the semiconductor element 401. This semiconductor element 401a includes a plurality of (in FIG. 8, 4×4=16) TFTs 101 arranged on a substrate in the form of a matrix. On the substrate, a plurality of word lines WL1 to WL4 and a plurality of bit lines BL1 to BL4 are arranged in the transverse and vertical directions respectively.

Gate electrodes of four TFTs 101 transversely aligned with each other in FIG. 8 are connected in common to each of the word lines WL1 to WL4. Drain electrodes of four TFTs 101 vertically aligned with each other in FIG. 8 are connected in common to each of the bit lines BL1 to BL4. Source electrodes of the 16 TFTs 101 are connected in common to a positive power supply line. An end of each of the bit lines BL1 to BL4 is connected to a ground power supply line through a bit line load 17.

A wire 18 for fetching analog signals An is connected to an end of the bit line 17 opposite to the ground line. Further, a pad 15 is connected to the other end of each of the bit lines BL1 to BL4 while a pad 16 is connected to an end of each of the word lines WL1 to WL4.

When a gate voltage of a prescribed level is supplied to one of the word lines WL1 to WL4 in the semiconductor element 401a having the aforementioned structure, drain currents Id1 to Id4 flow in the four TFTs 101 connected with this word line respectively. The drain currents Id1 to Id4 flow through the bit line loads 17 respectively, and hence potentials proportionate to the drain currents Id1 to Id4 are generated on the wires 18 connected with the bit lines BL1 to BL4. The four potentials are output as the analog signals An. 16 Potentials in total can be fetched as the analog signals An by sequentially supplying the gate voltage to the word lines WL1 to WL4.

The encoder circuit 402 encodes the 16 analog signals An, thereby converting the signals to a 16-bit digital signal as illustrated in FIG. 9, for example. FIG. 9 illustrates codes of 16 bits in the form of a matrix, in order to clarify the relation between the TFTs 101 which are the origins of the codes and the bit lines BL1 to BL4 as well as the word lines WL1 to WL4 connected therewith.

Figure 10:
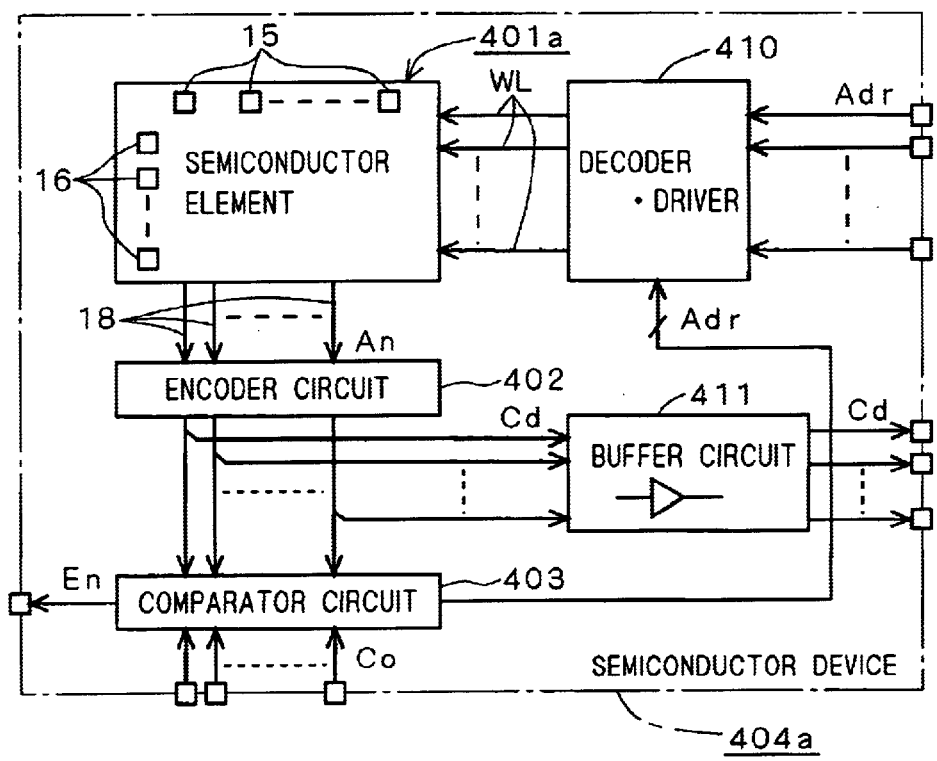
FIG. 10 is a block diagram showing a semiconductor device according to the second embodiment of the present invention.

FIG. 10 is a block diagram showing a preferred configuration of the semiconductor device 404 shown in FIG. 5. This semiconductor device 404a further comprises the semiconductor element 401a shown in FIG. 8, and is formed as a semiconductor device of a single chip. The semiconductor device 404a comprises a decoder-driver 410 driving an arbitrary one of the plurality of word lines WL1 to WL4 provided on the semiconductor element 401a on the basis of address signals Adr. The address signals Adr can be externally input through input terminals.

Codes Cd output from an encoder circuit 402 are not only input in a comparator circuit 403 but also output through a buffer circuit 411. Thus, only persons within a limited range can previously know the codes Cd. Due to the provision of the buffer circuit 411, it is possible to prevent illegal action of externally inputting codes different from the codes Cd output from the encoder circuit 402 in a comparator circuit 403 through output terminals for the codes Cd.

The semiconductor element 401a has pads 15 and 16, and hence analog signals An can be directly read by applying probes to the pads 15 and 16 in the process of manufacturing the semiconductor device 404a. The read analog signals An can be converted to the codes Cd through a unit having the same characteristics as the encoder circuit 402 thereby obtaining the codes Cd. If the codes Cd may not be read outside the factory for manufacturing the semiconductor device 404a, therefore, the input terminals for the address signals Adr, the output terminals for the codes Cd and the buffer circuit 411 may be removed.

When comparing codes Co input through input terminals with the codes Cd, the comparator circuit 403 inputs the address signals Adr in the decoder-driver 410. Thus, the semiconductor element 401a is driven to read the analog signals An, and hence the codes Cd can be compared with the codes Co without externally inputting the address signals Adr.

Figure 11:
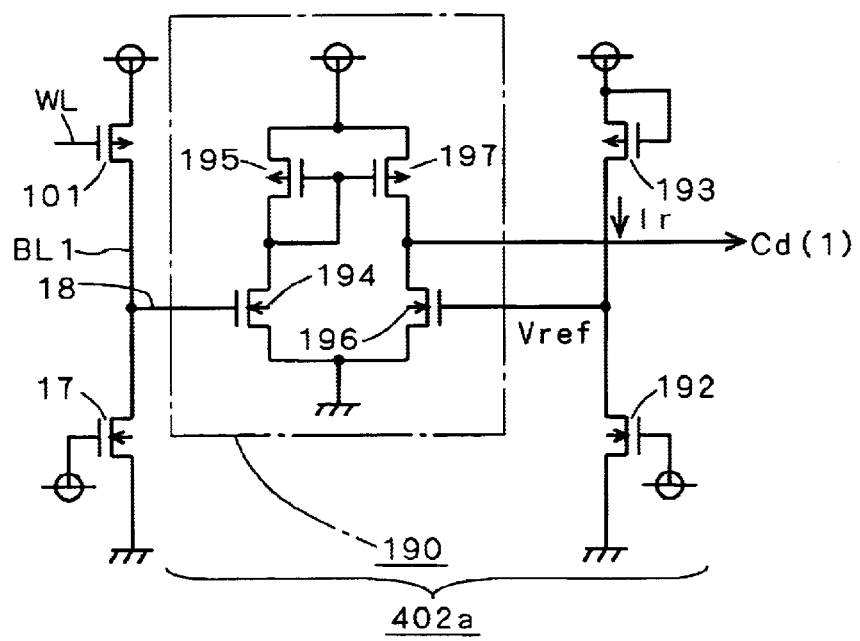
FIG. 11 is a circuit diagram of an encoder circuit according to the second embodiment of the present invention.

FIG. 11 is a circuit diagram showing a preferred configuration of the encoder circuit 402, representatively illustrating a part connected with a bit line BL1. Circuit parts similar to those shown in FIG. 11 are connected also to remaining bit lines BL2 to BL4. This encoder circuit 402a includes a sense amplifier 190. The sense amplifier 190 compares the potential of a wire 18 with a reference potential Vref generated by transistors 192 and 193 for generating a high- or low-level signal and outputting the signal as one bit (e.g., a code Cd(1) corresponding to the bit line BL1) of a code Cd.

In the sense amplifier 190, a series circuit of an NMOS transistor 194 and a PMOS transistor 195 and a series circuit of an NMOS transistor 196 and a PMOS transistor 197 are interposed between a ground power supply line and a positive power supply line. Gate and drain electrodes of the PMOS transistor 195 and a gate electrode of the PMOS transistor 197 are connected with each other, to form a current mirror circuit.

A drain current flowing in a TFF 101 has a low value within the range of about 1 pA ($10^{-12}$A) to about 1 $\mu$A. Therefore, the drain current is preferably set to about 1 nA ($10^{-9}$A) by employing an NMOS transistor as a bit line load 17 and applying a constant potential to its gate electrode. Thus, the sensitivity of the sense amplifier 190 is improved. The gate potential is preferably set to the ground potential for setting the drain current to about 1 nA.

A series circuit of the NMOS transistor 192 and the PMOS transistor 193 is interposed between the ground power supply line and the positive power supply line, and the reference potential Vref is fetched from a connected portion between the transistors 192 and 193. Constant potentials such as the potentials of the ground power supply line and the positive power supply line are supplied to gate electrodes of the NMOS transistor 192 and the PMOS transistor 193 respectively. Comparison of the potential of the wire 18 with the reference potential Vref is equivalent to comparison of the drain current for the TFT 101 with a reference current Ir (or constant times the current Ir) flowing through the series circuit of the NMOS transistor 192 and the PMOS transistor 193.

In order to perform stable comparison, the transistors other than the TFT 101 shown in FIG. 11 are preferably formed not as TFTs but as bulk transistors. If the transistors other than the TFT 101 are formed as polycrystalline TFTs similarly to the TFT 101, gate lengths and gate widths of these transistors are preferably set larger than those of the TFT 101, in order to stabilize drain currents therefor. The relation between the gate length and the gate width of a TFT, and stability of the gate current is described in detail later with reference to the third embodiment.

Figure 12:
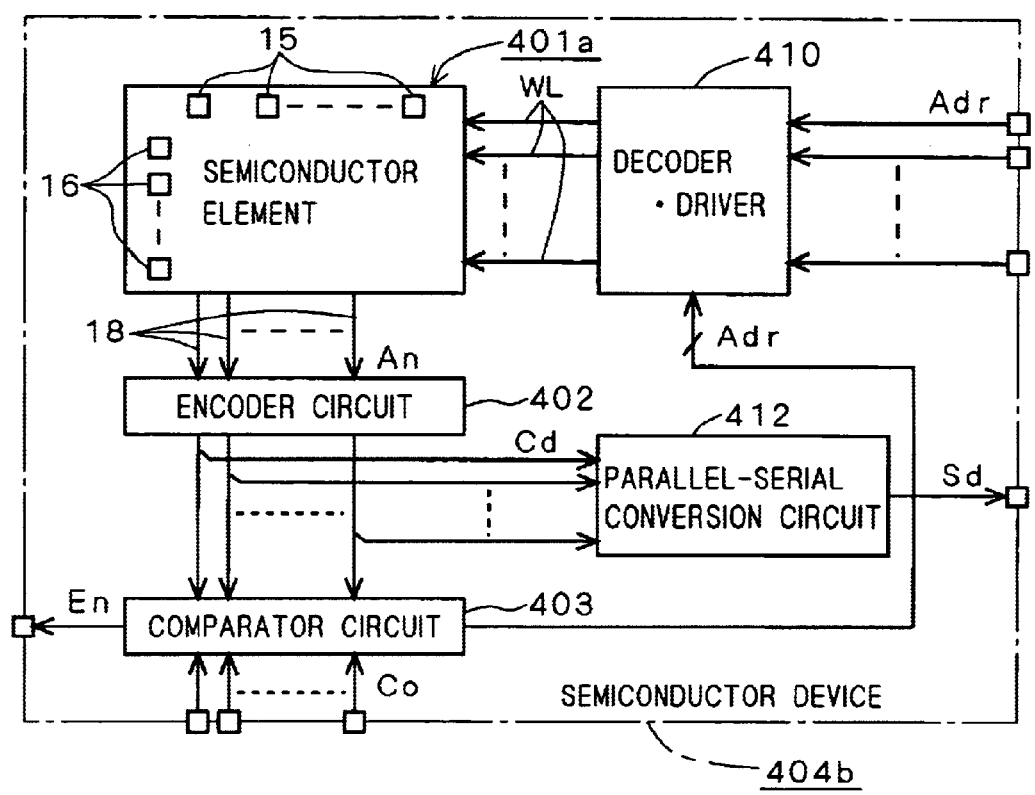
FIG. 12 is a block diagram showing another semiconductor device according to the second embodiment of the present invention.

FIG. 12 is a block diagram showing another preferred configuration in relation to the semiconductor device 404 shown in FIG. 5. This semiconductor device 404b is characteristically different from the semiconductor device 404a in that the same comprises a parallel-series conversion circuit 412 in place of the buffer circuit 411. The parallel-series conversion circuit 412 converts codes Cd output from an encoder circuit 402 as parallel data to a code Sd as serial data. The code Sd is output through an output terminal. Therefore, the output terminal relaying the code Sd may be sufficient for one bit, and hence the number of terminals provided on the semiconductor device 404b can be reduced. Due to the provision of the parallel-serial conversion circuit 412, further, it is possible to prevent illegal action of inputting codes different from the codes Cd output from the encoder circuit 402 in a comparator circuit 403 through the output terminal.

Figure 13:
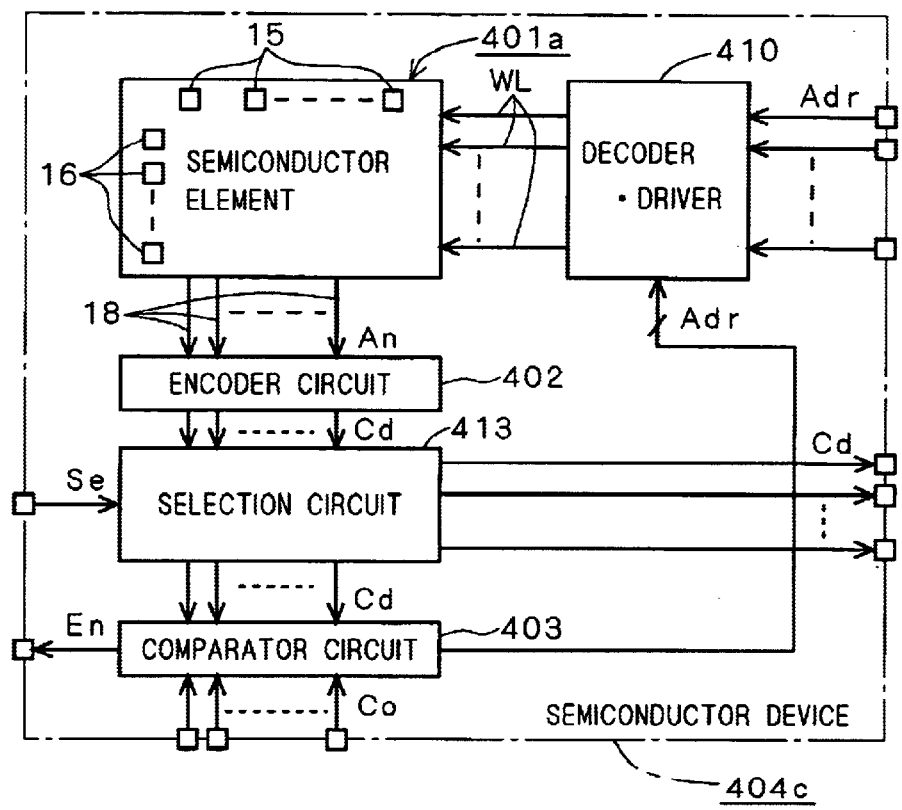
FIG. 13 is a block diagram showing still another semiconductor device according to the second embodiment of the present invention.

FIG. 13 is a block diagram showing still another preferred configuration in relation to the semiconductor device 404 shown in FIG. 5. This semiconductor device 404c is characteristically different from the semiconductor device 404a in that the same comprises a selection circuit 413 in place of the buffer circuit 411. The selection circuit 413 selectively transmits codes Cd output from an encoder circuit 402 to either a comparator circuit 403 or output terminals on the basis of a selection signal Se input through an input terminal. Due to the provision of the selection circuit 413, it is possible to prevent illegal action of inputting codes different from the codes Cd output from the encoder circuit 402 in the comparator circuit 403 through output terminals.

Figure 14:
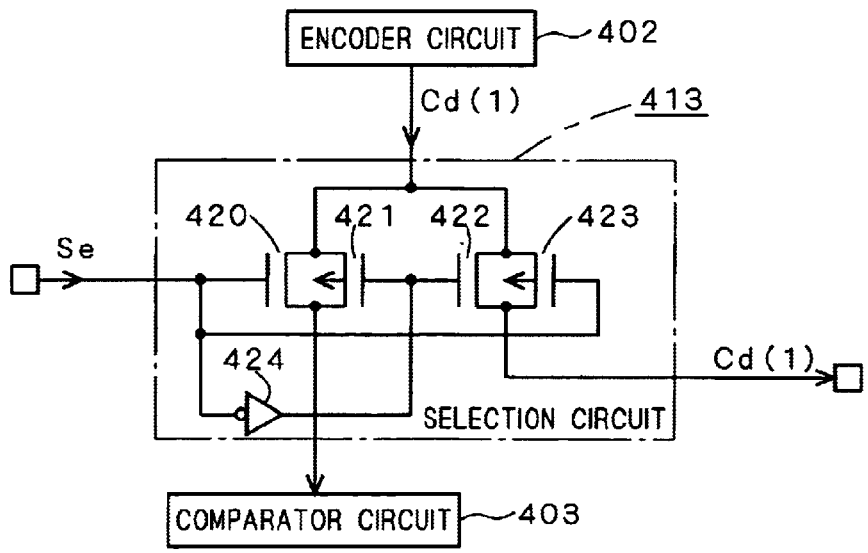
FIG. 14 is a circuit diagram of a selection circuit according to the second embodiment of the present invention.

FIG. 14 is a circuit diagram showing an exemplary internal structure of the selection circuit 413. In this example, the selection circuit 413 includes a transfer gate formed by parallel connection of an NMOS transistor 420 and a PMOS transistor 421 and a transfer gate formed by parallel connection of an NMOS transistor 422 and a PMOS transistor 423. Only one of the two transfer gates selectively conducts in accordance with a selection signal Se and an inverted signal thereof obtained through an invertor 424. An output of the encoder circuit 402 is connected to input parts of the two transfer gates, while an input part of the comparator circuit 403 and an output terminal are connected to output parts of the two transfer gates respectively. Therefore, the codes Cd are transmitted to the comparator circuit 403 if the selection signal Se is high, or transmitted to the output terminals if the selection signal Se is low.

While the semiconductor element 401a (FIG. 8) includes the plurality of word lines WL1 to WL4 and the plurality of bit lines BL1 to BL4 in the above description, the semiconductor element 401a may alternatively include a single word line. In this case, the TFTs 101 are arranged in the form of a one-dimensional matrix, i.e., arranged in line. All analog signals An can be simultaneously fetched without sequentially selecting a plurality of word lines one by one. This also means that all bits of the codes Cd can also be simultaneously fetched. Further, the decoder-driver 410 can be removed. In other words, the structure of the semiconductor device 404 can be simplified.

The TFTs 101 provided on the semiconductor element 401a (FIG. 8) may be n-channel transistors in place of p-channel transistors. In this case, the positive power supply lines and the ground power supply lines may be exchanged in FIGS. 8 and 11.

Third Embodiment

Referring again to FIG. 1, dispersion (deviation) of the characteristics such as the drain current related to the TFT 101 is derived from dispersion of the amount of the grain boundaries 6 contained in the channel region 2, as described with reference to the first embodiment. Therefore, dispersion of the characteristics of the TFT 101 can be increased by so setting the crystal grain size (mean grain size) d, the gate length L and the gate width W as to increase dispersion of the amount of the grain boundaries 6 contained in the channel region 2, thereby increasing dispersion of the analog signals An and the codes Cd among individuals. Optimum conditions of the crystal grain size d, the gate length L and the gate width W for increasing such dispersion of the characteristics are now described.

It is understood that the following relation holds between the mean value of the drain current, i.e., the mean current I$\mu$, standard deviation I$\sigma$ thereof, the gate length L and the crystal grain size d from the sampling theorem:

$$I\sigma / I\mu \propto \sqrt{\frac{d}{L}}$$

If L<d holds between the gate length L and the crystal grain size d, the probability that the channel region 2 contains the crystal grains 5 is L/d and the probability that the channel region 2 contains no crystal grains 5 is (d−L)/d when performing simplification regarding the relation between the crystal grains 5 and the channel region 2 as one-dimensional. Employing a drain current I1 when the channel region 2 contains the crystal grains 5 and a drain current I2 when the channel region 2 contains no crystal grains 5, the mean current Iμ is given as follows:

$$I\mu = I1 \cdot (L/d) + I2 \cdot (d-L)/d$$

Further, the standard deviation Iσ is given as follows:

$$I\sigma = |I1 - I2| \frac{\sqrt{L(d-L)}}{d}$$

Hence, the following numerical formula is derived:

$$I\sigma/I\mu = \frac{|I1 - I2|\sqrt{L(d-L)}}{I1 \cdot L + I2 \cdot (d-L)}$$

Assuming that I1=0 and I2=1, the above numerical formula is simplified as follows:

$$I\sigma/I\mu = \sqrt{\frac{L}{d-L}}$$

Figure 15:
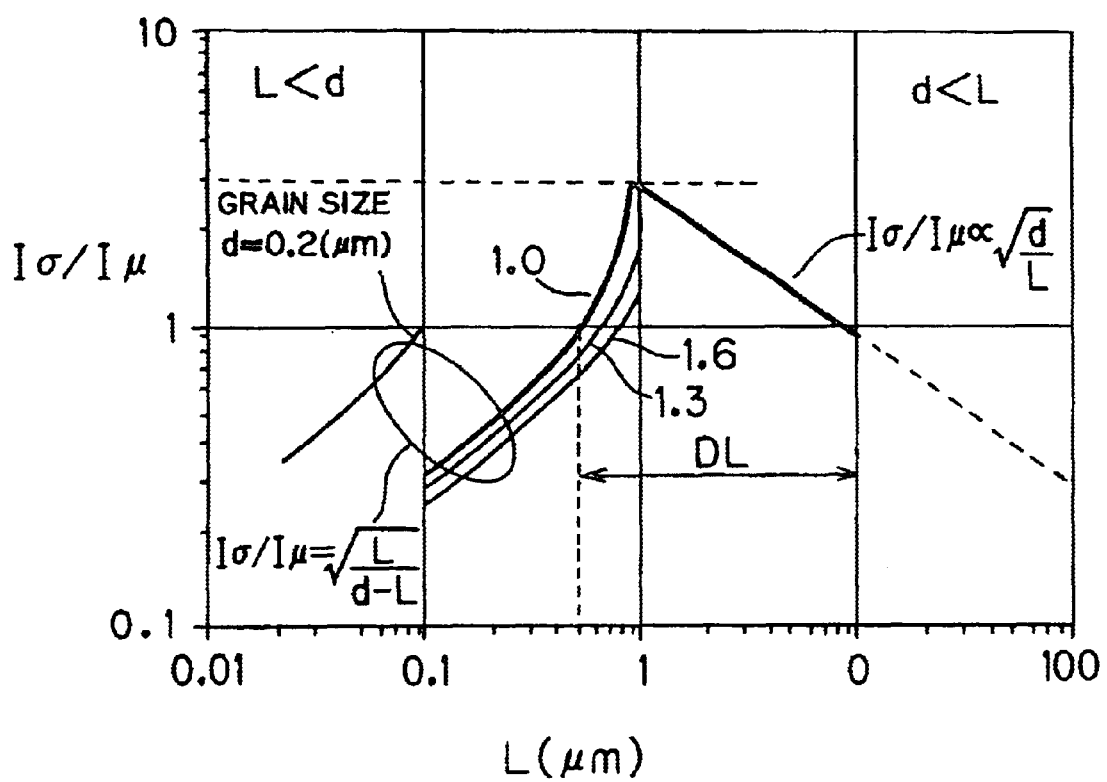
FIG. 15 is a graph showing the basis of optimum conditions in a third embodiment of the present invention.

FIG. 15 shows the relation expressed in this formula as a graph. Referring to FIG. 15, the thickest curve shows the relation when d=1.0 μm. As shown in FIG. 15, dispersion of the drain current of the TFT 101 is maximized when the crystal grain size d agrees with the gate length L. It can be concluded that the gate length L may be set in the range DL of 0.5 μm≦L≦10 μm when d=1.0 μm so that dispersion of the drain current is within the range from the maximum value to ⅓ times the maximum value, i.e., a practically useful range.

Dispersion of the drain current normalized to the maximum value depends on the proportion L/d, and hence it is understood that the proportion L/d may be set in the range of 0.5≦L/d≦10 in a general case where the crystal grain size d is not restricted to 1.0 μm. Also in relation to the gate width W, a similar conclusion can be derived through one-dimensional approximation along the gate width W. Also in relation to the gate width, therefore, such a conclusion is obtained that the ratio W/d is preferably set in the range of 0.5≦W/d≦10.

Fourth Embodiment

The semiconductor element 401 (FIGS. 5 to 7) may include polycrystalline resistive elements or polycrystalline capacitors (capacitive elements), for example, in place of the polycrystalline TFTs 101. Such examples are now described.

Figure 16:
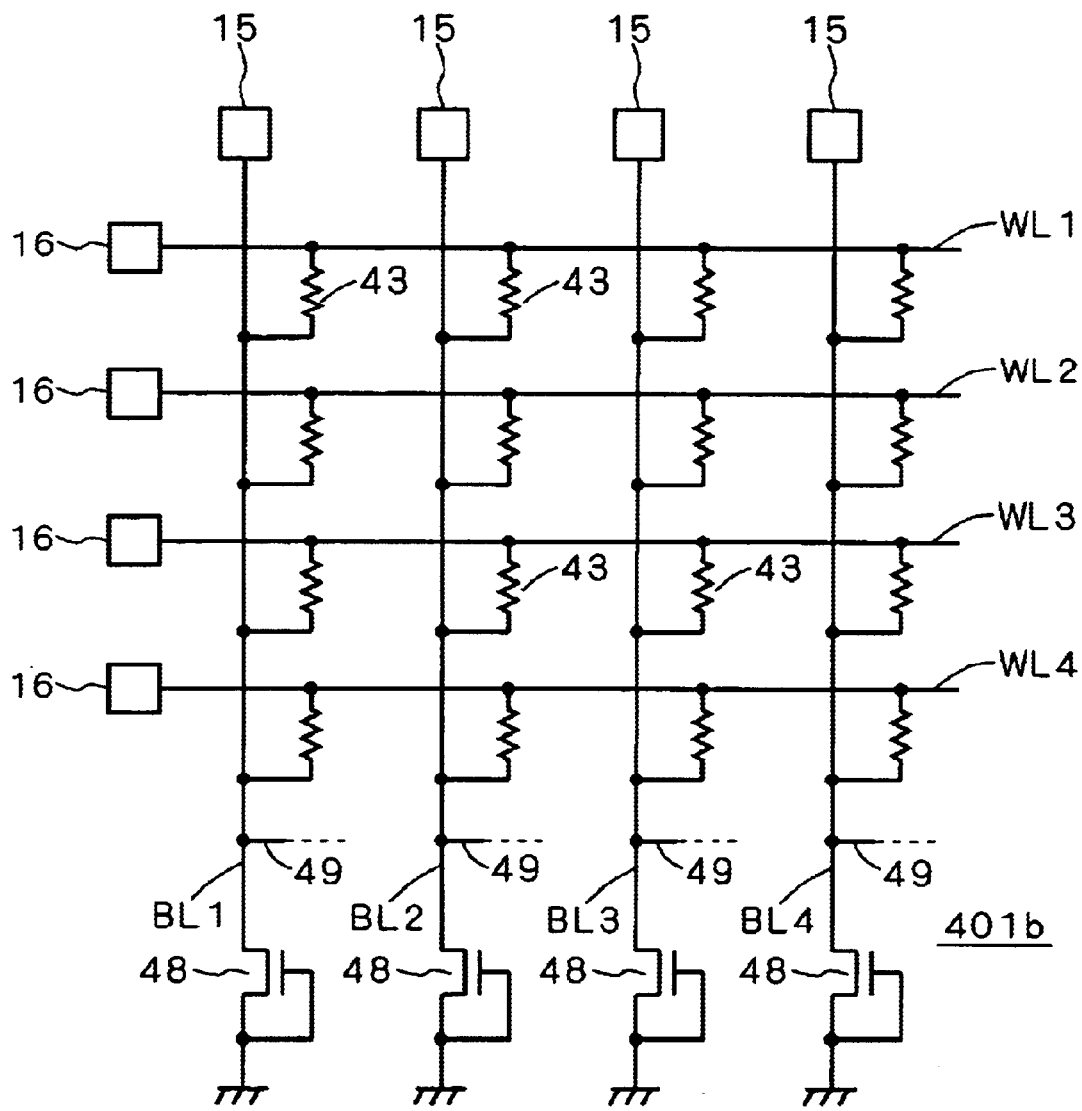
FIG. 16 is a circuit diagram of a semiconductor element according to a fourth embodiment of the present invention.

FIG. 16 is a circuit diagram showing an example of the semiconductor element 401 that has polycrystalline resistive elements. This semiconductor element 401b comprises a plurality of (in FIG. 16, 4×4=16) polycrystalline resistive elements 43 arranged on a substrate in the form of a matrix. Resistors of the resistive elements 43 are made of a polycrystalline semiconductor such as polycrystalline silicon, for example. Therefore, the resistance values of the resistive elements 43 are dispersed at random.

On the substrate, a plurality of word lines WL1 to WL4 and a plurality of bit lines BL1 to BL4 are arranged in the transverse and vertical directions respectively.

First ends of four resistive elements 43 transversely aligned with each other in FIG. 16 are connected in common to each of the word lines WL1 to WL4. Second ends of four resistive elements 43 vertically aligned with each other in FIG. 16 are connected in common to each of the bit lines BL1 to BL4. An end of each of the bit lines BL1 to BL4 is connected to a ground power supply line through an NMOS transistor 48 serving as a bit line load. A gate electrode of the NMOS transistor 48 is connected to the ground power supply line, for example.

A wire 49 for fetching analog signals An is connected to a drain electrode of each of the NMOS transistors 48. A pad 15 is connected to the other end of each of the bit lines BL1 to BL4, while a pad 16 is connected to an end of each of the word lines WL1 to WL4.

When a gate voltage of a prescribed level is applied to one of the word lines WL1 to WL4 in the semiconductor element 401b having the aforementioned structure, currents flow in the four resistive elements 43 connected with this word line. These currents flow through the NMOS transistors 48, and hence a potential proportionate to the currents flowing through each of the resistive elements 43 is generated on corresponding one of the wires 49 connected with the bit lines BL1 to BL4. The four potentials are output as the analog signals An. 16 potentials in total can be fetched as the analog signals An by sequentially applying the prescribed potential to the word lines WL1 to WL4. The analog signals An are obtained as random values corresponding to dispersion of the resistance values of the resistive elements 43.

Due to the provision of the pads 15 and 16, the analog signals An can be read through probes during steps of manufacturing the semiconductor element 401b. The resistive elements 43 may alternatively be arranged in the form of a one-dimensional matrix, so that first ends of all resistive elements 43 are connected to a single word line. In order to increase dispersion of the analog signals An, the lengths and the widths of the polycrystals forming the resistive elements 43 may be in ranges similar to those of the optimum conditions for the gate length L and the gate width W described with reference to the third embodiment.

Figure 17:
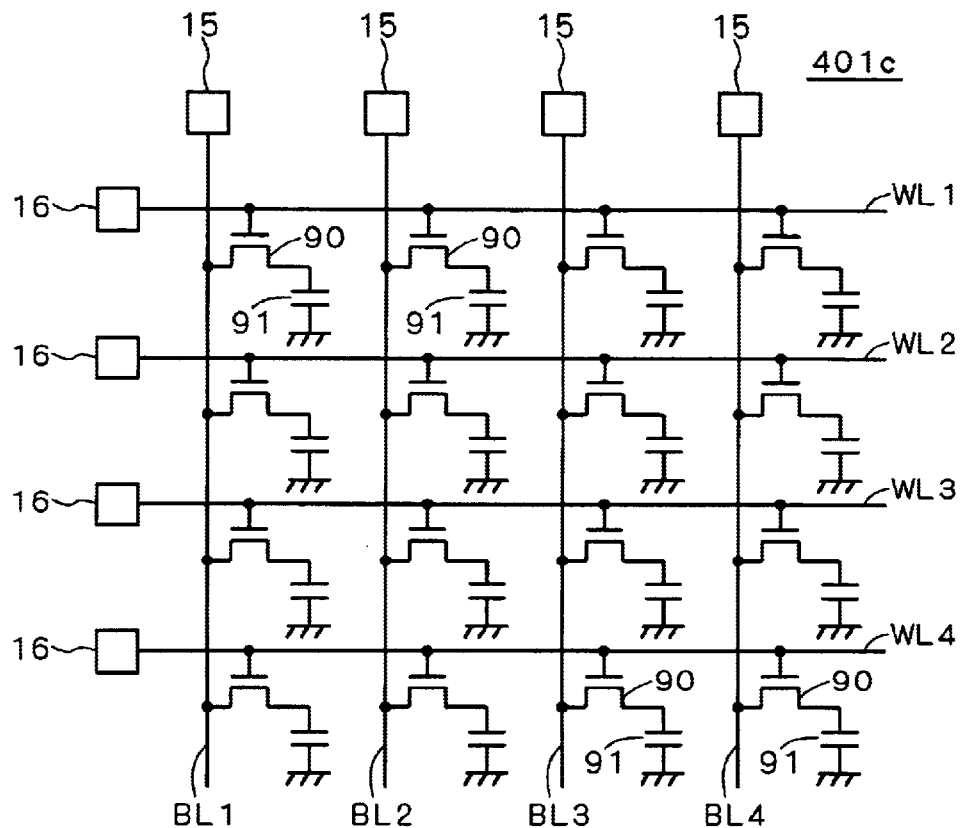
FIG. 17 is a circuit diagram of another semiconductor element according to the fourth embodiment of the present invention.

FIG. 17 is a circuit diagram showing an example of the semiconductor element 401 including polycrystalline capacitive elements. This semiconductor element 401c includes a plurality of (in FIG. 17, 4×4=16) series circuits of capacitive elements 91 and MOS transistors 90 arranged on a substrate in the form of a matrix. The capacitive elements 91 have perovskite polycrystalline dielectrics such as BST ($Ba_xSr_{1-x}TiO_3$), for example. Therefore, the capacitance values of the capacitive elements 91 are dispersed at random.

On the substrate, a plurality of word lines WL1 to WL4 and a plurality of bit lines BL1 to BL4 are arranged in the transverse and vertical directions respectively. Gate electrodes of MOS transistors 90 belonging to four series circuits transversely aligned with each other in FIG. 17 are connected in common to each of the word lines WL1 to WL4. Either source electrodes or drain electrodes of MOS transistors 90 belonging to four series circuits vertically aligned with each other in FIG. 17 are connected in common to each of the bit lines BL1 to BL4. First ends of the capacitive elements 91 belonging to the 16 series circuits are connected to a ground power supply line. A pad 15 is connected to the other end of each of the bit lines BL1 to BL4, while a pad 16 is connected to an end of each of the word lines WL1 to WL4.

When a gate voltage of a prescribed level is applied to one of the word lines WL1 to WL4 in the semiconductor element 401c having the aforementioned structure, four MOS transistors 90 connected to this word line can be turned on.

Second ends of four capacitive elements 91 are electrically connected to the bit lines BL1 to BL4 through the ON-state MOS transistors 90. At this time, the capacitances of the four capacitive elements 91 can be measured through the bit lines BL1 to BL4. For example, potentials when supplying currents over a certain period can be measured and these potentials may be fetched as analog signals An. The capacitances of the capacitive elements 91 are reflected on the potentials.

16 potentials in total can be fetched as the analog signals An by sequentially applying the prescribed gate voltage to the word lines WL1 to WL4. The analog signals An are obtained as random values corresponding to dispersion of the capacitances of the capacitive elements 91. Due to the provision of the pads 15 and 16, the analog signals An can also be read through probes during steps of manufacturing the semiconductor element 401c. The series circuits of the capacitive elements 91 and the MOS transistors 90 may alternatively be arranged in the form of a one-dimensional matrix so that gate electrodes of all MOS transistors 90 are connected to a single word line.

In order to increase dispersion of the analog signals An, the length and the width of the polycrystalline dielectrics forming the capacitive elements 91 may be set in ranges similar to those under the optimum conditions for the gate length L and the gate width W described with reference to the third embodiment. When the thickness of a BST element is 100 nm, the thickness in terms of a silicon oxide film is about 0.5 nm. Assuming that a BST element facing an electrode is in the form of a square having sides of 0.3 $\mu$m, its capacitance is about 6.2 fF. When the crystal grain size (mean value) is optimally set to 100 nm corresponding to the thickness, the capacitance is dispersed in the range of –30% to +30%, i.e., 4.3 fF to 8.1 fF. It can be said that this value is dispersion sufficient to be utilized for identification.

Fifth Embodiment

The semiconductor device can also be formed so that the semiconductor element 401 includes only a single TFT 101 and the encoder circuit 402 obtains a multi-bit code Cd from the single TFT 101. The fifth embodiment is described with reference to such a structure.

Figure 18:
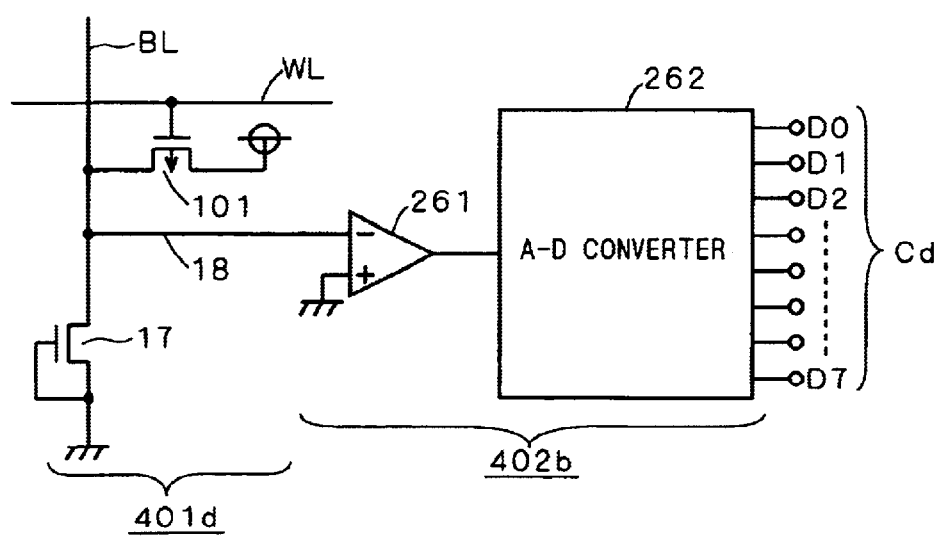
FIG. 18 is a circuit diagram of an encoder circuit according to a fifth embodiment of the present invention.

FIG. 18 shows a semiconductor element 401d having only a single TFT 101. This TFT 101 has a gate electrode connected with a word line WL, a drain electrode connected with a bit line BL and a source electrode connected with a positive power supply line. An end of the bit line BL is connected to a ground power supply line through a bit line load 17. A wire 18 is connected to an end of the bit line load 17 opposite to the ground side. In other words, the semiconductor element 401d corresponds to a specific example of the semiconductor element 401a (FIG. 8) having a matrix of 1×1. Therefore, a single analog signal An is fetched from the semiconductor element 401 through the wire 18.

FIG. 18 also shows an encoder circuit 402b having an operational amplifier 261 and an A-D converter 262. The operational amplifier 261 amplifies the analog signal An fetched through the wire 18. The A-D converter 262 converts the analog signal An amplified in the operational amplifier 261 to 8-bit digital signals D0 to D7 expressed in 256 gradations, for example, and outputs the same as a code Cd. Thus, the encoder circuit 402b enables conversion of the analog signal An obtained from the single TFT 101 to the multi-bit code Cd.

It is also possible to obtain a code Cd having a higher bit number by respectively encoding with the encoder circuits 402b a plurality of analog signals An output from the semiconductor element 401a (FIG. 8) having a plurality of TFTs 101. When the encoder circuit 402b is connected to each of the bit lines shown in FIG. 8, it is possible to obtain a code of 8×4=32 bits for each word line.

Sixth Embodiment

Figure 19:
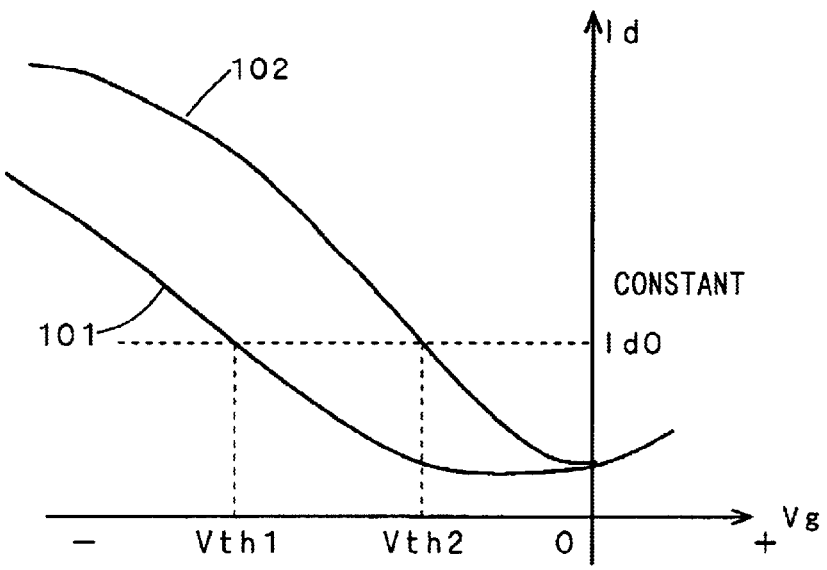
FIG. 19 is a graph illustrating operations of an encoder circuit according to a sixth embodiment of the present invention.
Figure 20:
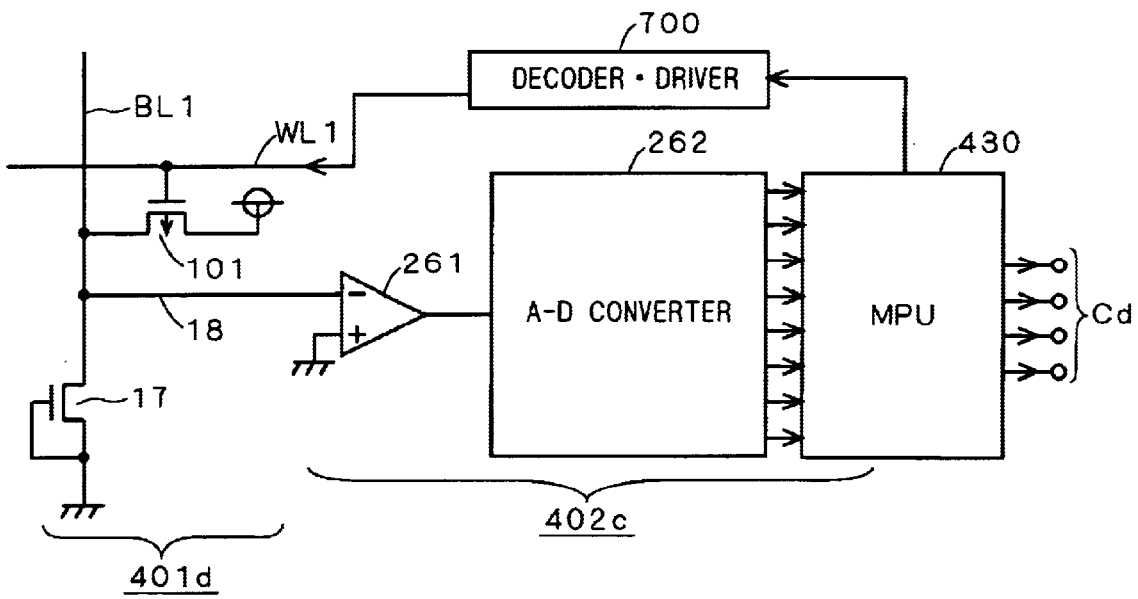
FIG. 20 is a block diagram of the encoder circuit according to the sixth embodiment of the present invention.

The encoder circuit 402 (FIG. 5) can also be formed to encode a gate threshold voltage in place of encoding the drain current of the TFT 101. As shown in FIG. 19, gate threshold voltages Vth1 and Vth2 causing the same drain current Id0 between different TFTs 101 and 102 manufactured through the same manufacturing steps are generally different from each other. FIG. 20 is a block diagram showing an encoder circuit 402 generating a code Cd through such dispersion of gate threshold voltages Vth. This encoder circuit 402c is characteristically different from the encoder circuit 402b (FIG. 18) in that the same further includes a microprocessor (hereinafter abbreviated as MPU) 430.

The MPU 430 transmits an address signal sequentially specifying a plurality of word lines WL1 to WL4 one by one to a decoder-driver 700. The MPU 430 further reads a drain current of a TFT 101 connected to each specified word line driven by the decoder-driver 700 through an A-D converter 262. The decoder-driver 700 sweeps the potential of the specified word line. Consequently, the gate voltage of the TFT 101 connected with the specified word line changes following this and the drain current of the TFT 101 changes.

The MPU 430 measures the changing drain current. Thus, the MPU 430 detects the gate voltage (i.e., the potential of the word line) corresponding to a drain current Id0 set as a reference value. This gate voltage is the gate threshold voltage of the TFT 101. The MPU 430 outputs a value obtained by digitizing the gate threshold voltage or converting the value under a predetermined rule as the code Cd. In other words, the gate threshold voltage of the TFT 101 or a function that the gate threshold voltage is output as the code Cd.

Seventh Embodiment

Figure 21:
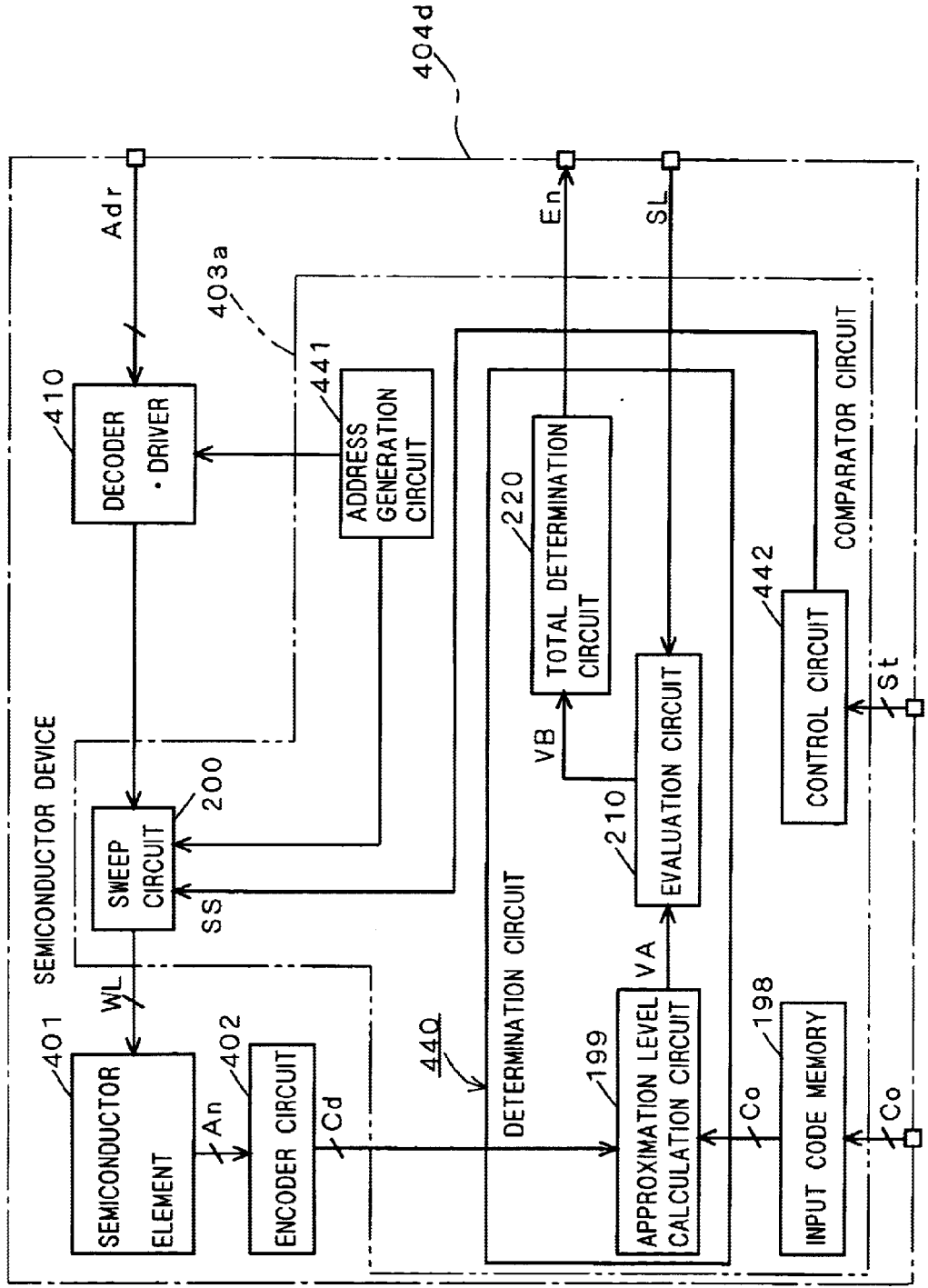
FIG. 21 is a block diagram of a semiconductor device according to a seventh embodiment of the present invention.

With reference to the seventh embodiment of the present invention, a more preferred configuration of the comparator circuit 403 is described. FIG. 21 is a block diagram showing the structure of a semiconductor device 404d according to the seventh embodiment. The semiconductor device 404d comprises a comparator circuit 403a. The comparator circuit 403a is formed to be capable of determining not only agreement but also approximation between codes Cd and Co. A reference value SL for the determination can be externally input in the semiconductor device 404d through an input terminal.

In order to enable this, the comparator circuit 403a has a sweep circuit 200 sweeping the potential of a word line WL. An approximation calculation level circuit 199 compares the code Cd changing by sweeping of the potential of the word line WL with a corresponding part of the code Co held in an input code memory 198. The approximation level calculation circuit 199 transmits an approximation level VA, i.e., a degree of between the codes Cd and Co calculated through comparison to an evaluation circuit 210. The evaluation circuit 210 compares the approximation level VA with the reference value SL thereby determining whether or not the approximation level VA is in excess a certain value, and outputs the result of determination as a determination signal VB.

The determination signal VB is individually obtained for each word line WL driven by a decoder-driver 410. An address generation circuit 441 transmits an address signal sequentially specifying all word lines WL one by one to the decoder-driver 410. Thus, a plurality of determination signals VB corresponding to all word lines WL are sequentially obtained one by one.

A total determination circuit 220 determines approximation between full-bit codes Cd corresponding to all word lines WL and full-bit codes Co on the basis of the plurality of determination signals VB corresponding to all word lines WL and outputs an enable signal En expressing the result of determination. Determination of agreement, which is most strict one, can be selected as the determination of approximation by properly setting the reference value SL. If only a single word line WL is provided, the total determination circuit 220 is unnecessary and the determination signal VB is output as the enable signal En as such.

A control circuit 442 starts operations of respective elements of the comparator circuit 403$a$ in response to an instruction signal St input through an input terminal and controls the operations of the respective elements along a prescribed procedure. In particular, the control circuit 442 transmits a sweep switching signal SS serving as a control signal instructing whether or not to perform sweeping to the sweep circuit 200. The approximation level calculation circuit 199, the evaluation circuit 210 and the total determination circuit 220 form a determination circuit 440.

The internal structures and operations of the elements belonging to the comparator circuit 403$a$ are now described. For convenience of illustration, it is assumed that a semiconductor element 401 is the semiconductor element 401$a$ illustrated in FIG. 8.

Figure 22:
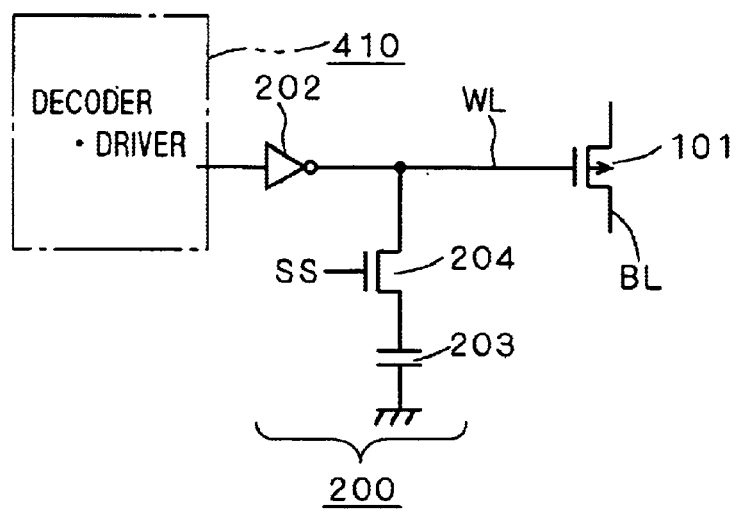
FIG. 22 is a circuit diagram of a sweep circuit according to the seventh embodiment of the present invention.

FIG. 22 is a circuit diagram showing the internal structure of the sweep circuit 200. The sweep circuit 200 includes an inverter 202 interposed between an output of the decoder-driver 410 and the word line WL and a series circuit of a MOS transistor 204 and a capacitive element 203 interposed between an output of the inverter 202 and the ground power supply line. The MOS transistor 204 is turned on/off in response to the sweep switching signal SS input in its gate electrode. It is possible to freely perform sweeping/no sweeping by selecting the value of the sweep switching signal SS.

Figure 23:
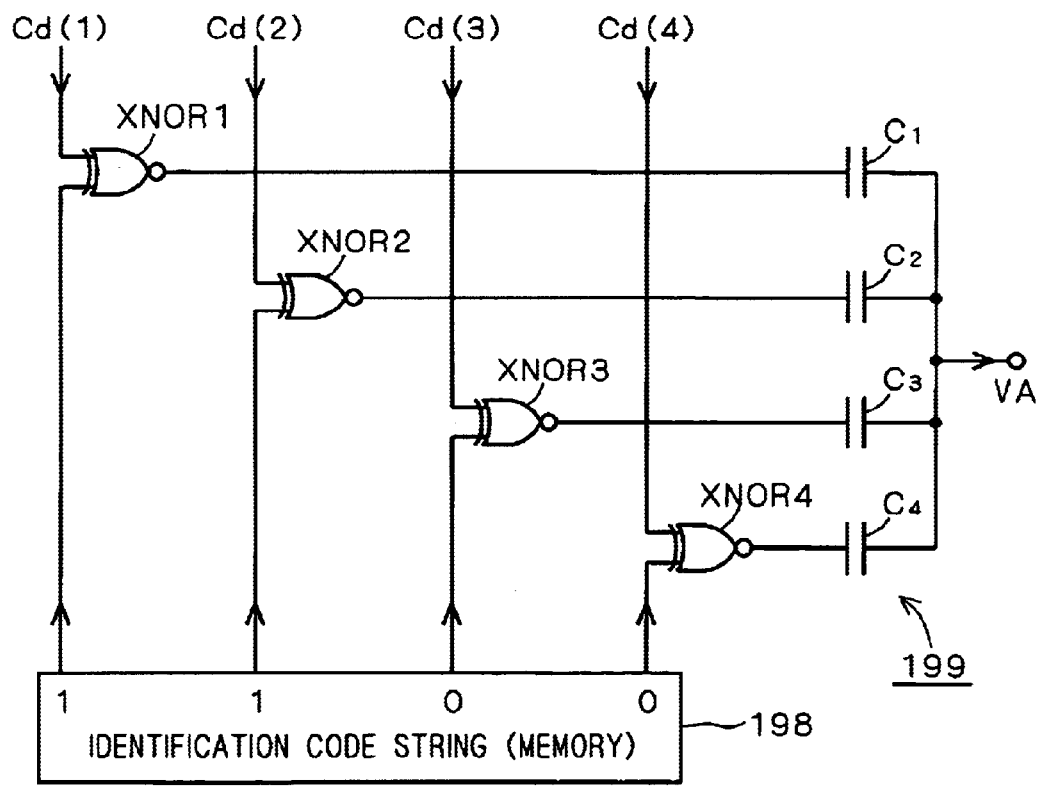
FIG. 23 is a circuit diagram of an error calculation circuit according to the seventh embodiment of the present invention.

FIG. 23 is a circuit diagram showing the internal structure of the approximation level calculation circuit 199. Codes Cd(1) to Cd(4) of four bits simultaneously output from the encoder circuit 402 are input in first inputs of inversion exclusive NOR circuits (hereinafter abbreviated as XNORs) 1 to 4 respectively. Four bits ("1, 1, 0, 0" in FIG. 23) of the code Co stored in the input code memory 198 to be compared with the codes Cd(1) to Cd(4) are input in second inputs of the XNORs 1 to 4. Each of the XNORs outputs a high-level signal when two input signals agree with each other, while outputting a low-level signal when the two input signals disagree with each other. The output signals from the XNORs 1 to 4 are added up through capacitive elements C1 and C4, and output as the approximation level VA.

Figure 24:
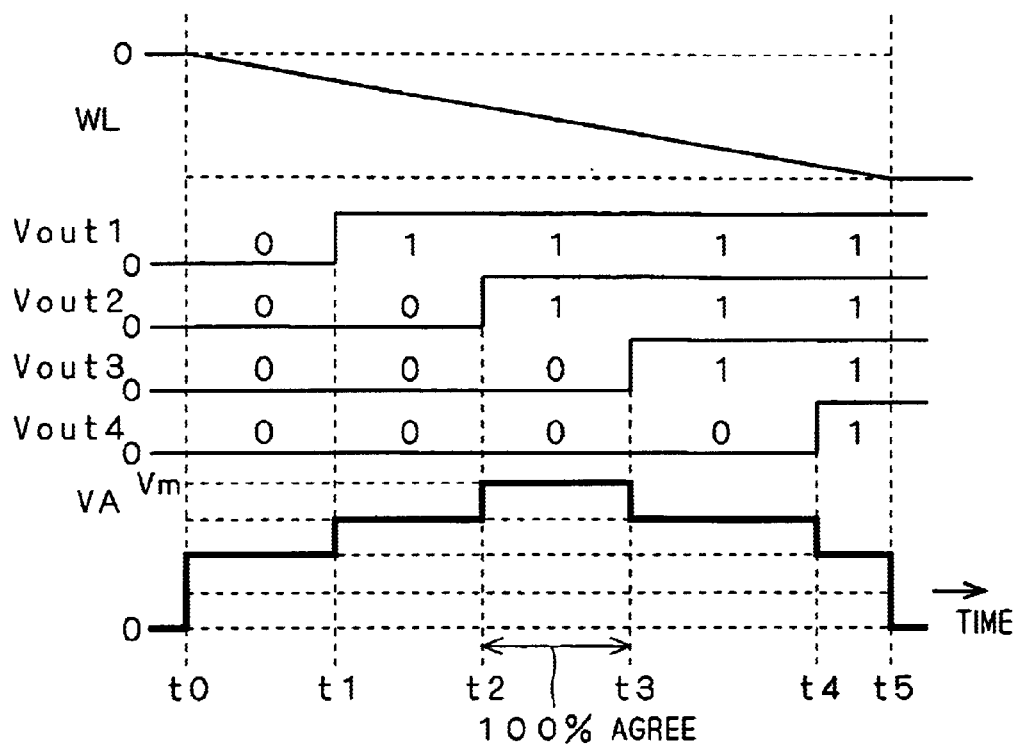
FIGS. 24 and 25 are operation explanatory diagrams of the error calculation circuit according to the seventh embodiment of the present invention.
Figure 25:
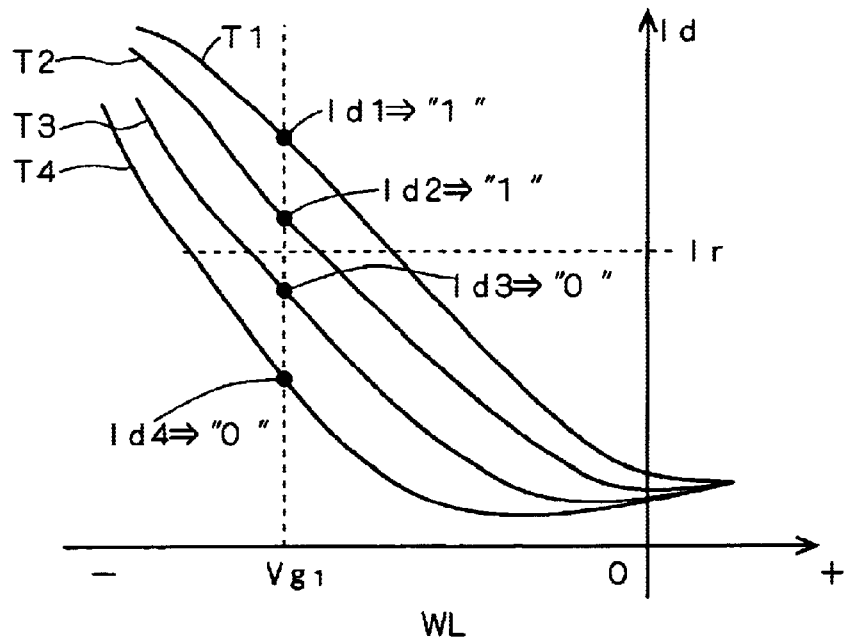

FIG. 24 is a timing chart of the signals of the respective parts of the approximation calculation circuit 199. FIG. 25 is a graph illustrating characteristics of four TFTs 101 (tentatively referred to as transistors T1 to T4) connected to a single word line WL. It is assumed that the transistors T1 to T4 are connected to bit lines BL1 to BL4 respectively. It is also assumed that relation Id1>Id2>Id3>Id4 holds among drain currents Id1 to Id4 of the transistors T1 to T4, and correct values of the codes Cd(1) to Cd(4) are "1, 1, 0, 0". Therefore, the values of the corresponding parts of the Co to be compared are "1, 1, 0, 0", as illustrated in FIG. 23.

If the encoder circuit 402 (FIG. 21) compares the drain currents Id1 to Id4 with a reference current Ir and generates the codes Cd(1) to Cd(4) in response to the results of comparison similarly to the encoder circuit 402$a$ shown in FIG. 11, for example, the correct values "1, 1, 0, 0" are obtained as the codes Cd(1) to Cd(4) when a gate voltage supplied through the word line WL is a gate voltage Vg1 shown in FIG. 25. Following reduction of the gate voltage from zero toward the negative direction due to sweeping of the potential of the word line WL as shown in FIG. 24, the drain currents Id1 to Id4 increase. Following this, the drain currents Id1 to Id4 successively exceed the reference current Ir in this order.

Consequently, the codes Cd(1) to Cd(4) corresponding to the transistors T1 to T4 change from zero to one in this order. Following this, the approximation level VA, which increases stepwise, is maximized when the codes Cd(1) to Cd(4) agree with the corresponding parts of the code Co as "1, 1, 0, 0", and thereafter lowers stepwise.

Figure 26:
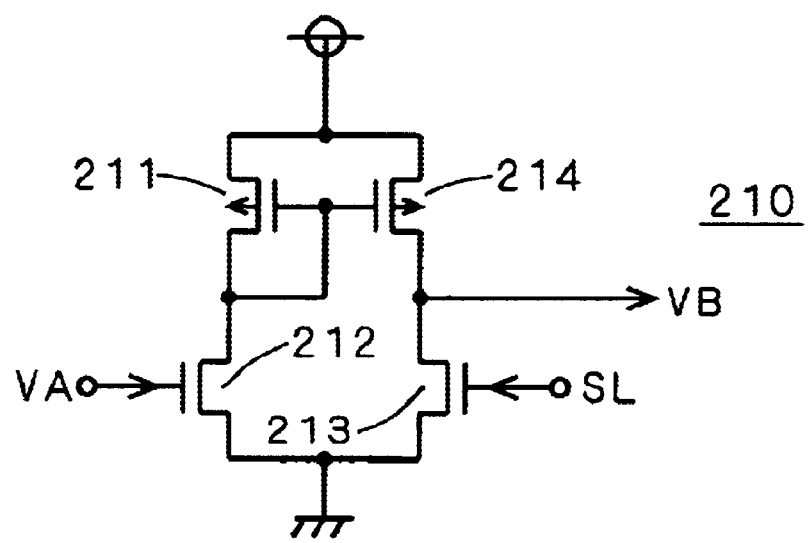
FIG. 26 is a circuit diagram of an evaluation circuit according to the seventh embodiment of the present invention.

FIG. 26 is a circuit diagram showing the internal structure of the evaluation circuit 210. Similarly to the sense amplifier 190 shown in FIG. 11, the evaluation circuit 210 compares, with four MOS transistors 211 to 214, two voltage signals VA and SL input in a gate electrode and outputs the result of comparison as the determination signal VB. The determination signal VB goes high if the approximation level VA is higher than the reference value SL, or otherwise goes low.

Figure 27:
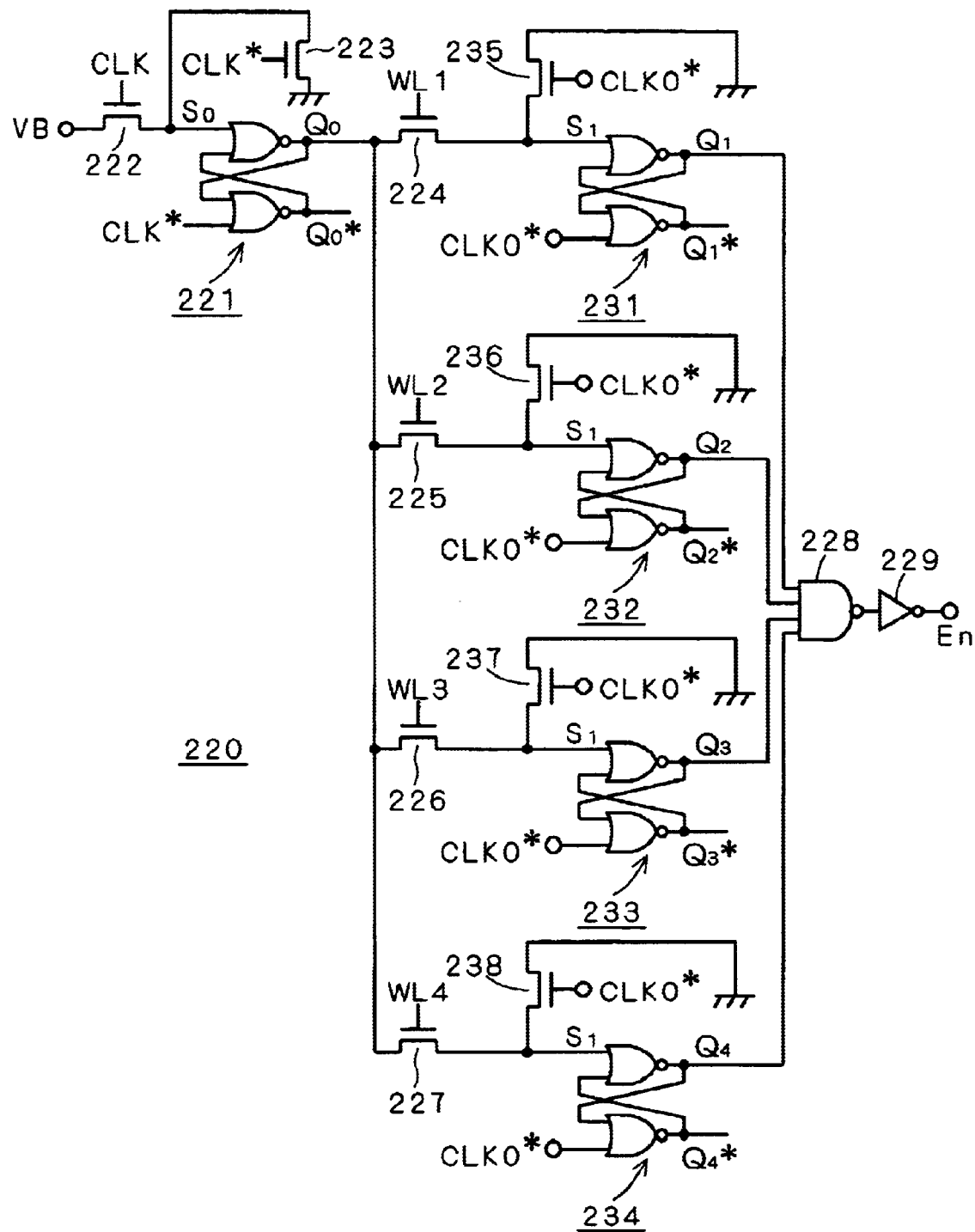
FIG. 27 is a circuit diagram of a total determination circuit according to the seventh embodiment of the present invention.

FIG. 27 is a circuit diagram showing the internal structure of the total determination circuit 220. The determination signal VB is input in a set input of an SR latch 221 as an input signal $S_0$ through a transfer gate 222 turned on/off in response to a clock signal CLK. An inverted clock signal CLK*, which is an inverted signal of the clock signal CLK, is input in a reset input of the SR latch 221. The set input of the SR latch 221 is connected to the ground power supply line through a transfer gate 223 turned on/off in response to the inverted clock signal CLK*.

A non-inverted output signal $Q_0$ from the SR latch 221 is input in set inputs of SR latches 231 to 234 as an input signal $S_1$ through transfer gates 224 to 227 having gate electrodes connected with word lines WL1 to WL4, respectively. An inverted clock signal CLK0*, which is an inverted signal of another clock signal CLK0 output from the control circuit 442, is input in reset inputs of the SR latches 231 to 234. The set inputs of the SR latches 231 to 234 are also connected to the ground power supply line through transfer gates 235 to 238 turned on/off in response to the inverted clock signal CLK0* respectively.

Non-inverted output signals $Q_1$ to $Q_4$ from the SR latches 231 to 234 are input in an inversion logical product circuit (hereinafter abbreviated as NAND) 238. An output signal from the NAND 238 is inverted by an inverter 229 and output as the enable signal En.

Figure 28:
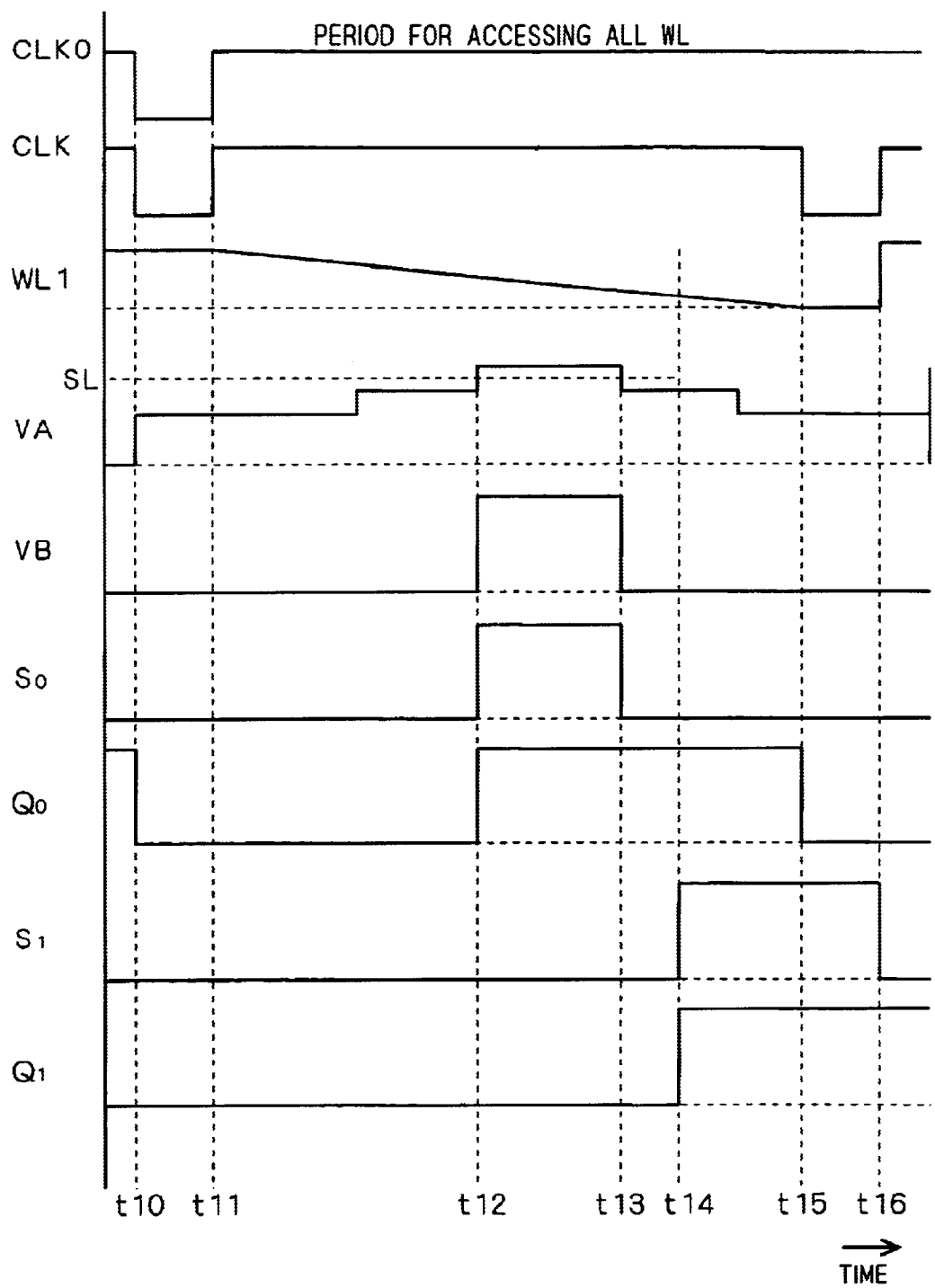
FIG. 28 is an operation explanatory diagram of the total determination circuit according to the seventh embodiment of the present invention.

FIG. 28 is a timing charts representatively showing operations of the total determination circuit 220 in a period when a single word line WL1 is swept. Before starting to sweep the word lines WL1 to WL4, the clock signals CLK0 and CLK are temporarily output as low-level pulses (a period of times t10 to t11) and thereafter remain high. While the clock signal CLK0 remains high until all word lines WL1 to WL4 are completely swept, the clock signal CLK is output as a low-level pulse immediately before newly starting sweeping of each of the word lines WL1 to WL4(for a period of times t15 to t16, for example).

Over the period of times t11 to t15, the word line WL1 is subjected to potential sweeping. Following this, the approximation level VA increases stepwise between the times t11 and t12, is maximized between the times t12 and t13 and thereafter lowers stepwise between the times t13 and t15. The reference value SL illustrated in FIG. 28 is set between the highest value, i.e., the maximum value of the approximation level VA and the second highest value. Therefore, the determination signal VB goes high only in the period between the times t12 and t13 when the approximation level VA is equal to the maximum value. This corresponds to that the evaluation circuit 210 performs the most strict determination on the approximation level VA, i.e., determines agreement between the codes.

The determination signal VB is transmitted as the input signal $S_0$ and held as the output signal $Q_0$ of the SR latch 221. The output signal $Q_0$ is transmitted as the input signal $S_1$ of the SR latch 231 and held as the output signal $Q_1$ of the SR latch 231 at the time t14 when the potential of the word line WL1 lowers beyond the gate threshold voltage of the transfer gate 224.

The aforementioned operations are repeated also in periods when the potentials of the remaining word lines WL2 to WL4 are swept. Consequently, four determination signals VB respectively corresponding to the word lines WL1 to WL4 are held in the output signals $Q_1$ to $Q_4$ and input in the NAND 228 when the potentials of all word lines WL1 to WL4 are completely swept. Therefore, a high-level signal is output as the enable signal En only when all determination signals VB are high, i.e., the approximation levels VA of the codes corresponding to all word lines WL1 to WL4 exceed the reference value SL.

In the comparator circuit 403a of this embodiment, as hereinabove described, the degree of strictness of determination in relation to the approximation level can be freely selected by externally setting the reference value SL. When employing the code Cd for authentication in a system assembled with the semiconductor device 404d, therefore, the strictness of determination can be changed in response to the degree of importance of authentication.

The comparator circuit 403a sweeping the potentials of the word lines WL1 to WL4 attains the following advantages: When the power supply voltage (voltage between the positive power supply line and the ground power supply line) or the temperature changes in the semiconductor element 401a, the characteristics of the TFTs 101 change following this. When the temperature increases, for example, the drain currents of the TFTs 101 increase under the same gate voltage. Assuming that FIG. 25 expresses the characteristics of the transistors T1 to T4 under a standard temperature, therefore, the drain currents Id1 to Id4 of all transistors T1 to T4 increase under a higher temperature as expressed in FIG. 29, for example.

Figure 29:
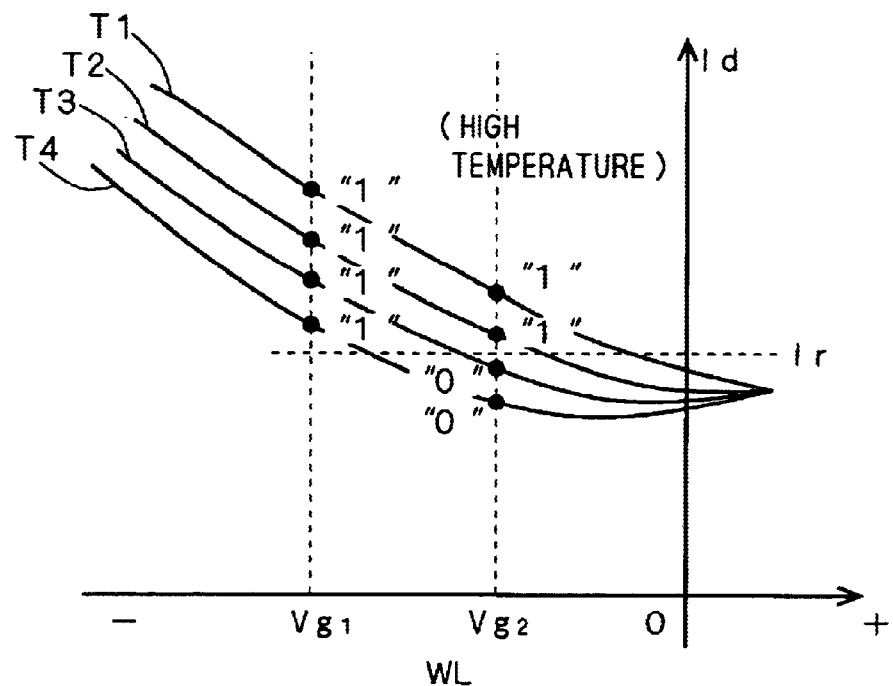
FIGS. 29 and 30 are operation explanatory diagrams of a comparator circuit according to the seventh embodiment of the present invention.

If the encoder circuit 402a compares the drain currents Id1 to Id4 for the gate voltage Vg1 fixed to a constant value with the reference current Ir at this time, the codes Cd(1) to Cd(4) are "1, 1, 1, 1" as shown in FIG. 29, and the correct values "1, 1, 0, 0" cannot be obtained. On the characteristics of the TFTs 101, the order of the levels of the drain currents Id1 to Id4 of the transistors T1 to T4 remains unchanged despite change in the temperature or the power supply voltage. Therefore, the correct values "1, 1, 0, 0" are obtained when the drain currents Id1 to Id4 for a gate voltage Vg2 are compared with the reference current Ir in FIG. 29, for example.

The comparator circuit 403a sweeps the potentials of the word lines WL1 to WL4, i.e., the gate voltages of the TFTs 101, and hence the correct values "1, 1, 0, 0" are necessarily obtained in a certain period during the sweeping process. In the sweeping process, therefore, the correct code Cd is necessarily compared with the external code Co so that the approximation level between these codes Cd and Co is calculated. The period when the approximation level VA is maximized corresponds to the period when the correct code Cd is compared with the external code Co. Therefore, the maximum value of the approximation level VA changing following sweeping expresses the true degree of approximation. Thus, the comparator circuit 403a in this embodiment can correctly determine the approximation and agreement between the codes while eliminating influence by fluctuation of the temperature and the power supply voltage.

Figure 30:
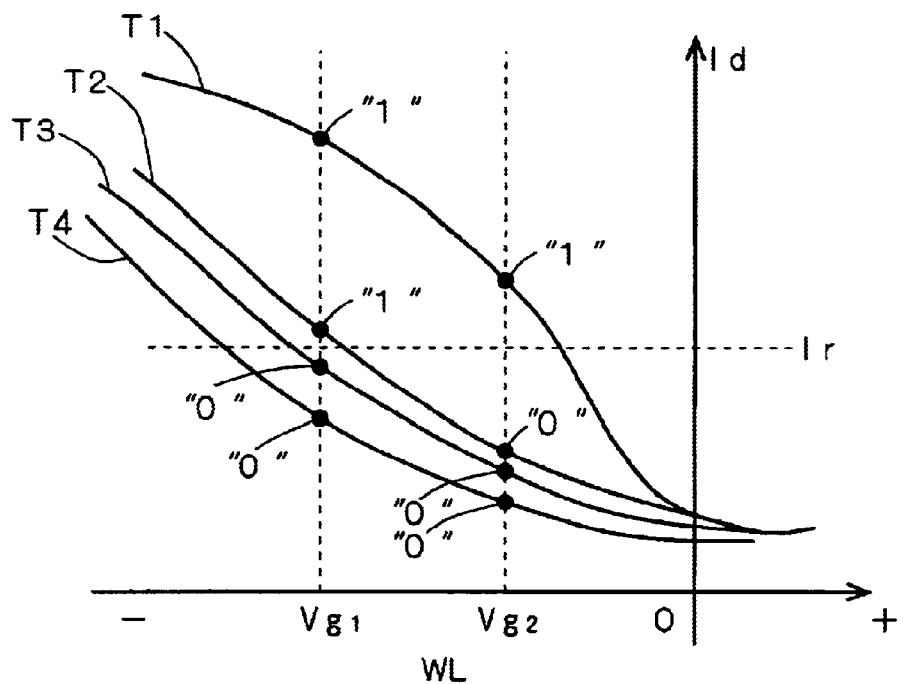

FIG. 30 is a graph illustrating preferable set conditions for the gate voltage for deciding the code Cd. When the drain currents Id1 to Id4 of the transistors T1 to T4 include those close to one another (Id2 to Id4 in FIG. 30), the gate voltage is preferably so set that the reference current Ir is located between the drain currents Id1 and Id2, for example, separating from the close drain currents Id2 to Id4. In other words, the gate voltage Vg2 is preferably selected in the example shown in FIG. 30.

Assuming that the gate voltage Vg1 is selected in FIG. 30, the drain currents Id2 and Id3 may not be correctly distinguished from each other. This can occur when the gate threshold voltage Vth causes fluctuation (shifting) resulting from "negative bias temperature stress" (referred to as "−BT stress") in relation to the TFTs 101. Shifting of the gate threshold voltage caused by −BT stress, which is a phenomenon known in relation to TFTs, is disclosed in Journal of Applied Physics, Vol. 76, No. 12, Dec. 15, 1994, pp. 8160 to 8166 (hereinafter referred to as literature 3), Japanese Patent application No. 5-111790 (1993) (Japanese Patent Laying-Open Gazette No. 6-326315 (1994); hereinafter referred to as literature 4) and Japanese Patent Application No. 7-101179 (1995) (Japanese Patent Laying-Open Gazette No. 8-293611 (1996); hereinafter referred to as literature 5) in addition to the aforementioned literature 2.

When a TFT is set under a high temperature (i.e., −BT stress is applied to the TFT) while applying a negative gate voltage, the gate threshold voltage shifts to a negative direction, as shown in the above literatures. The gate threshold voltage shifts in the negative direction whether the TFT is of a p-channel type or an n-channel type. The shift quantity of the gate threshold voltage is decided by the applied gate voltage, the temperature and the period when the TFT is set under these conditions. A formula for predicting the shift quantity on the basis of the gate voltage, the temperature and the period is also known through literature 5, for example.

In the semiconductor element 401a, there is a certain relation between the gate voltage applied to the TFTs 101 and the power supply voltage. Therefore, the shift quantity of the gate threshold voltage of the TFTs 101 can be predicted from the power supply voltage, the temperature of the semiconductor element 401a and a period when the TFRs 101 is active on the basis of literature 5, for example, and the shift quantity of the drain currents can also be predicted from the shift quantity of the gate threshold voltage.

Such shifting of the gate threshold voltage derived from −BT stress occurs regardless of dispersion of initial characteristics, and hence inversion of order may take place between the approximate drain currents Id2 and Id3. Such inconvenience can be avoided or relaxed by selecting the gate threshold voltage Vg2 illustrated in FIG. 30. Referring to FIG. 30, the probability that the order is inverted by shifting of the gate threshold voltage derived from −BT stress between the drain currents Id1 and Id2 remarkably different from each other is substantially ignorable.

It is possible to cope with the rare phenomenon of inversion of the drain currents by setting the reference value SL slightly lower than the maximum value thereby obtaining a high-level enable signal En with approximation of 95%, for example, without requiring agreement of 100% as to the comparison of the codes. Thus, the comparator circuit 403a according to this embodiment can also advantageously prevent false determination by shifting of the gate threshold voltage derived from −BT stress.

In place of making encoding to the value "1" when the drain current is in excess of the reference current Ir and making encoding to the value "0" when the former is less than the latter, encoding to the value "0" may be performed when the drain current is in excess of the reference current Ir and encoding to the value "1" may be performed when the former is less than the latter. The inversion can be performed as to only partial codes.

FIG. 31 is a circuit diagram showing the internal structure of the approximation level calculation circuit 199 when values are inverted only as to codes corresponding to the bit lines BL2 and BL4 among the bit lines BL1 to BL4. In this case, the values of the externally input code Co, if the same are correct values, are inverted in the bits corresponding to the bit lines BL2 and BL4 and are set to "1, 0, 0, 1". Therefore, an inverter 241 is interposed between the XNOR 2 and the code memory 198 while an inverter 242 is similarly interposed between the XNOR 4 and the code memory 198.

Eighth Embodiment

Figure 33:
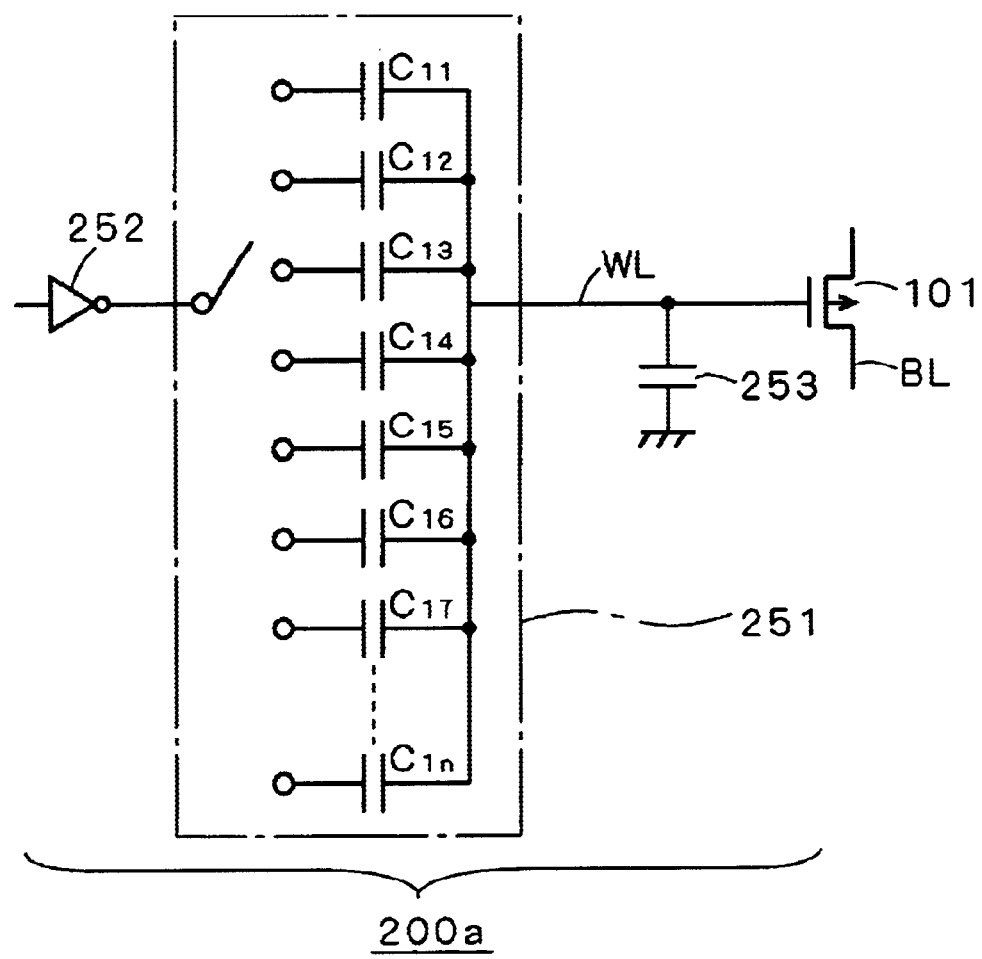
FIG. 33 is a circuit diagram of the sweep circuit according to the eighth embodiment of the present invention.

While the sweep circuit 200 according to the seventh embodiment is structured to continuously sweep the potential on the word line WL, the sweep circuit may alternatively be formed to discretely (stepwisely) perform sweeping as shown in FIG. 32. FIG. 33 shows an example of such a sweep circuit 200a. In the sweep circuit 200a, an inverter 252 and a capacitive element group 251 are interposed between an output of a decoder-driver 410 and a word line WL while a capacitive element 253 is interposed between the word line WL and a ground potential line.

Capacitances $C_{11}$ to $C_{1n}$ of n ($\geq 2$) capacitive elements included in the capacitive element group 251 are in relation $C_{11} < C_{12} < \ldots C_{1n}$. The capacitive element group 251 has a selector successively selecting those to be interposed between the inverter 252 and the word line WL from the n capacitive elements. Thus, the stepwise sweeping of the potential of the word line WL shown in FIG. 32 is implemented. It is also possible to obtain the potential of a desired word line WL in desired order by changing the order for selecting the capacitances $C_{11}$ to $C_{1n}$.

Ninth Embodiment

Figure 34:
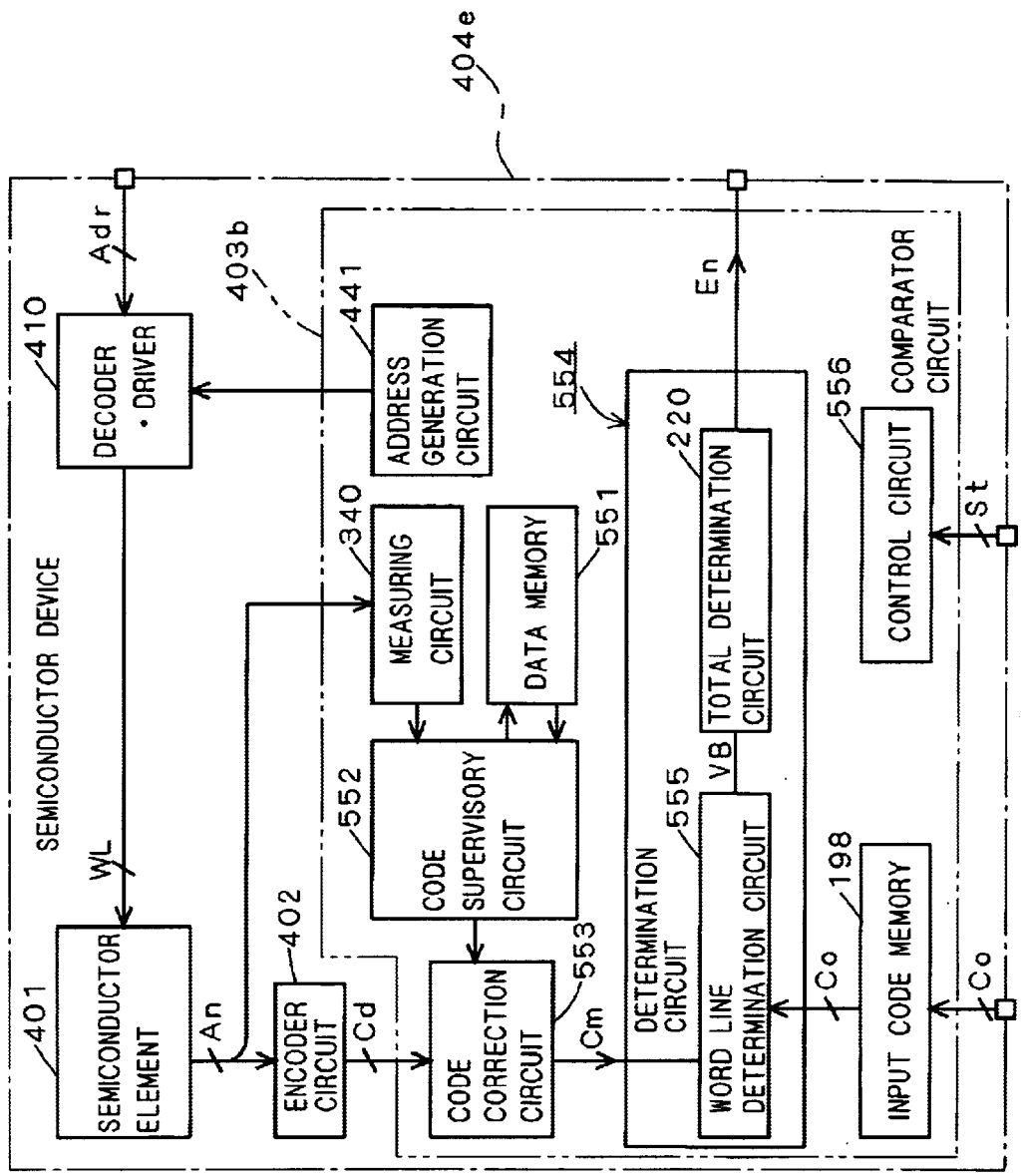
FIG. 34 is a block diagram of a semiconductor device according to a ninth embodiment of the present invention.

In relation to the ninth embodiment of the present invention, another preferred mode of the comparator circuit 403 (FIG. 6) is described. FIG. 34 is a block diagram showing the structure of a semiconductor device 404e according to this embodiment. The semiconductor device 404e comprises a comparator circuit 403b. On the premise that a TFT 101 is employed for a semiconductor element 401, the comparator circuit 403b is formed to be capable of correctly comparing codes even if a code Cd output from an encoder circuit 402 changes due to shifting of the threshold voltage of the TFT 101 derived from −BT stress.

An analog signal An output from the semiconductor element 401 is input in a measuring circuit 340 as well as the encoder circuit 402 at the same time. The measuring circuit 340 measures the analog signal An. A data memory 551 stores the measured value of the analog signal An. A code supervisory circuit 552 compares the measured value of the analog signal An obtained by the measuring circuit 340 through new measurement with the measured value of a previous analog signal An stored in the data memory 551 thereby supervising whether or not the analog signal An fluctuates due to −BT stress or the like. If fluctuation is recognized, the code supervisory circuit 552 determines on the basis of the present and previous analog signals An whether or not the code Cd output from the encoder circuit 402 changes following this fluctuation.

When the code supervisory circuit 552 determines that the code Cd changes, a code correction circuit 553 corrects the code Cd output from the encoder circuit 402 to a correct value and outputs a corrected code Cm. A word line determination circuit 555 compares the corrected code Cm with a corresponding part of a code Co stored in an input code memory 198, determines agreement therebetween and outputs a determination signal VB expressing the result of determination.

The determination signal VB is obtained for each word line WL specified by an address generation circuit 441. A total determination circuit 220 determines agreement between full-bit codes Cd corresponding to all word lines WL and full-bit codes Co on the basis of a plurality of determination signals VB corresponding to all word lines WL and outputs an enable signal En expressing the result of determination. A control circuit 556 starts operations of respective elements of the comparator circuit 403b in response to an instruction signal St input through an input terminal while controlling the operations of the respective elements along a prescribed procedure. The word line determination circuit 555 and the total determination circuit 220 form a determination circuit 554.

The internal structures and operations of the respective elements belonging to the comparator circuit 403b are now described. For convenience of illustration, it is assumed that a semiconductor element 401 is the semiconductor element 401a illustrated in FIG. 8.

Figure 35:
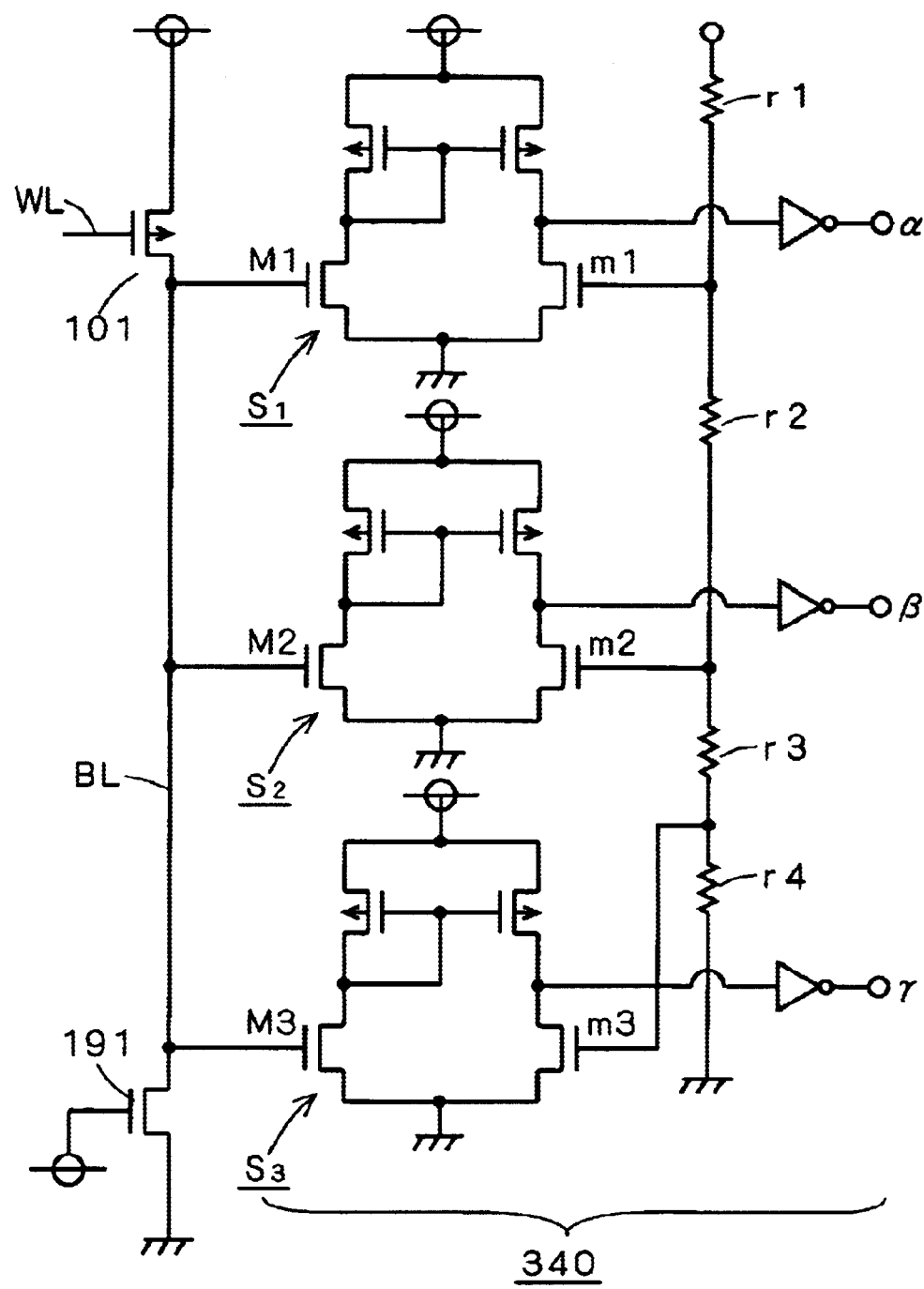
FIG. 35 is a circuit diagram of a measuring circuit according to the ninth embodiment of the present invention.

FIG. 35 is a circuit diagram showing the internal structure of the measuring circuit 340. In the measuring circuit 340, a plurality of resistive elements r1 to r4 interposed between the positive power supply line and the ground power supply line divide a power supply voltage thereby generating a plurality of reference potentials m1 to m3. A plurality of sense amplifiers $S_1$ to $S_3$ each structured equivalently to the sense amplifier 190 shown in FIG. 11 compare potentials M1 to M3 of bit lines corresponding to the analog signal An with the reference potentials m1 to m3 respectively and output the results of comparison as measured values α, β and γ respectively. If the bit line potential M1 is higher than the reference potential m1, for example, the measured value α goes low.

Figure 36:
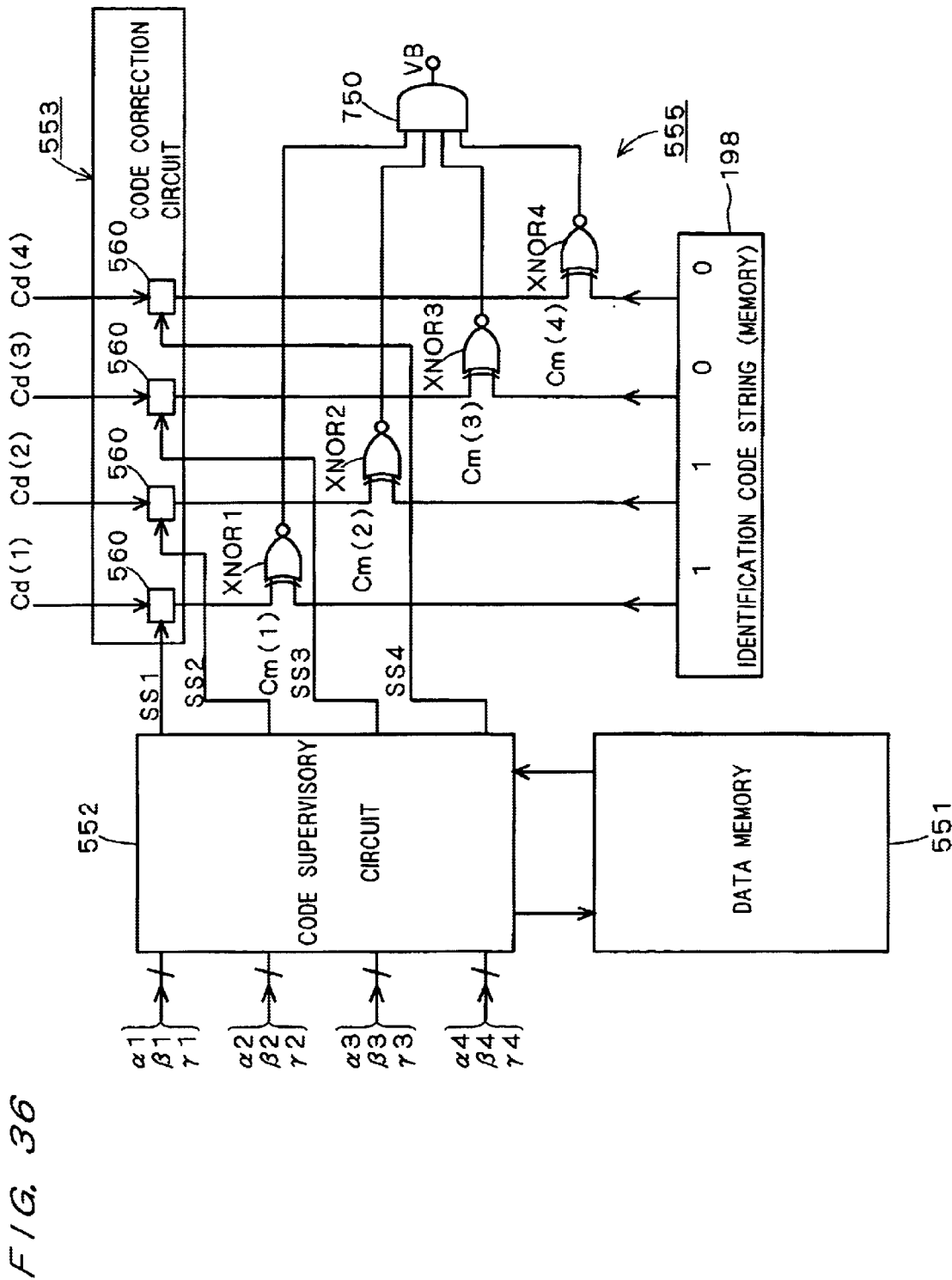
FIG. 36 is a circuit diagram of a word line determination circuit according to the ninth embodiment of the present invention.

FIG. 36 is a circuit diagram showing the internal structure of the word line determination circuit 555 along with the relation with the peripheral circuits thereof. Codes Cd(1) to Cd(4) of four bits output from the encoder circuit 402 are input in four bit correction circuits 560 provided on the code correction circuit 553. The four bit correction circuits 560 transmit the codes Cd(1) to Cd(4) in inverted or non-inverted states to first inputs of XNORs 1 to 4 provided on the word line determination circuit 555 as corrected codes Cm(1) to Cm(4) on the basis of selection signals SS1 to SS4 output from the code supervisory circuit 552.

In the code Co stored in the input code memory 198, four bits (values "1, 1, 0, 0" in FIG. 36) to be compared with the codes Cd(1) to Cd(4) are input in second inputs of the XNORs 1 to 4. Each of the XNORs 1 to 4 outputs a high-level signal when two input signals agree with each other, while outputting a low-level signal when the signals disagree with each other. The output signals from the XNORs 1 to 4 are input in a logical product circuit (hereinafter abbreviated as AND) 750. Only when the corrected codes Cm(1) to Cm(4) agree with the corresponding four bits of the code Co, therefore, the AND 750 outputs a high-level signal as the determination signal VB.

Figure 37:
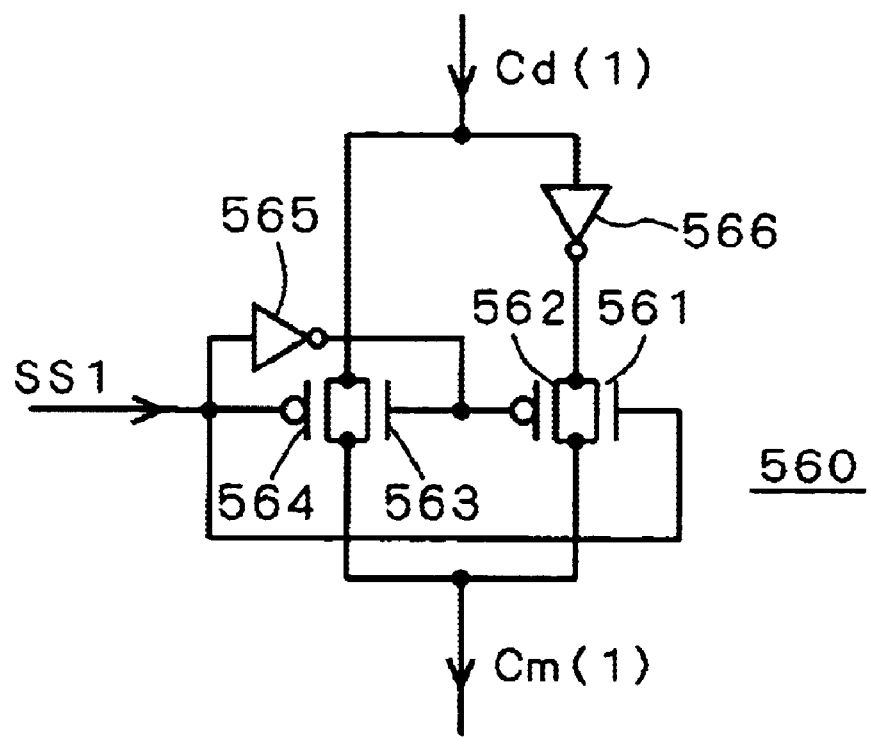
FIG. 37 is a circuit diagram of a correction circuit according to the ninth embodiment of the present invention.

FIG. 37 is a circuit diagram showing the internal structure of the bit correction circuit 560 receiving the code Cd(1), representing the four bit correction circuits 560. The bit correction circuit 560 has a transfer gate formed by an NMOS transistor 563 and a PMOS transistor 564 connected in parallel with each other and a transfer gate formed by an NMOS transistor 561 and a PMOS transistor 562 connected in parallel with each other, similarly to the selection circuit 413 shown in FIG. 14. Only one of the two transfer gates selectively conducts by the selection signal SS1 and an inverted signal thereof obtained through an inverter 565.

The code Cd(1) is input in an input part of one of the transfer gates while an inverted signal of the code Cd(1) inverted by an inverter is input in an input part of the other transfer gate. Output parts of both transfer gates are connected to the XNOR 1 (FIG. 36). Therefore, the code Cd(1) is inverted and transmitted to the XNOR 1 as the corrected code Cm(1) if the selection signal SS1 is high, while the code Cd(1) is not inserted but transmitted as it is to the XNOR 1 as the corrected code Cm(1) if the selection signal SS1 is low.

Figure 38:
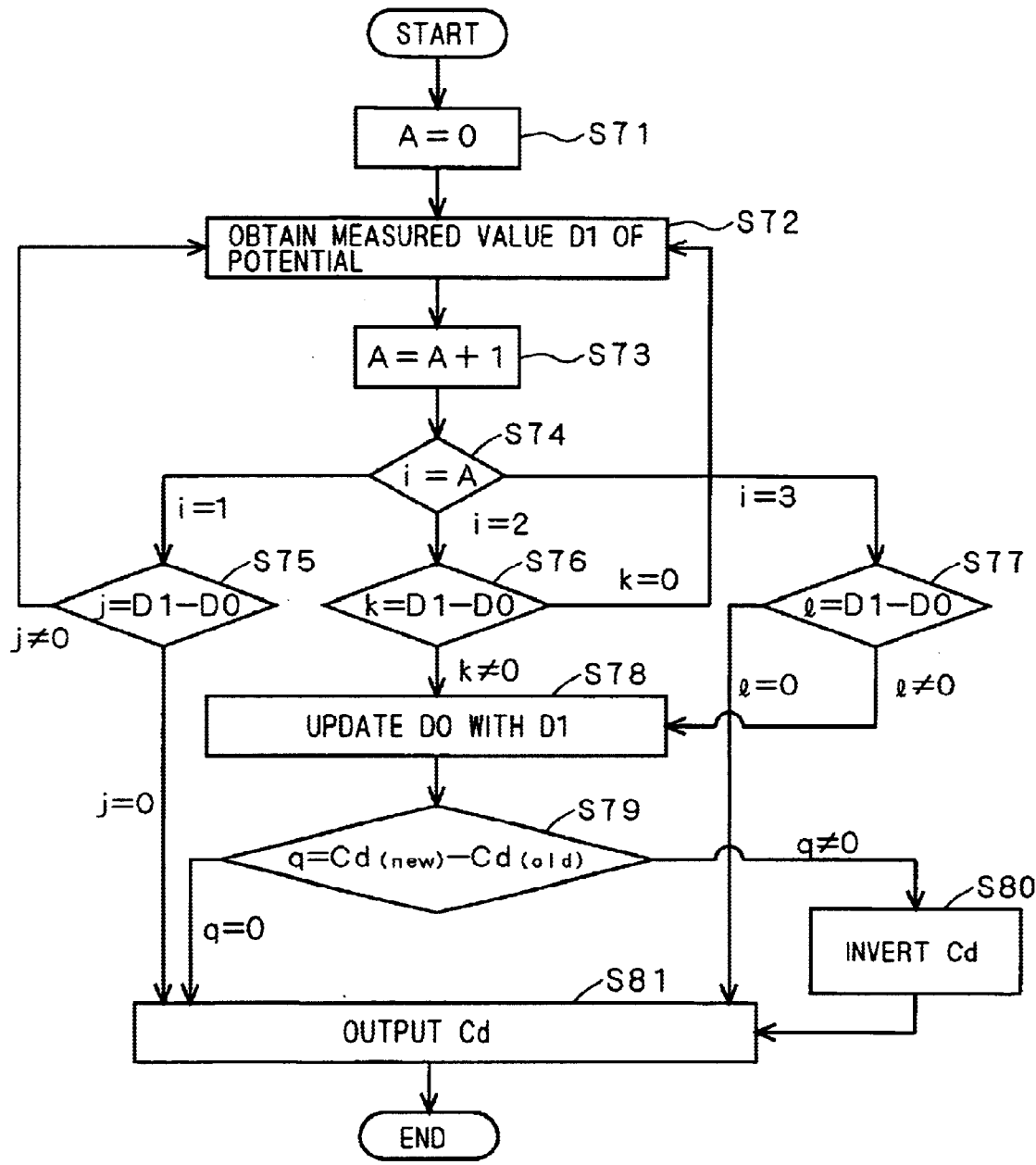
FIG. 38 is a process flow chart of a code supervisory circuit according to the ninth embodiment of the present invention.

FIG. 38 is a flow chart showing operations of the code supervisory circuit 552. This processing is performed for each bit line BL of the semiconductor element 401. In order to implement the operations shown in FIG. 38, the code supervisory circuit 552 may have a CPU and a memory storing a program defining the operations of the CPU, for example. When the operations are started, an initial value "0" is set to a variable A at a step S71. Then, the measured value α, β or γ of the potential of the bit line is obtained at a step S72. It is assumed that the bit line BL1 is selected here. It is also assumed that D1 represents the newly obtained measured value.

Then, the variable A is incremented by a value "1" at a step S73. Then, the value of the variable A is supplied to a variable i at a step S74. The flow of the processing is branched in response to the value of the variable i. If the variable i is "1", the difference between the measured value D1 and a previously obtained measured value D0 stored in the data memory 551 is supplied to a variable j at a step S75. If the variable j is "0", the processing advances to a step S81 for setting a control variable SS1 low in order to output the code Cd(1) to the XNOR 1 with no inversion. When the processing at the step S81 is completed, the processing on the bit line BL1 is terminated and similar processing is repeated on a new bit line if the remaining bit lines are not yet processed. If the variable j is not "0" at the step S75, the processing returns to the step S72.

If the variable i is "2" at the step S74, the processing advances to a step S76 for supplying the difference between the measured values D1 and D0 to a variable k. If the variable k is not "0", the measured value D0 stored in the data memory 551 is updated with the new measured value D1 at a step S78. Thereafter the difference between the new value of the code Cd(1) and the previous value of the code Cd(1) is calculated and supplied to a variable q at a step S79. If the variable q is "0", the control variable SS1 is set low at a step S81 in order to output the code Cd(1) to the XNOR 1 with no inversion. If the variable q is not "0" at the step S79, the code Cd(1) is determined to be inverted at a step S80 and the control variable SS1 is set high at the subsequent step S81 in order to invert the code Cd(1) and output the inverted code to the XNOR 1.

If the variable i is "3" at the step S74, the processing advances to a step S77 for supplying the difference between the measured values D1 and D0 to a variable 1. If the variable 1 is "0", the control variable SS1 is set low in order to output the code Cd(1) to the XNOR 1 with no inversion at the step S81. If the variable 1 is not "0", the processing advances to the step S78.

Thus, the code supervisory circuit 552 determines whether or not the code Cd(1) changes only when difference between the new measured value D1 and the previous measured value D0 is confirmed twice through measurement up to three times at the maximum and instructs the code correction circuit 553 to return the new measured value to the original value if the determination is of YES. The comparator circuit 403b according to this embodiment operates as described above, and hence a malfunction is hardly caused in the result of comparison between the codes Cd and Co even if the characteristics of the TFTs 101 are changed by −BT stress or the like.

Tenth Embodiment

Figure 39:
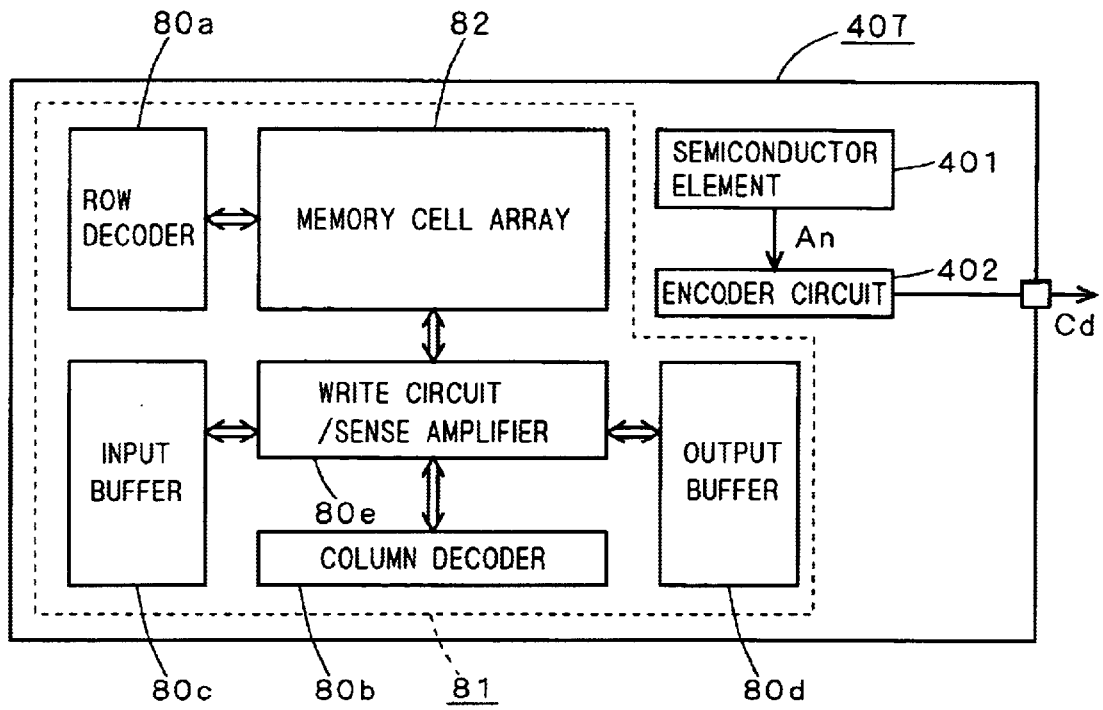
FIG. 39 is a block diagram of a semiconductor device according to a tenth embodiment of the present invention.

With reference to the tenth embodiment of the present invention, another preferred mode is described as to the semiconductor device 400 (FIG. 5). FIG. 39 is a block diagram of a semiconductor device 407 comprising a static RAM (hereinafter abbreviated as SRAM) 81, a semiconductor element 401 and an encoder circuit 402 on a single semiconductor chip. The SRAM 81 includes a memory cell array 82, a row decoder 80a, a column decoder 80b, an input buffer 80c, an output buffer 80d and a write circuit sense amplifier 80e. A plurality of memory cells (not shown) are arranged on the memory cell array 82 in the form of a matrix.

Figure 40:
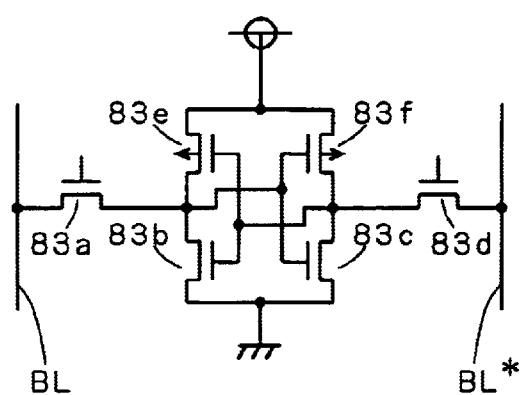
FIG. 40 is a circuit diagram of a memory cell according to the tenth embodiment of the present invention.

FIG. 40 is a circuit diagram showing the internal structure of a single memory cell. The memory cell includes MOS transistors 83b, 83c, 83e and 83f, and is connected with bit lines BL and BL* through transfer gates 83a and 83d. A data signal and an inverted signal thereof are written in or read from the memory cell through the bit lines BL and BL*.

In the memory cell shown in FIG. 40, at least partial MOS transistors, e.g., the MOS transistors 83e and 83f are formed as TFTs. Such an SRAM provided with a memory cell having partial MOS transistors formed by TFTs itself is well known in the art. The feature of the semiconductor device 407 according to this embodiment resides in that the SRAM 81 including TFTs in the memory cells and the semiconductor element 401 (e.g., the semiconductor element 401a) similarly having TFTs 101 are formed on the single semiconductor chip with further provision of the encoder circuit 402 so that the TFTs 101 are employed for encoding dissimilarly to the TFTs of the memory cells.

The characteristics of the TFTs included in the memory cells are preferably not dispersed. Therefore, it is preferable that the gate length and the gate width of the TFTs provided on the memory cells are set larger than those of the TFTs 101.

A system utilizing the SRAM 81 is extensively present. Therefore, a function of identification can be added to the extensive system by assembling the semiconductor element 401 and the encoder circuit 402 together with the SRAM 81. Further, the SRAM 81 includes TFTs and hence the number of manufacturing steps and the cost required for adding the new TFTs 101 thereto can be reduced.

Eleventh Embodiment

Figure 41:
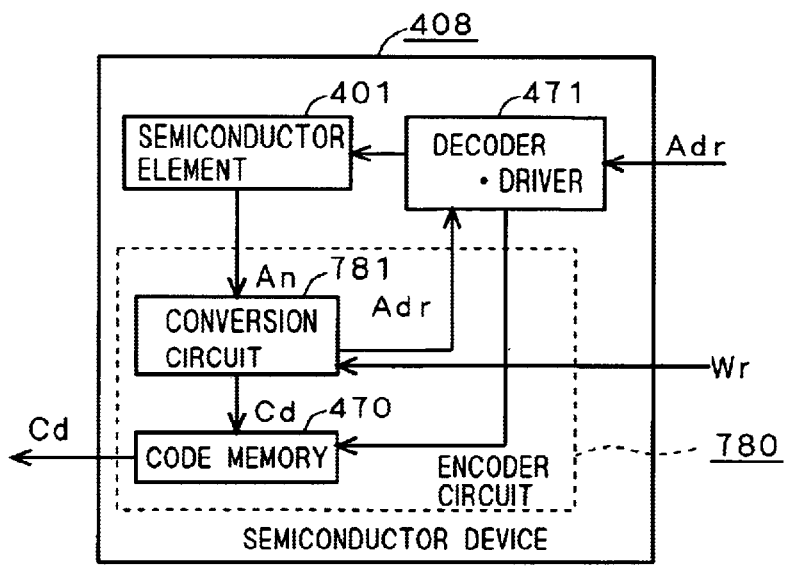
FIG. 41 is a block diagram of a semiconductor device according to an eleventh embodiment of the present invention.

With reference to the eleventh embodiment of the present invention, still another configuration is described in relation to the semiconductor device 400 (FIG. 5). FIG. 41 is a block diagram of a semiconductor device 408 formed as a semiconductor device of a single chip comprising a semiconductor element 401 and an encoder circuit 780. The encoder circuit 780 includes a conversion circuit 781 and a code memory 470. The conversion circuit 781, generating a code Cd on the basis of an analog signal An, is formed equivalently to the encoder circuit 402*a* (FIG. 11), for example. The code memory 470 stores the code Cd generated by the conversion circuit 781. The code memory 470 is a nonvolatile memory such as a flash memory, for example.

The conversion circuit 781 outputs the code Cd to the code memory 470 in response to an externally input write instruction signal Wr. The code memory 470 stores the code Cd output from the conversion circuit 781. When the semiconductor element 401 includes a plurality of word lines WL, the semiconductor device 408 preferably further comprises a decoder-driver 471. The conversion circuit 781 preferably outputs an address signal Adr sequentially specifying the plurality of word lines WL one by one in response to the write instruction signal Wr.

Further, the decoder-driver 471 or the conversion circuit 781 preferably transmits a signal specifying a different memory space in the code memory 470 to the code memory 470 every time a different word line WL is specified. The semiconductor device 408 can also be formed so that the address signal Adr is externally input in the decoder-driver 471 (FIG. 41 shows the address signal Adr as inputtable from both).

The output code Cd is read from the code memory 470. When the code Cd is recorded in the code memory 470 under a standard temperature and a standard power supply voltage in either one from the stage of manufacturing the semiconductor device 408 to a stage immediately before a user obtains the system assembled with the semiconductor device 408, therefore, an unchanged code Cd can thereafter be regularly obtained. In other words, a stable code Cd not fluctuated by a factor such as the temperature, the power supply voltage or −BT stress can be indefinitely obtained. The semiconductor device 408 is formed as a semiconductor device of a single chip, and hence illegal action of externally rewriting the recorded code Cd can be prevented dissimilarly to the conventional flash memory 908.

Twelfth Embodiment

Figure 42:
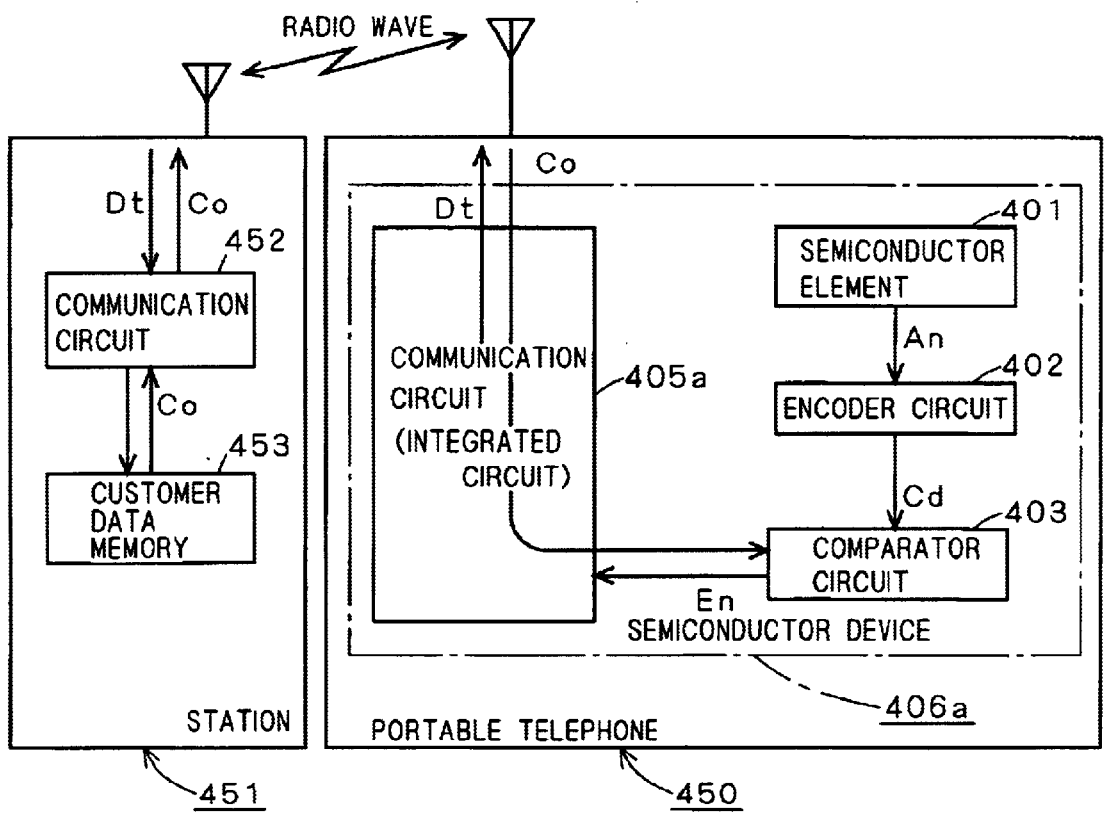
FIG. 42 is a block diagram of a communication system according to a twelfth embodiment of the present invention.

With reference to the twelfth embodiment of the present invention, application of the semiconductor device according to any of the first to eleventh embodiments to a user terminal (communication terminal) is described. FIG. 42 is a block diagram showing a semiconductor device 406*a* similar to the semiconductor device 406 shown in FIG. 7 assembled into a portable telephone 450 which is one of user terminals. The semiconductor device 406*a* assembled in the portable telephone 450 comprises a communication circuit 405*a* as the prescribed circuit 405.

Equipment 451 of a communications common carrier (referred to as "station" at need) mediating communication through the portable telephone 450 includes a customer data memory 453, in addition to a communication circuit 452. The customer data memory 453 stores a code Co to be compared with a code Cd. The communication circuits 405*a* and 452 transmit/receive data Dt such as voice to/from each other, while the communication circuit 452 transmits the code Co to the communication circuit 405*a* immediately after starting communication. Details of operations are described later.

Figure 43:
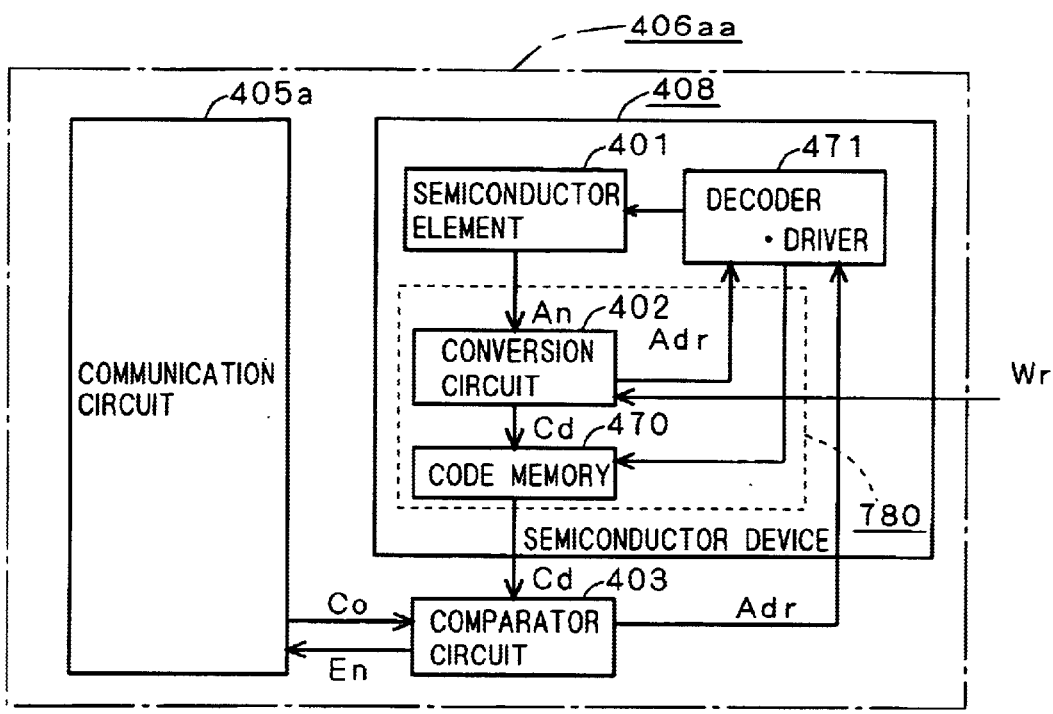
FIG. 43 is a block diagram of another semiconductor device according to the twelfth embodiment of the present invention.

The portable telephone 450 may include a semiconductor device 406*aa* shown in FIG. 43, in place of the semiconductor device 406*a*. The semiconductor device 406*aa* has the semiconductor device 408 shown in FIG. 41. When the user obtains the portable telephone 450, a code memory 470 stores the code Cd and compares the same with the code Co.

Figure 44:
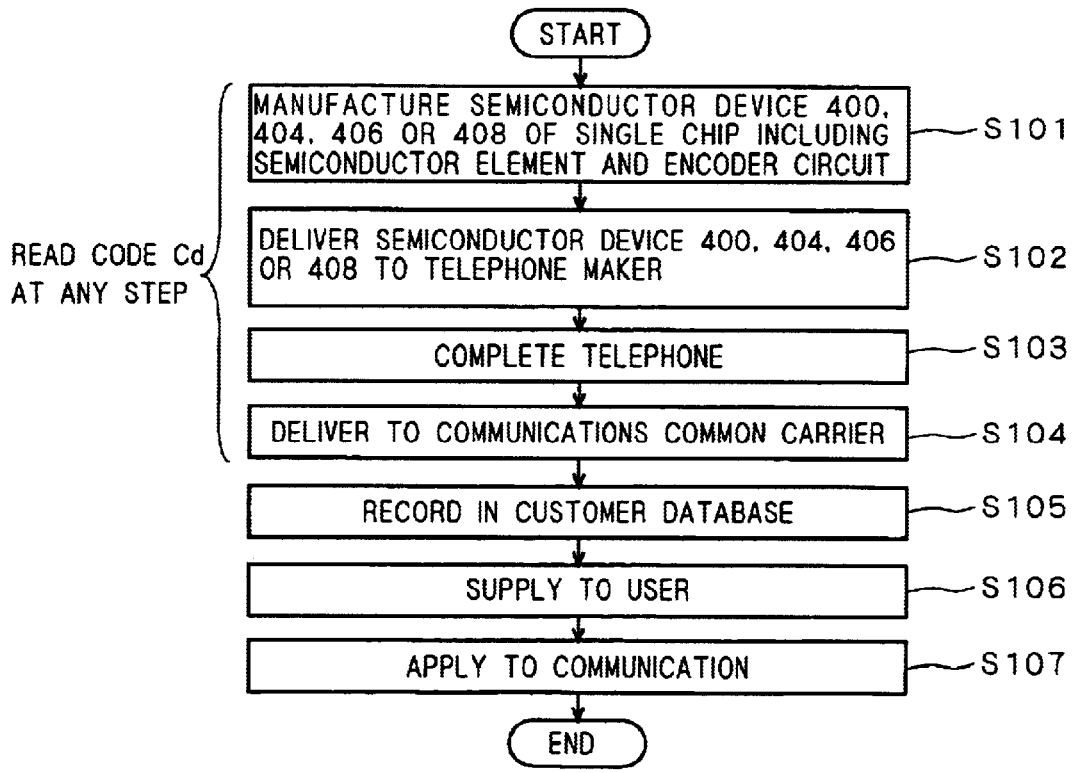
FIGS. 44 and 45 are process flow charts of the communication system according to the twelfth embodiment of the present invention.

FIG. 44 is a flow chart showing the flow of processing up to application of the portable telephone 450 to communication. First, the semiconductor device 400, 404, 406 or 408 to be provided on the portable telephone 450 as a part is manufactured at a step S101. The semiconductor device is manufactured as that of a single chip. At a subsequent step S102, the manufactured semiconductor device is delivered to a telephone maker. At a step S103, the telephone maker manufactures and completes the portable telephone 450 with the delivered semiconductor device. At a subsequent step S104, the completed portable telephone 450 is delivered to the communications common carrier.

In any stage through the aforementioned steps S101 to S104, the code Cd is read from the semiconductor device. If the portable telephone 450 utilizes a semiconductor device such as the semiconductor device 404*a* (FIG. 10), 404*b* (FIG. 12) or 404*c* (FIG. 13) enabling external readout of the code Cd, for example, the maker for the portable telephone 450 and the communications common carrier receiving the portable telephone 450 can read the code Cd in addition to the factory manufacturing the semiconductor device. The read code Cd is finally sent to the communications common carrier along with the portable telephone 450. The communications common carrier records the read code Cd in the customer data memory 453 as the code Co for authentication at a step S105.

Thereafter the portable telephone 450 is supplied to the user (customer) at a step S106. At this time, the communications common carrier may or may not inform the user of the code Cd. It is not necessary for the user to know the code Cd of the portable telephone 450 for implementing communication through authentication. Thereafter the user applies the portable telephone 450 to communication at a step S107.

If the portable telephone 450 has the semiconductor device 406*aa* shown in FIG. 43, the code Cd can be written in the code memory 470 in advance of reading the code Cd in any stage through the steps S101 to S104, similarly to reading of the code Cd.

Figure 45:
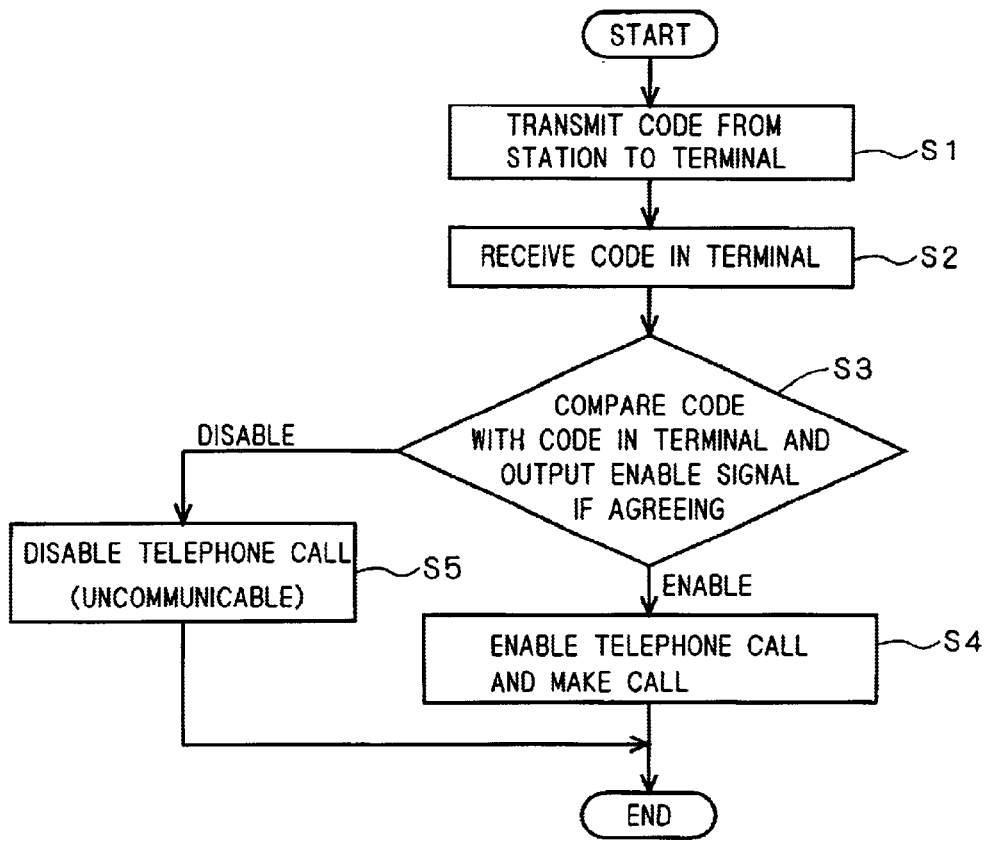

FIG. 45 is a flow chart showing the procedure of communication through the portable telephone 450, i.e., the internal flow of the step S107 (FIG. 44). When communication is started, the communications common carrier equipment 451 (FIG. 42) transmits the code Co to the portable telephone 450, which is the user terminal, at a step S1. At this time, the communication circuit 452 reads the code Co recorded in the customer data memory 453 and transmits the same.

Then, the portable telephone 450 receives the code Co at a step S2. At this time, the communication circuit 405*a* transmits the received code Co to the comparator circuit 403. Then, the comparator circuit 403 compares the code Co with the code Cd at a step S3, and outputs an enable signal En of a prescribed level (e.g., a high level) when determining that the codes Co and Cd agree with each other or approximate to each other in excess of a reference value.

When the enable signal En is output, the communication circuit 405*a* continues communication at a step S4. Thus, the portable telephone 450 and the communications common carrier equipment 451 transmit/receive the data Dt such as voice to/from each other. When the communication is completed, the processing is terminated.

If the enable signal En is not output at the step S3, the communication circuit 405*a* stops communication (Step S5). In other words, transmission/receiving of the data Dt such as voice is inhibited. Therefore, the communication is terminated. Thus, the code Cd is employed for authentication thereby preventing the portable telephone 450 from illegal use.

Figure 46:
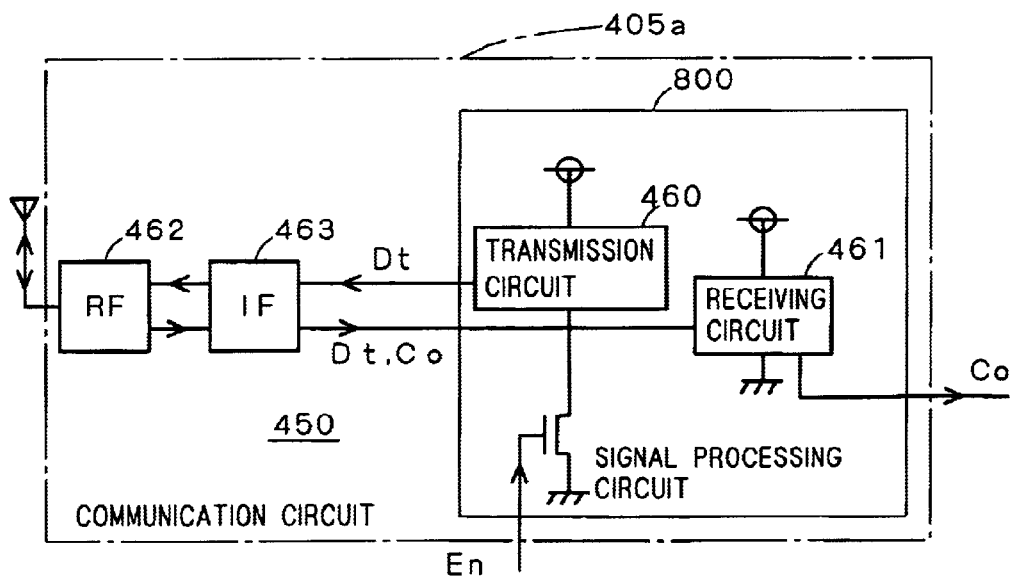
FIG. 46 is a block diagram of a communication circuit according to the twelfth embodiment of the present invention.

FIG. 46 is a block diagram showing the internal structure of the communication circuit 405a. In the communication circuit 405a provided on the portable telephone 450 mediating radio waves, a known radio frequency circuit 462 and a known intermediate frequency circuit 463 are interposed between an antenna and a signal processing circuit 800. The signal processing circuit 800 includes a transmission circuit 460 and a receiving circuit 461, and the receiving circuit 461 receives the code Co and transmits the same to the comparator circuit 403. Only the transmission circuit 460 may be turned on/off by the enable signal En.

While the above description has been made with reference to the portable telephone 450 utilizing radio waves employed as the user terminal, this embodiment is similarly applicable to a cable telephone making communication through a communication cable. The embodiment is not restricted to a telephone but is also applicable to any other user terminal.

Figure 47:
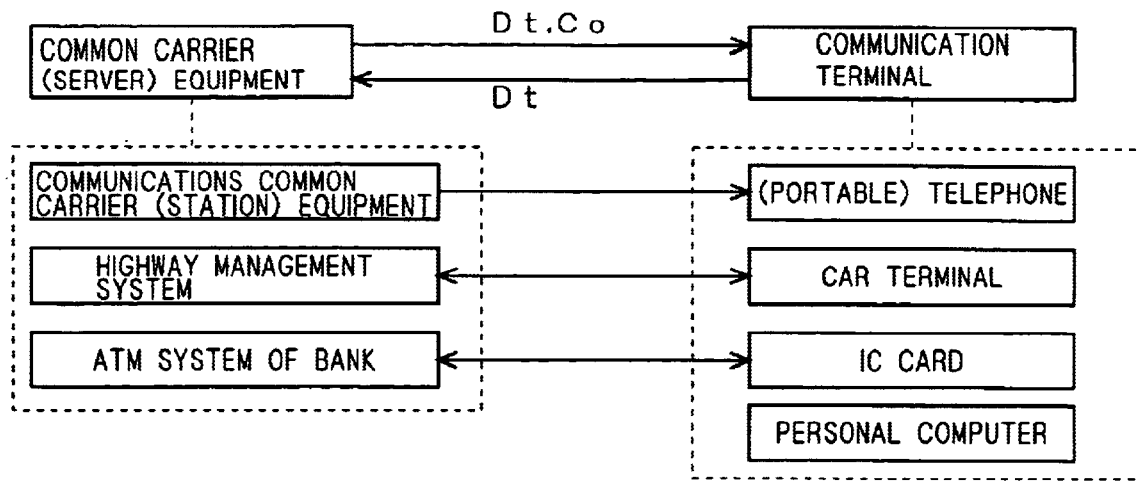
FIG. 47 is an explanatory diagram illustrating the communication system according to the twelfth embodiment of the present invention.

FIG. 47 illustrates various user terminals (communication terminals) to which the embodiment is applicable and communications common carrier equipments (servers) making communication with the user terminals. The user terminal may be a car terminal making communication with a highway management system automatically managing payment of highway fees or an IC card or a personal computer making communication with a bank ATM system for withdrawing cash or making a deposit. In any case, the communications common carrier equipment transmits the code Co and the user terminal compares the code Cd with another code for executing authentication.

Thirteenth Embodiment

Figure 48:
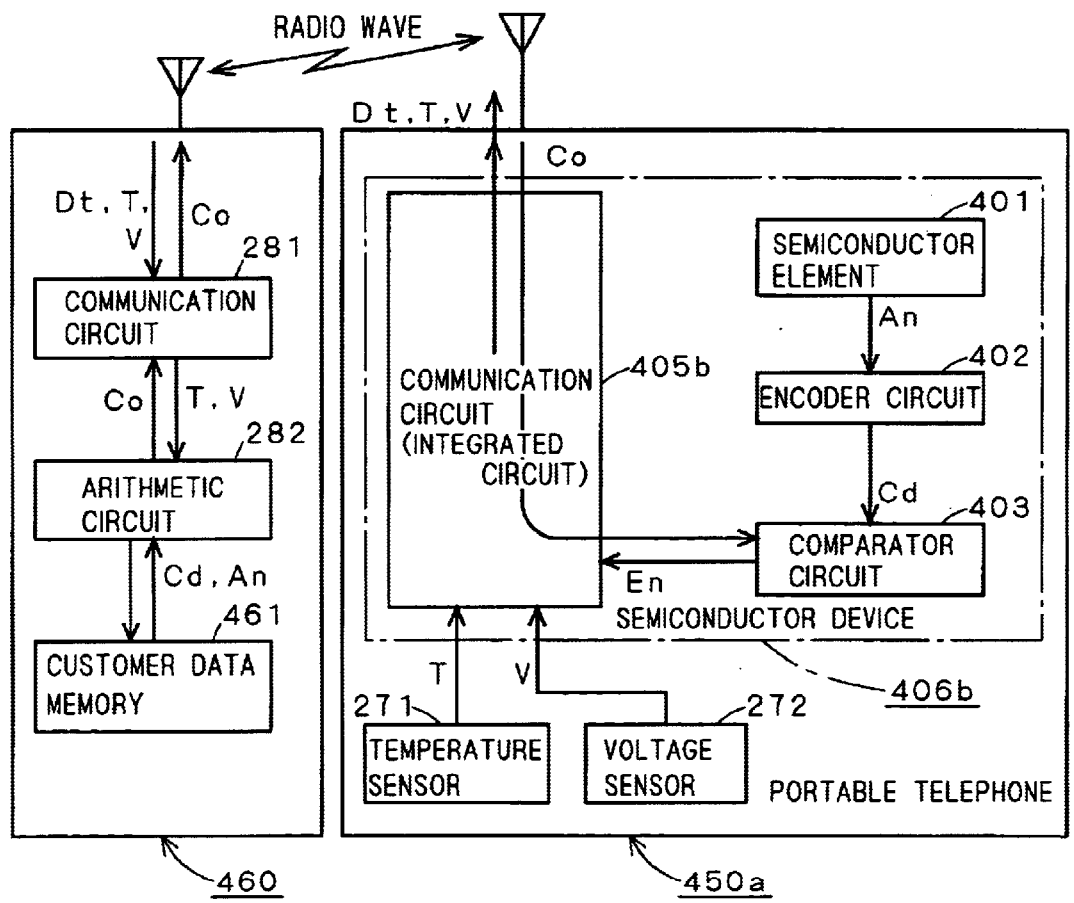
FIG. 48 is a block diagram of a communication system according to a thirteenth embodiment of the present invention.

With reference to the thirteenth embodiment of the present invention, a configuration eliminating influence by fluctuation of the characteristics of the semiconductor element 401 caused by the power supply voltage and the temperature is described in relation to application of a semiconductor device to a user terminal. FIG. 48 is a block diagram showing a semiconductor device 406b similar to the semiconductor device 406 shown in FIG. 7 assembled into a portable telephone 450a which is one of user terminals. The semiconductor device 406b provided on the portable telephone 450a comprises a communication circuit 405b as the prescribed circuit 405.

The portable telephone 450a further includes a temperature sensor 271 and a voltage sensor 272. The temperature sensor 271 detects the temperature of the semiconductor element 401 and transmits detected temperature data T to the communication circuit 405b. The temperature sensor 271 may directly measure the temperature of the semiconductor device 406b or the temperature of the air inside or outside the portable telephone 450a thereby indirectly (approximately) measuring the temperature of the semiconductor element 401. The voltage sensor 272 detects the power supply voltage for the semiconductor device 406b, particularly that for the semiconductor element 401, and transmits detected voltage data V to the communication circuit 405b.

Communications common carrier equipment 460 mediating communication through the portable telephone 450a includes an arithmetic circuit 282 and a customer data memory 461, in addition to a communication circuit 281. The customer data memory 461 stores a code Co to be compared with a code Cd or an analog signal An. The communication circuits 405b and 281 transmit/receive data Dt such as voice to/from each other while the communication circuit 405b transmits the temperature data T and the voltage data Tv to the communication circuit 405b immediately after starting communication. Thereafter the communication circuit 281 transmits the code Co to the communication circuit 405b. The arithmetic circuit 282 calculates the code Co in consideration of the temperature and the voltage on the basis of the temperature data T and the voltage data V. Details of operations are described later.

Figure 49:
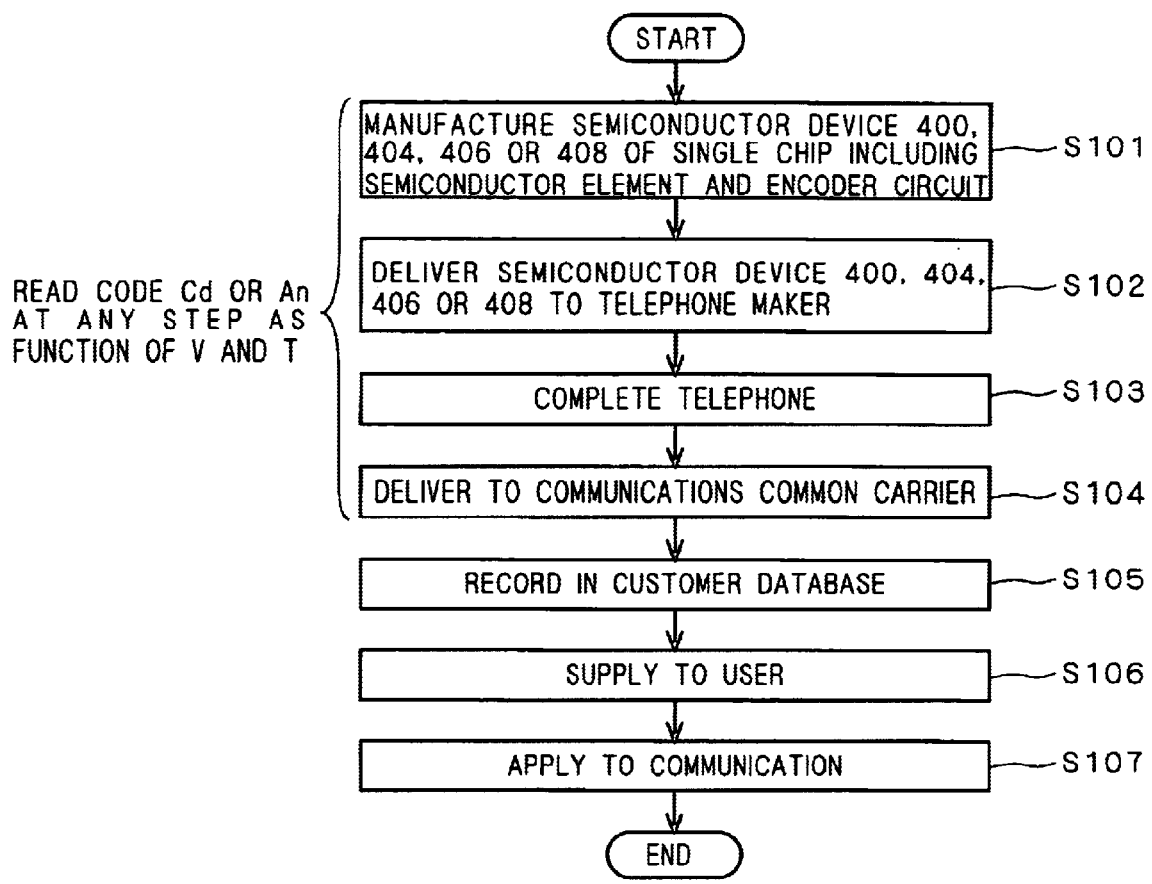
FIGS. 49 and 50 are process flow charts of the communication system according to the thirteenth embodiment of the present invention.

FIG. 49 is a flow chart showing the flow of processing up to application of the portable telephone 450a to communication. The code Cd of the semiconductor device or the analog signal An may be read in any stage through steps S101 to S104. The analog signal An is generally read in a factory manufacturing the semiconductor device, as described with reference to the second embodiment. The code Cd or the analog signal An is read while varying the temperature and the power supply voltage. In other words, the code Cd or the analog signal An is read under various temperatures and power supply voltages.

The read code Cd or analog signal An is finally transmitted to the communications common carrier along with the portable telephone 450a. The communications common carrier records the code Cd or the analog signal An as a function of the temperature and the power supply voltage in the customer data memory 461 at a step S105.

Figure 50:
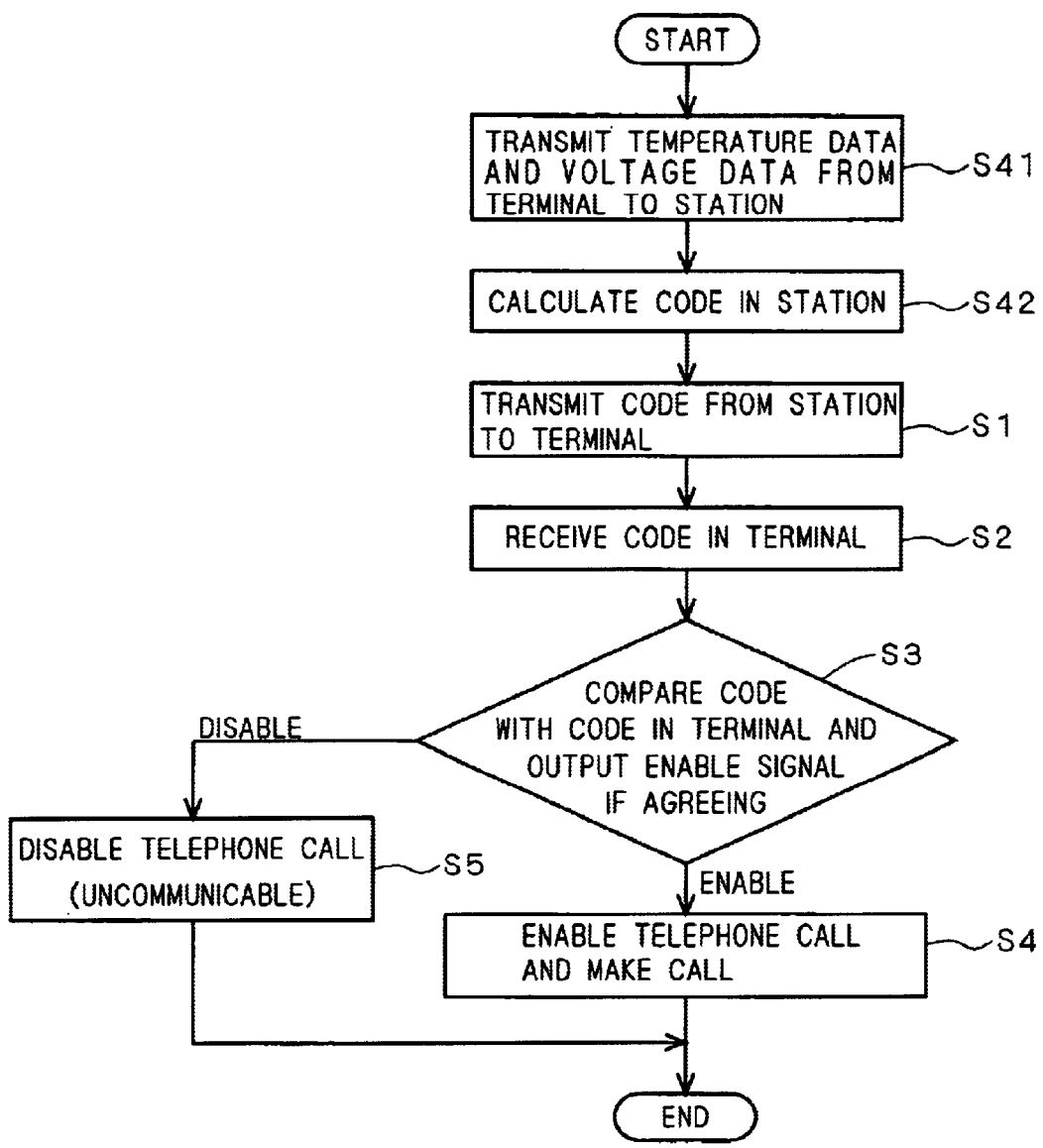

FIG. 50 is a flow chart showing the procedure of communication through the portable telephone 405a, i.e., the internal flow of a step S107 (FIG. 49). When communication is started at a step S41, the portable telephone 450a serving as the user terminal transmits the temperature data T and the voltage data V to the communications common carrier equipment 460. At this time, the communication circuit 405b transmits the temperature data T transmitted from the temperature sensor 271 and the voltage data V transmitted from the voltage sensor 272.

Then, the communications common carrier equipment 460 calculates the code Co at a step S42. At this time, the arithmetic circuit 282 receives the temperature data T and the voltage data V received in the communication circuit 281, reads the code Cd or the analog signal An from the customer data memory 461, and calculates the code Co corresponding to the temperature data T and the voltage data V on the basis of these data.

The arithmetic circuit 282 outputs the code Cd under the temperature and the power supply voltage agreeing with or most approximate to the temperature data T and the voltage data V selected from values under various temperatures and power supply voltages, for example, as the code Co. Alternatively, the arithmetic circuit 282 calculates the code Cd corresponding to the temperature data T and the voltage data Tv by well-known interpolation or function approximation on the basis of values of the code Cd under various temperatures and power supply voltages and outputs the same as the code Co.

Further alternatively, the arithmetic circuit 282 calculates the code Cd corresponding to the temperature data T and the voltage data V on the basis of the analog signal An under various temperatures and power supply voltages and outputs the same as the code Co. In this case, it is also possible to previously record the analog signal An expressing the characteristics of TFTs 101 or the like in the customer data memory 461 as a SPICE parameter and calculate the code Cd corresponding to the temperature data T and the voltage data V through the SPICE parameter. Thus, the quantity of data recorded in the customer data memory 461 can be reduced. The SPICE parameter is a known parameter employed in circuit simulation. Electric characteristics of TFTs or the like under various temperatures and voltages can be reproduced through several 10 to several 100 SPICE parameters.

At a step S1, the communications common carrier equipment 460 transmits the code Co to the portable telephone 450a. At this time, the communication circuit 281 transmits the code Co calculated by the arithmetic circuit 282. Processing following a step S2 is equivalent to that shown in FIG. 45, and hence redundant description is omitted. Thus, stable authentication can be executed while eliminating influence by the temperature and the power supply voltage by employing the user terminal according to this embodiment.

Fourteenth Embodiment

Figure 51:
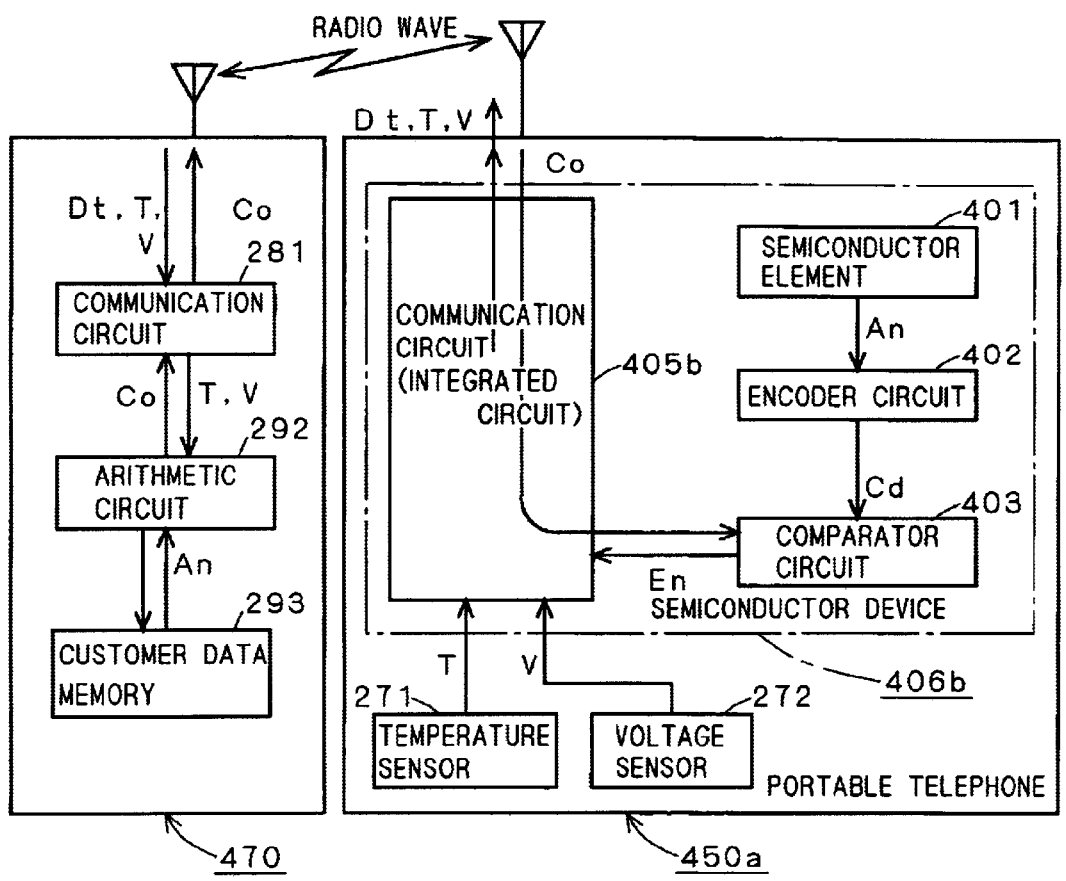
FIG. 51 is a block diagram of a communication system according to a fourteenth embodiment of the present invention.

With reference to the fourteenth embodiment of the present invention, a configuration for eliminating influence by fluctuation of the characteristics of the TFTs 101 provided on the semiconductor element 401 caused by −BT stress is described in relation to application of the semiconductor device to a user terminal. FIG. 51 is a block diagram showing the semiconductor device 406 of FIG. 7 in a portable telephone 450a similar to that shown in FIG. 48 employed as an exemplary user terminal.

Communications common carrier equipment 470 mediating communication through the portable telephone 450 includes an arithmetic circuit 292 and a customer data memory 293, in addition to a communication circuit 281. A communication circuit 405b and the communication circuit 281 transmit/receive data Dt such as voice to/from each other, while the communication circuit 405b transits temperature data T and voltage data V to the communication circuit 281 immediately after starting communication. Thereafter the communication circuit 281 transmits a code Co to the communication circuit 405b.

The customer data memory 293 stores previously received temperature data T and voltage data V as communication history, in addition to an analog signal An. The arithmetic circuit 292 calculates the code Co in consideration of the temperature and the voltage as well as influence by −BT stress on the basis of present temperature data T and voltage data V as well as the communication history. Details of operations are described later.

Figure 52:
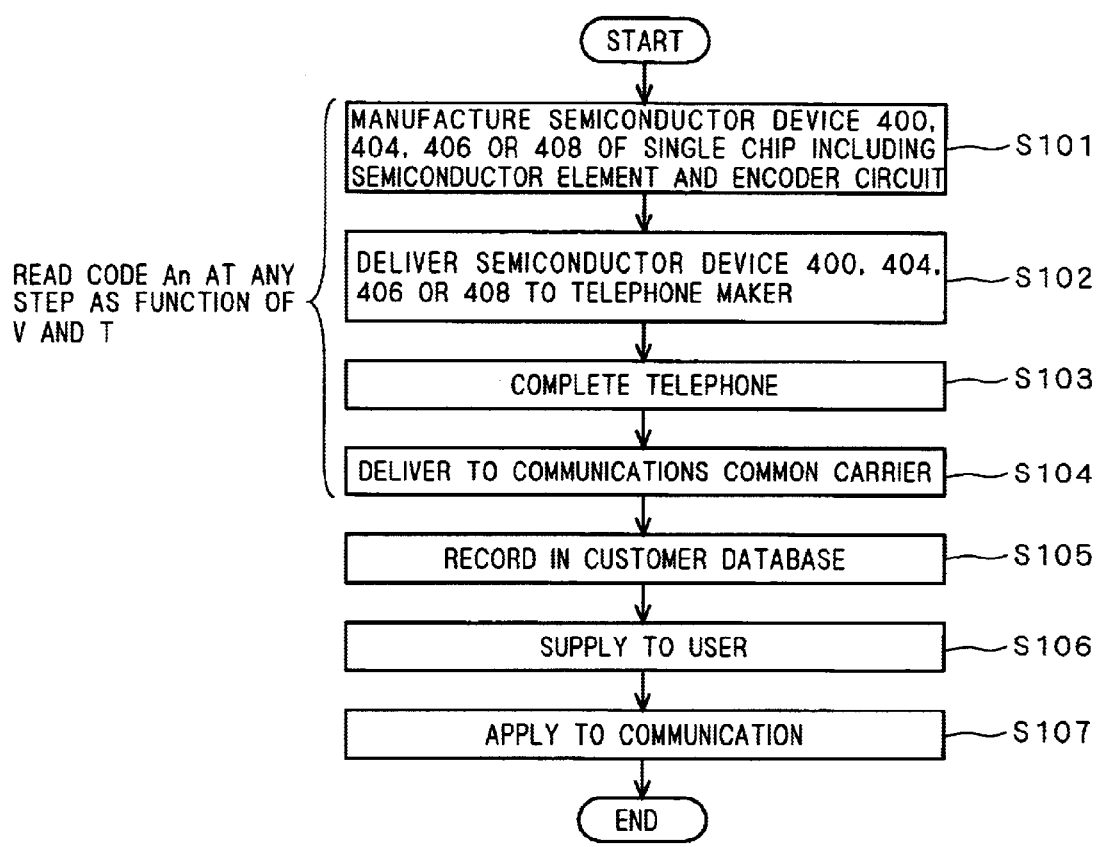
FIGS. 52 and 53 are process flow charts of the communication system according to the fourteenth embodiment of the present invention.

FIG. 52 is a flow chart showing the flow of processing up to application of the portable telephone 450a to communication. The analog signal An is read in any stage through steps S101 to S104 while varying the temperature and the power supply voltage. In other words, the analog signal An is read under various temperatures and power supply voltages. The read analog signal An is finally transmitted to the communications common carrier along with the portable telephone 450a. The communications common carrier records the analog signal An in the customer data memory 293 as a function of the temperature and the power supply voltage at a step S105.

Figure 53:
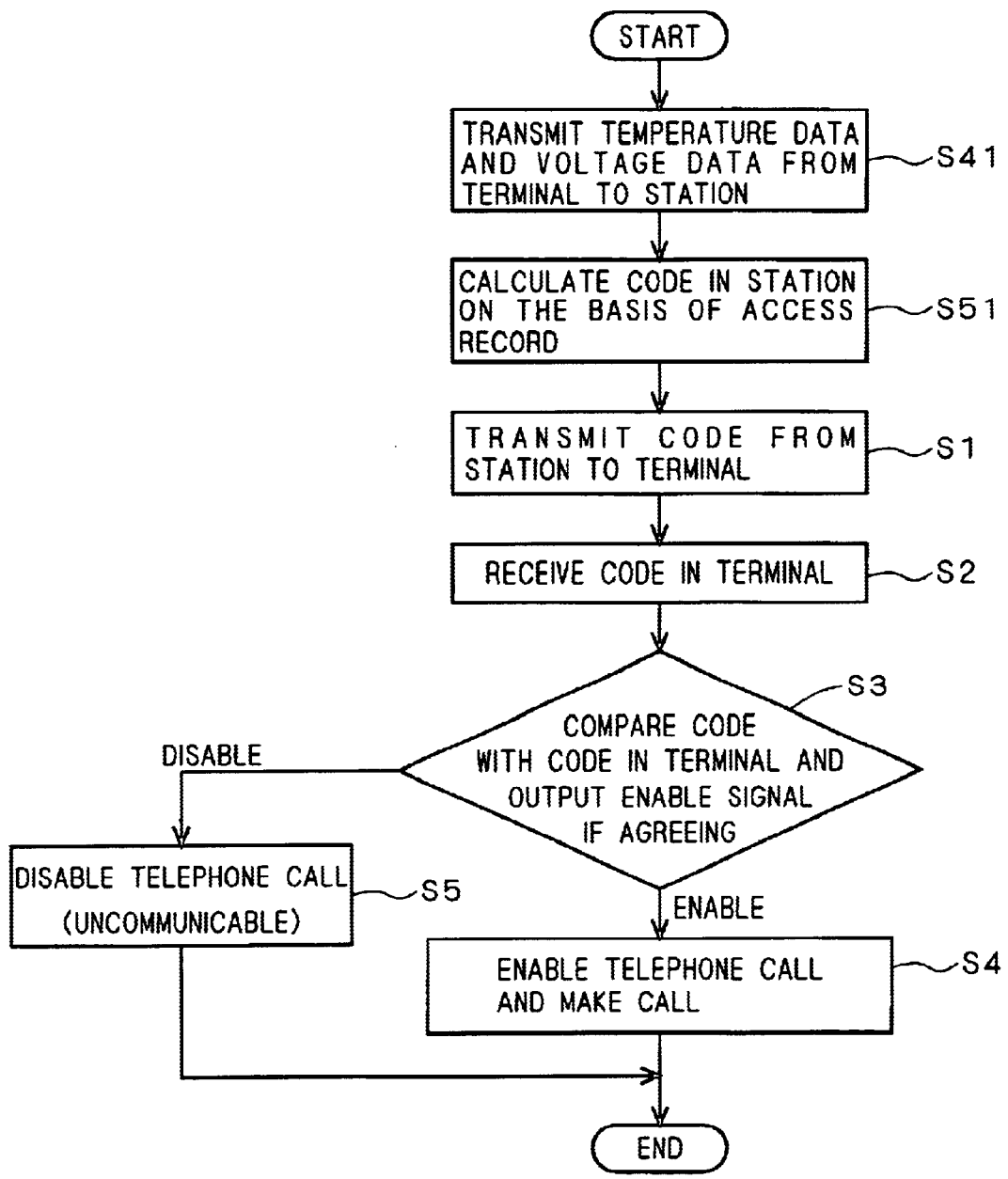

FIG. 53 is a flow chart showing the procedure of communication through the portable telephone 450a, i.e., the internal flow at a step S107 (FIG. 52). When communication is started, the portable telephone 450a serving as the user terminal transmits the temperature data T and the voltage data V to the communications common carrier equipment 470 at a step S41. Then, the communications common carrier equipment 470 calculates the code Co at a step S51. At this time, the arithmetic circuit 292 receives the temperature data T and the voltage data V received in the communication circuit 281, reads the analog signal An and the communication history from the customer data memory 293 and calculates the code Co corresponding to the present temperature data T and voltage data V in consideration of shifting of the characteristics heretofore caused by −BT stress.

Figures 54, 55:
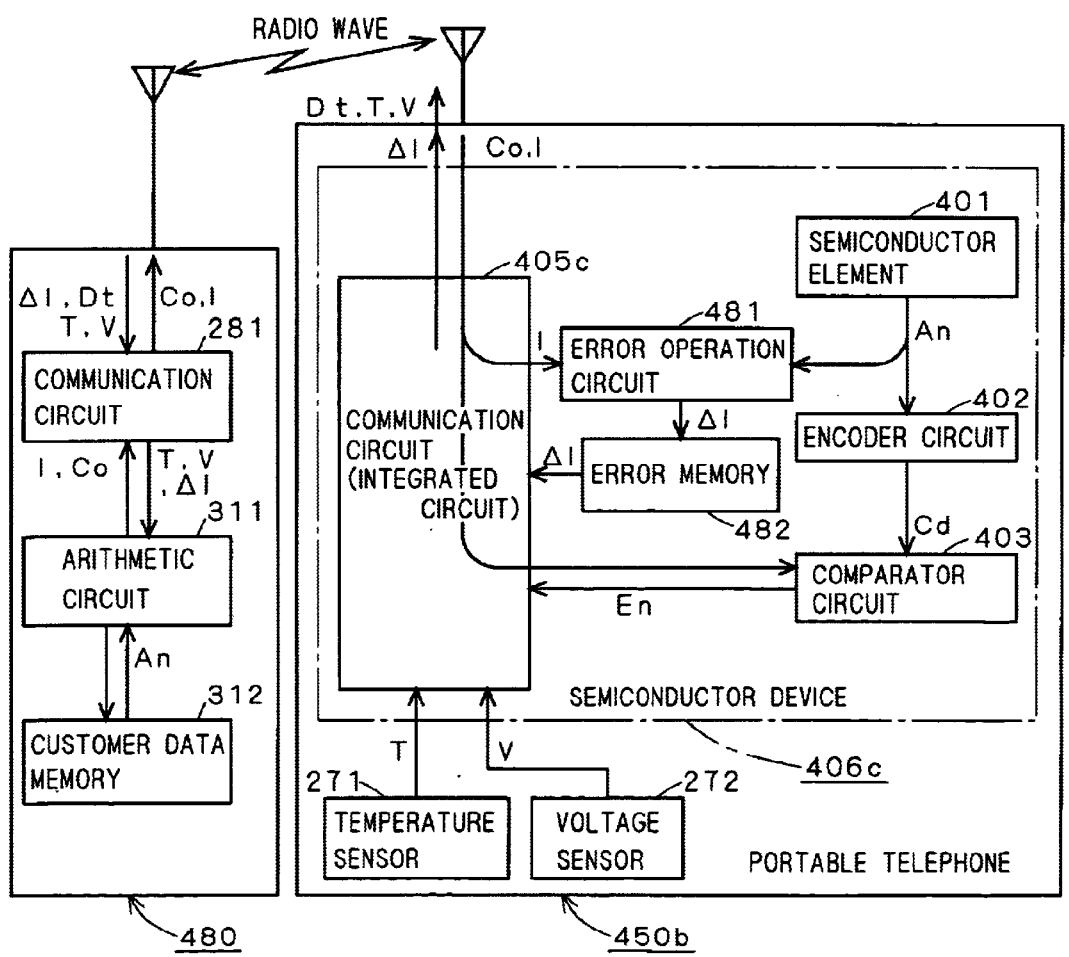
FIG. 54 is an operation explanatory diagram of the communication system according to the fourteenth embodiment of the present invention.
FIG. 55 is a block diagram of a communication system according to a fifteenth embodiment of the present invention.

FIG. 54 is an explanatory diagram illustrating data related to the communication history stored in the customer data memory 293 in the form of a table. The temperature data T and the voltage data V from first access to n-th (preceding) access are recorded as the communication history. As described with reference to the seventh embodiment, the shift quantity of the gate threshold voltage derived from −BT stress and the shift quantity of the analog signal An such as the drain current derived therefrom can be calculated from the temperature, the power supply voltage and the active time of the semiconductor element 401 on the basis of the well-known method described in literature 5 etc. The active time of the semiconductor element 401 for authentication in single access is known and hence only the temperature data T and the voltage data V for each access shown in FIG. 54 are sufficient as the data required for calculating the shift quantity.

The arithmetic circuit 292 calculates the shift quantity of the analog signal An for each previous communication (access). FIG. 54 illustrates exemplary numerical values on the right end. The arithmetic circuit 292 obtains the total shift quantity by summing up the shift quantities in previous communications.

The arithmetic circuit 292 further obtains the analog signal An under the present temperature data T and voltage data V on the basis of the analog signal An under various temperatures and power supply voltages and adding the aforementioned total shift quantity thereto for calculating the analog signal An in consideration of the present temperature and power supply voltage as well as the shift quantity caused by present −BT stress. The arithmetic circuit 292 converts the analog signal An to the code Cd. Thus, the code Cd is obtained in consideration of fluctuation by the temperature, the power supply voltage and −BT stress. This code Cd is transmitted to the communication circuit 281 as the code Co for comparison.

At a subsequent step S1 (FIG. 53), the communications common carrier equipment 470 transmits the code Co to the portable telephone 450a. At this time, the communication circuit 281 transmits the code Co calculated by the arithmetic circuit 292. Processing following a step S2 is equivalent to that shown in FIG. 45, and hence redundant description is omitted. At any point of time between receiving of the temperature data T and the voltage data V, and completion of communication, the received temperature data T and voltage data V are recorded in the customer data memory 293 from the communication circuit 282 as the communication history.

The shift quantity of the characteristics caused by −BT stress following the current communication is preferably calculated by the arithmetic circuit 292 and recorded in the customer data memory 293 at this point of time. Thus, it is possible to eliminate the time for repetitively calculating the previous shift quantity every time communication is made.

As hereinabove described, stable authentication can be executed while eliminating not only influence by the temperature and the power supply voltage but also influence by −BT stress by employing the user terminal according to this embodiment.

Fifteenth Embodiment

With reference to the fifteenth embodiment of the present invention, another mode of eliminating influence by fluctuation of the characteristics of the TFTs 101 provided on the semiconductor element 401 caused by −BT stress is described in relation to application of the semiconductor device to a user terminal. FIG. 55 is a block diagram showing a portable telephone 450b assembled with a semiconductor device 406c similar to the semiconductor device 406 shown in FIG. 7. The semiconductor device 406c provided on the portable telephone 450b comprises an error operation circuit 481 and an error memory 482 as well as a communication circuit 405c as the prescribed circuit 405.

The error operation circuit 481 compares an analog signal I transmitted from communications common carrier equipment 480 mediating communication through the portable telephone 450b with an analog signal An output from a semiconductor element 401 and calculates an error ΔI. The error memory 482 stores the calculated error ΔI.

The communications common carrier equipment 480 includes an arithmetic circuit 311 and a customer data memory 312, in addition to a communication circuit 281. The communication circuits 405c and 281 transmit/receive data Dt such as voice while the communication circuit 405c transmits temperature data T and voltage data V to the communication circuit 281. Thereafter the communication circuit 281 transmits a code Co and the analog signal I to the communication circuit 405c. Thereafter the communication circuit 405c transmits the error ΔI to the communication circuit 281.

The customer data memory 312 stores the analog signal An as a function of the temperature and the power supply voltage. The arithmetic circuit 311 calculates the code Co in consideration of the temperature and the voltage on the basis of the present temperature data T and voltage data V as well as in consideration of influence by −BT stress on the basis of an error ΔI calculated in preceding communication. Further, the arithmetic circuit 311 transmits the analog signal An forming the basis of the code Co as the analog signal I to the communication circuit 281 along with the code Co so that the portable telephone 450b can calculate the present error ΔI.

The flow of processing up to application of the portable telephone 450b to communication is expressed similarly to FIG. 52, and hence redundant description is omitted.

Figure 56:
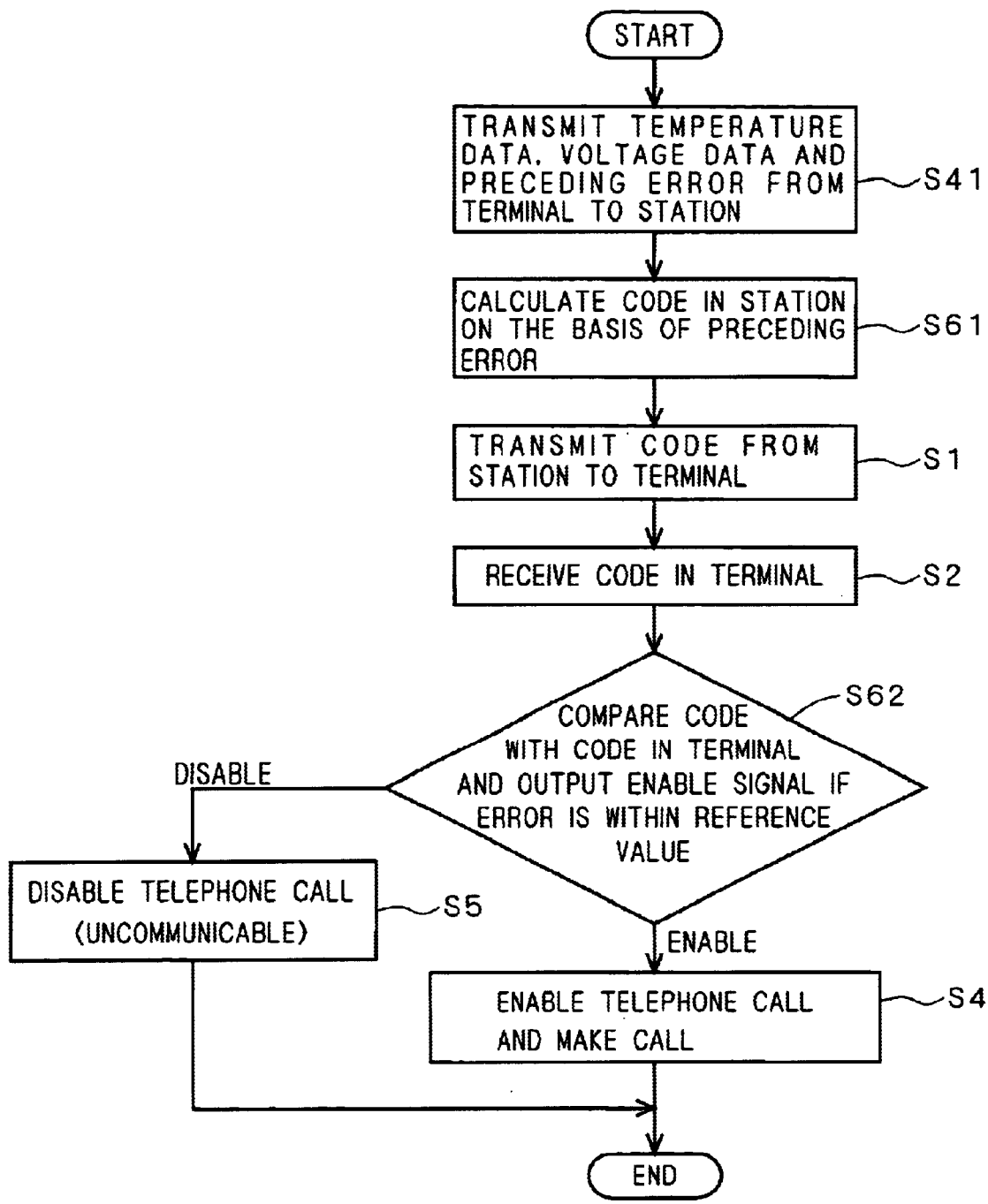
FIGS. 56 and 57 are process flow charts of the communication system according to the fifteenth embodiment of the present invention.

FIG. 56 is a flow chart showing the procedure of communication through the portable telephone 450b. When communication is started, the portable telephone 450b first transmits the error ΔI calculated in preceding communication and stored in the error memory 482 to the communications common carrier equipment 470 along with the temperature data T and the voltage data V at a step S41. At this time, the communication circuit 405c transmits the temperature data T transmitted from a temperature sensor 271, the voltage data V transmitted from a voltage sensor 272 and the error ΔI transmitted from the error memory 482.

Then, the communications common carrier equipment 470 calculates the code Co at a step S61. At this time, the arithmetic circuit 311 receives the temperature data T, the voltage data V and the error ΔI received in the communication circuit 281, reads the analog signal An as the function of the temperature and the voltage from the customer data memory 312 and calculates the code Co corresponding to the present temperature data T and voltage data V and in consideration of the error ΔI reflecting shifting by −BT stress on the basis of these data.

Figure 57:
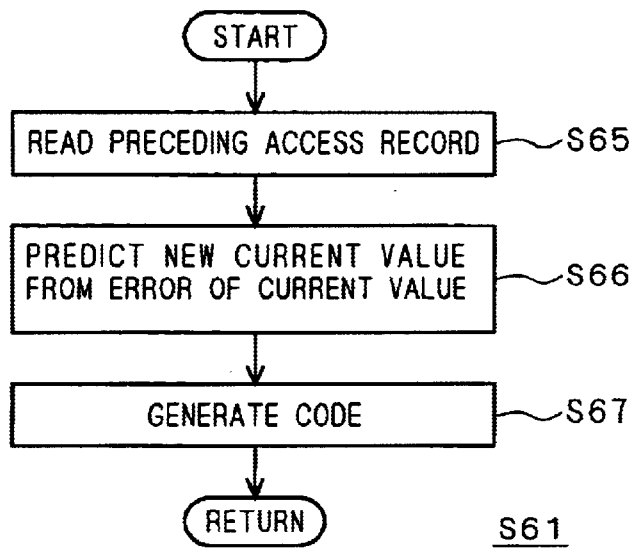

FIG. 57 is a flow chart showing the internal processing of the step S61. When the processing of the step S61 is started, the arithmetic circuit 311 first receives a preceding error ΔI corresponding to a preceding access record from the communication circuit 281 at a step S65. Then, the value of the present analog signal An is predicted from the error ΔI at a step S66. The temperature data T and the voltage data V are further reflected on this value. In other words, the analog signal An under the received temperature data T and voltage data V is calculated also in consideration of the error ΔI.

Thereafter the analog signal An is encoded in a procedure similar to that in the encoder circuit 402 at a step S67, thereby generating the code Cd. The arithmetic circuit 311 transmits the generated code Cd as the code Co for comparison and the analog signal An as the analog signal I for calculating the error.

Referring again to FIG. 56, the communications common carrier equipment 480 transmits the code Co and the analog signal I to the portable telephone 450b at a subsequent step S1. At this time, the communication circuit 281 transmits the code Co and the analog signal I calculated by the arithmetic circuit 311. At a step S2, the portable telephone 450b receives the code Co and the analog signal I. At this time, the communication circuit 405c transmits the received code Co to the comparator circuit 403 while transmitting the received analog signal I to the error operation circuit 481. The error operation circuit 481 calculates the error ΔI on the basis of the analog signal I and the analog signal An output from the semiconductor element 401 and records the same in the error memory 482 for next communication. The error ΔI reflects the shift quantity of the analog signal An caused by −BT stress in preceding communication.

Then, the comparator circuit 403 compares the code Co with the code Cd at a step S62, and outputs an enable signal En of a prescribed level (e.g., a high level) when determining that the codes Co and Cd agree with each other or approximate to each other in excess of a reference value. When the enable signal En is output, the communication circuit 405c continues communication at a step S4. When communication is completed, the processing is terminated. If no enable signal En is output at the step S62, the communication circuit 405c stops communication at a step S5.

As hereinabove described, stable authentication can be performed while eliminating not only influence by the temperature and the power supply voltage but also influence by −BT stress by employing the user terminal according to this embodiment.

Sixteenth Embodiment

Figure 58:
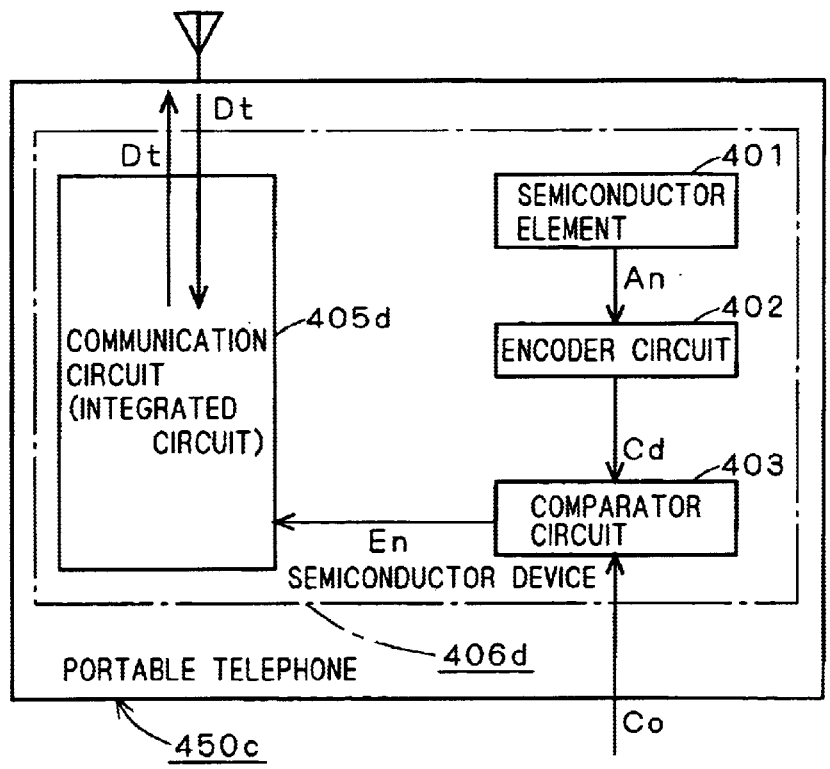
FIG. 58 is a block diagram of a communication system according to a sixteenth embodiment of the present invention.

With reference to the sixteenth embodiment of the present invention, a configuration employing a code Cd for determining a password is described in relation to application of the semiconductor device to a system or the like. FIG. 58 is a block diagram showing a portable telephone 450c assembled with a semiconductor device 406d similar to the semiconductor device 406 shown in FIG. 7. The semiconductor device 406d provided on the portable telephone 450c comprises a communication circuit 405d as the prescribed circuit 405.

A code Co compared with the code Cd is not transmitted from communications common carrier equipment (not shown) mediating communication through the portable telephone 450c but input by the user of the portable telephone 450c. Therefore, the code Co is input in a comparator circuit 403 without through the communication circuit 405d. In order to input the code Co, the user operates a dial button (not shown) provided on the portable telephone 450c, for example. The code Co functions as a password.

Figure 59:
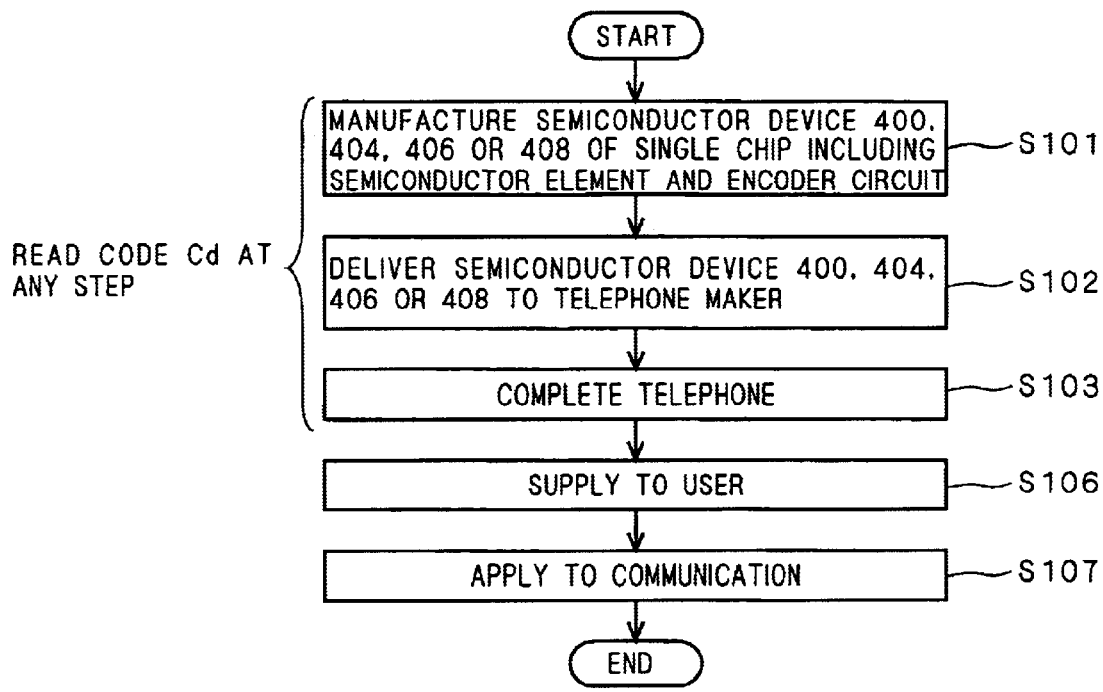
FIGS. 59 and 60 are process flow charts of the communication system according to the sixteenth embodiment of the present invention.

FIG. 59 is a flow chart showing the flow of processing up to application of the portable telephone 450c to communication. The code Cd is read in any stage through steps S101 to S103. When the step S103 is terminated, the portable telephone 450c is supplied to the user at a step S106. At this time, the user the is informed of read code Cd. Thereafter the user applies the portable telephone 450c to communication at a step S107. Thus, it is not necessary to inform the communications common carrier of the code Cd, dissimilarly to the processing shown in FIGS. 49 and 52.

Figure 60:
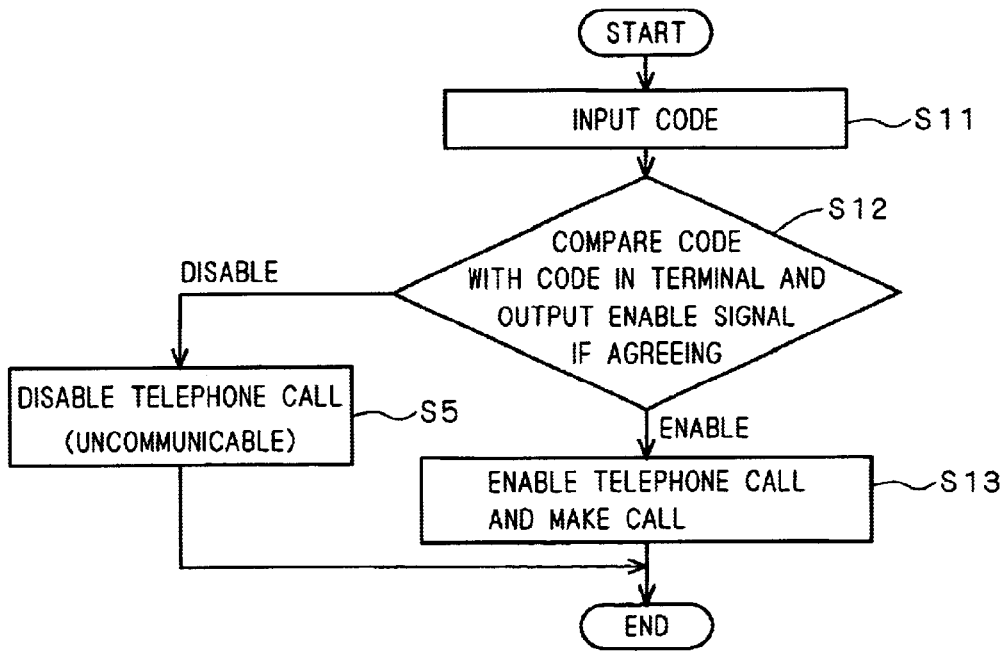

FIG. 60 is a flow chart showing the procedure of communication through the portable telephone 450c, i.e., the internal flow of the step S107 (FIG. 59). When communication is started, the user first inputs the code Co at a step S11. If the user is legal, he can input the previously informed code Cd as the code Co.

At a step S12, the comparator circuit 403 compares the code Co with the code Cd and outputs an enable signal En of a prescribed level (e.g., a high level) when determining that the codes Co and Cd agree with each other or approximate to each other in excess of a reference value. When the enable signal En is output, the communication circuit 405c continues communication at a step S13. Thus, the portable telephone 450c and the communications common carrier equipment transmit/receive data Dt such as voice to/from each other. When communication is completed, the processing is terminated.

If no enable signal En is output at the step S12, the communication circuit 405d stops communication at a step S5. In other words, transmission/receiving of the data Dt such as voice is inhibited. Therefore, communication is terminated. Thus, illegal use of the portable telephone 450c can be prevented by employing the code Cd for determination of the password.

Figure 61:
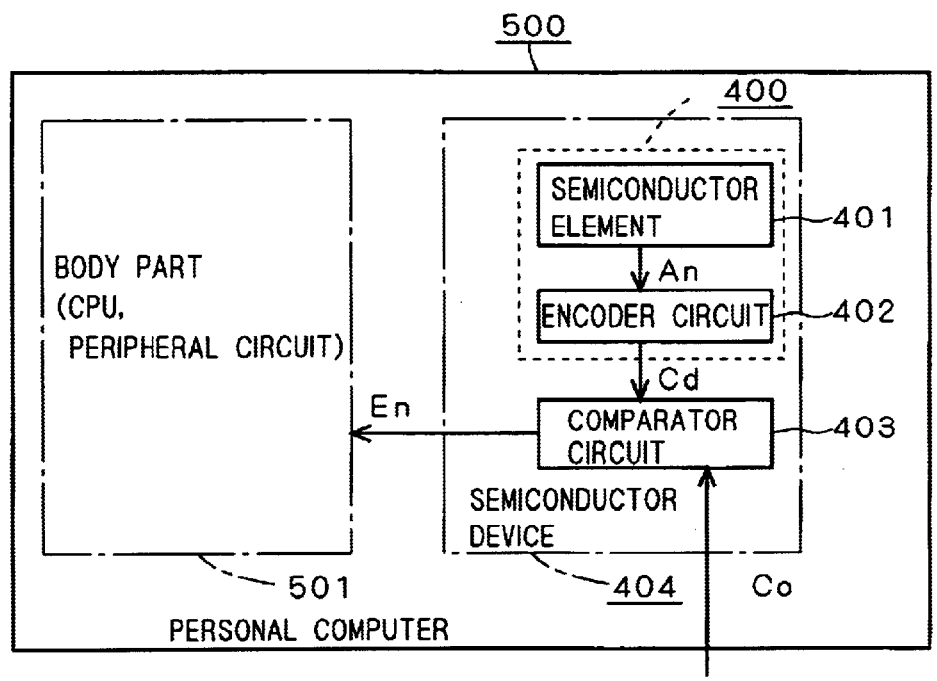
FIG. 61 is a block diagram of another communication system according to the sixteenth embodiment of the present invention.

The code Cd can be utilized for determining a password in various systems due to provision of the semiconductor device of the present invention. FIG. 61 is a block diagram showing a personal computer 500 to which the present invention is applied. The personal computer 500 includes the semiconductor device 404 shown in FIG. 6, in addition to a body part 501 including a CPU, a peripheral circuit and the like.

A comparator circuit 403 compares a code Co input by the user through an input unit (not shown) such as a keyboard provided on the personal computer 500 as a password with a code Cd output from an encoder circuit 402 and determines agreement or approximation therebetween. When confirming agreement or approximation, the comparator circuit 403 transmits an enable signal En to the body part 501. The body part 501 continues its operation when receiving the enable signal En, or stops its operation if the enable signal En is unreceivable. Thus, the code Cd can also be applied to determination of the password for the personal computer 500.

Seventeenth Embodiment

Figure 62:
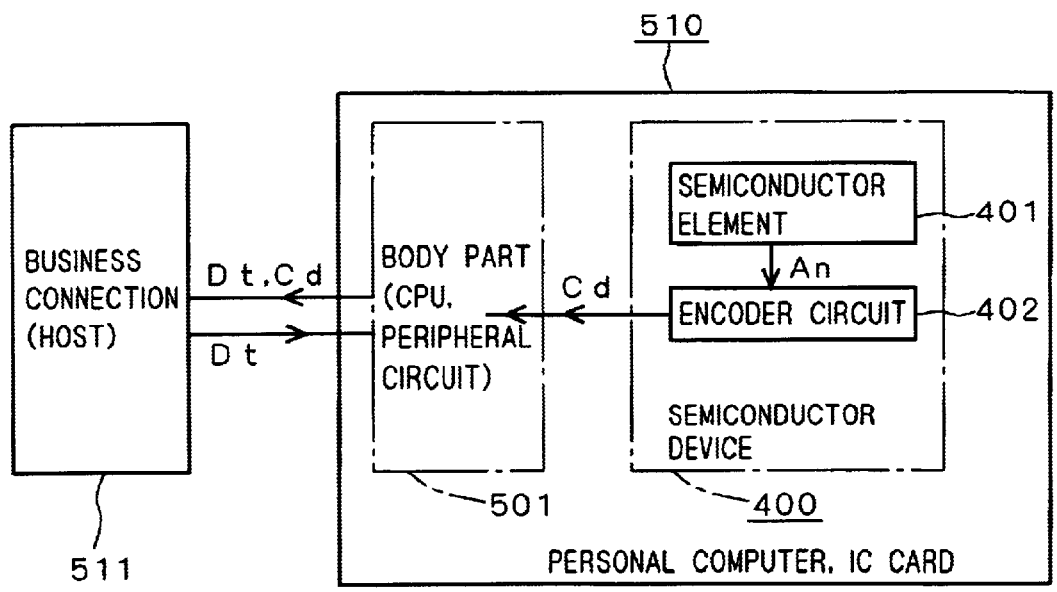
FIG. 62 is a block diagram of a communication system according to a seventeenth embodiment of the present invention.

With reference to the seventeenth embodiment of the present invention, a configuration applying a code Cd to an evidence seal substituting for a seal, a fingerprint or the like in transaction is described in relation to application of the semiconductor device to a user terminal. FIG. 62 is a block diagram showing a user terminal 510 assembled with the semiconductor device 400 shown in FIG. 5. The user terminal 510 is a personal computer or an IC card, for example, including a body part 501 having a CPU, a peripheral circuit and the like and connected with the semiconductor device 400.

The body part 501 transmits/receives data Dt related to business transaction to/from a business connection 511 while transmitting a code Cd supplied by an encoder circuit 402 to the business connection 511 as an evidence seal. The business connection 511 is a bank, a credit company, an electronic business transaction authentication company or the like, for example.

Neither the business connection 511 nor the user terminal 510 may know the code Cd while neither the code Cd nor analog signal An may be previously read in a factory manufacturing the semiconductor device 400 or the like. Therefore, the manufacturing cost for the semiconductor device 400 or the user terminal 510 can be reduced.

Figure 63:
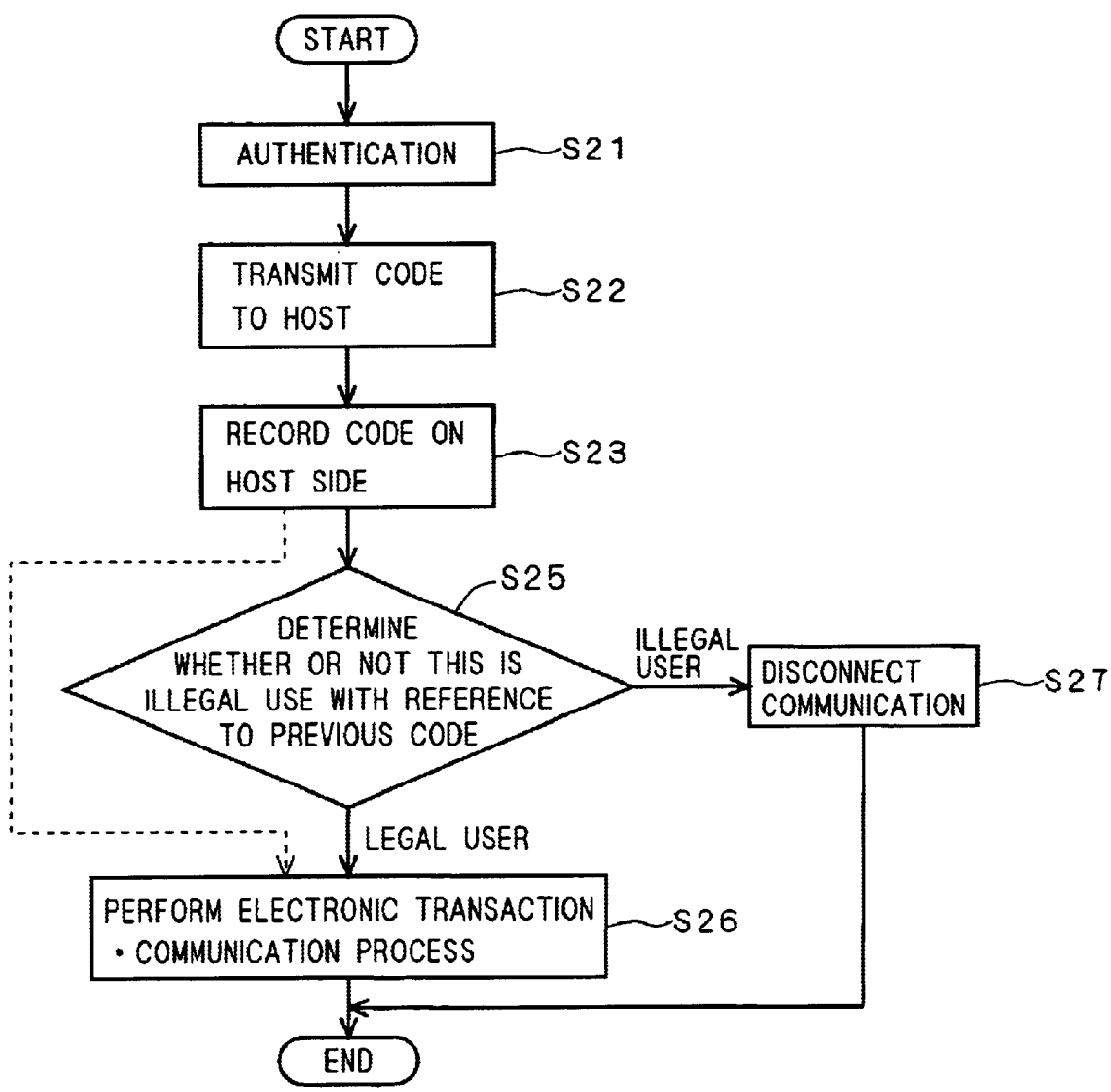
FIG. 63 is a process flow chart of the communication system according to the seventeenth embodiment of the present invention.

FIG. 63 is a flow chart showing the procedure of business transaction through the user terminal 510. When the business transaction is started, authentication is performed at a step S21. This authentication is performed along a conventional manner through a password without the code Cd, and hence detailed description is omitted. The password, recorded in a magnetic recording medium, for example, is technically rewritable.

Then, the user terminal 510 transmits the code Cd to the business connection 511 as an evidence seal at a step S22. At this time, the body part 501 transmits the code Cd supplied from the encoder circuit 402. As described with reference to the first embodiment, the characteristics of the semiconductor element 401 forming the basis of the code Cd cannot be externally changed, dissimilarly to the password employed at the step S21. Security can be further improved by forming the semiconductor device 400 as that of a single chip, as described with reference to the first embodiment.

Then, the business connection 511 records the code Cd at a step S23. Thereafter the processing advances to a step S26 for making communication for electronic business transaction in general. In other words, the business connection 511 and the user terminal 510 make communication of the data Dt related to business transaction. When the communication for business transaction is completed, all processing is terminated. Thus, the code Cd is recorded for each communication, to attain a mental effect of preventing a crime.

At a step S25 between the steps S23 and S26, the business connection 511 can determine whether or not the access from the user terminal 510 is illegal use by an unrightful user. For this determination, the business connection 511 preferably previously records the code Cd, similarly to the communications common carrier in the twelfth embodiment. In this case, the code Cd is read and informed to the business connection 511 in any stage before the user terminal 510 is delivered to the user, similarly to the twelfth embodiment.

At the step S25, the business connection 511 compares the recorded code Cd with the code Cd transmitted from the user terminal 510 and determines agreement or approximation. When agreement or approximation is confirmed, the processing at the step S26 is authorized. If neither agreement nor approximation is confirmed, the user is determined as unrightful and the communication is cut (stopped) at a step S27. Even if the code Cd is not previously recorded, a code different from the previous code of the legal user can be determined as illegal at the step S25 when the legal user feeling doubtful about the fee charged to his bank account suggests illegal use, for example.

Eighteenth Embodiment

In relation to the eighteenth embodiment of the present invention, a configuration employing a code Cd for generating a CDMA code (diffusion code) in a CDMA communication system is described in relation to application of the semiconductor device to a user terminal. The CDMA (code division multiple access) communication system, which is a standard portable telephone communication system in the U.S.A., implements multiplex communication with a low crosstalk level by sharing a pseudo-random code called a diffusion code by a sending terminal and a receiving terminal and performing modulation and demodulation on the basis of the code data. The CDMA system is well known through "Spectrum Kakusan Tsushin Gijutsu: Saishin Oyo Report-Shu" supervised by Yasuo Kadokawa, issued by Nihon Gijutsu Keizai Center on Jan. 30, 1987 (hereinafter referred to as literature 6), for example, and hence detailed description thereof is omitted.

Figure 64:
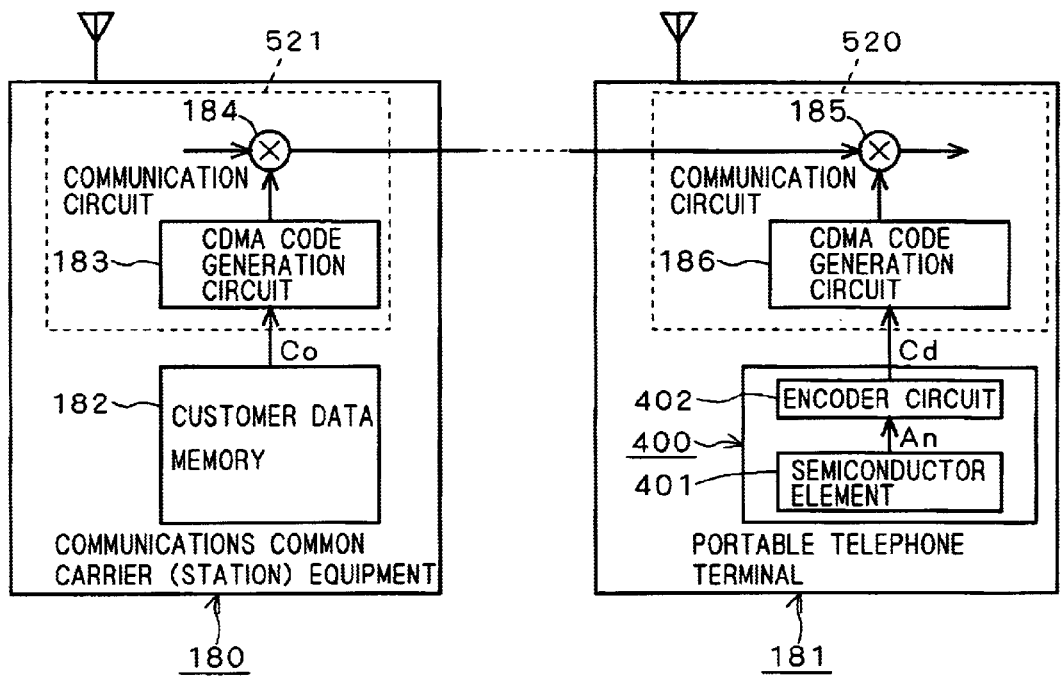
FIG. 64 is a block diagram of a communication system according to an eighteenth embodiment of the present invention.
Figure 65:
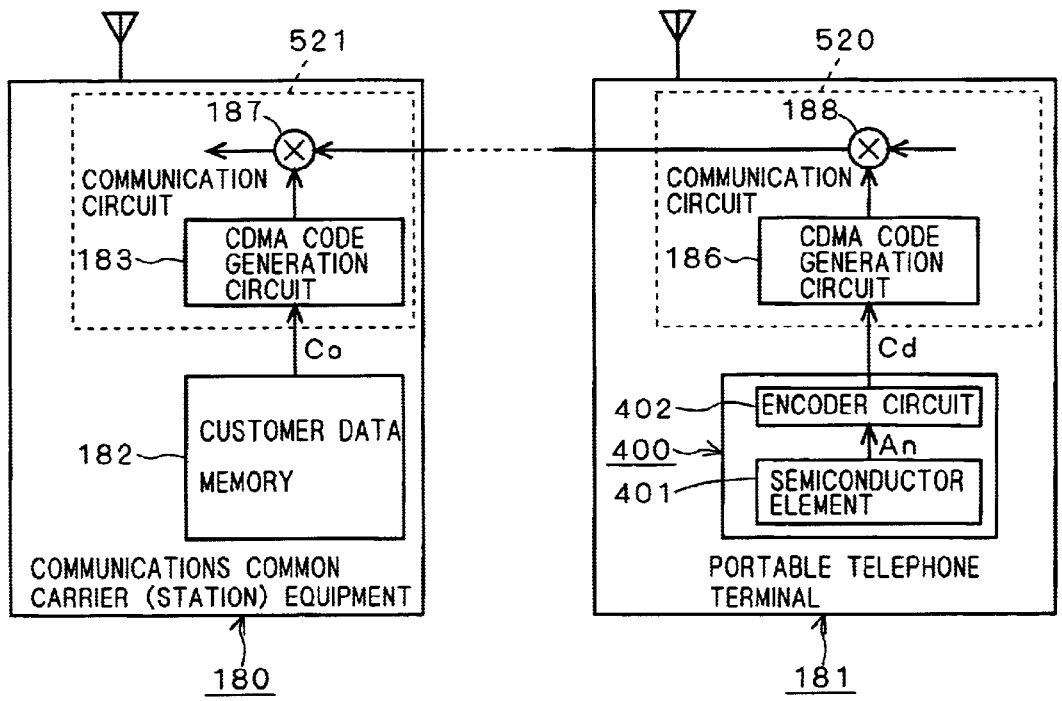
FIGS. 65 and 66 are process flow charts of the communication system according to the eighteenth embodiment of the present invention.

FIGS. 64 and 65 are block diagrams showing the semiconductor device 400 of FIG. 5 assembled into a portable telephone 181 serving as a user terminal. While FIGS. 64 and 65 individually show elements related to two functions of transmission from and receiving in the portable telephone 181, the portable telephone 181 must include the elements shown in both figures in order to enable bidirectional communication.

In the portable telephone 181, a communication circuit 520 includes a CDMA code generation circuit 186, a modulation circuit 188 and a demodulation circuit 185. An encoder circuit 402 provided on the semiconductor device 400 supplies a code Cd to the CDMA code generation circuit 186. The CDMA code generation circuit 186 generates a CDMA code on the basis of the code Cd. Most simply, the CDMA code generation circuit 186 generates the CDMA code by periodically repeating the code Cd of a plurality of bits as such. In general, the CDMA code is generated as a code string having a certain relation with the code Cd. The code Cd varies with the semiconductor device 400, i.e., the portable telephone 181, and a CDMA code varying with the portable telephone 181 can be generated. The modulation circuit 188 and the demodulation circuit 185 perform modulation and demodulation with the CDMA code generated by the CDMA code generation circuit 186 respectively.

In communications common carrier equipment 180 mediating communication through the portable telephone 181, a communication circuit 521 includes a CDMA code generation circuit 183, a modulation circuit 184 and a demodulation circuit 187. The communications common carrier equipment 180 further includes a customer data memory 182. The communications common carrier 180 is previously supplied with the code Cd of the semiconductor device 400 in a procedure similar to that shown in FIG. 44. The customer data memory 182 stores the supplied code Cd as a code Co.

The CDMA code generation circuit 183 generates a CDMA code on the basis of the code Co in a procedure similar to that of the CDMA code generation circuit 186. Therefore, the communications common carrier equipment 180 and the portable telephone 181 share the same CDMA code. The modulation circuit 184 and the demodulation circuit 187 perform modulation and demodulation with the CDMA code generated by the CDMA code generation circuit 183 respectively.

The code Cd obtained from the semiconductor device 400 is randomly dispersed every individual and has low correlation. Therefore, a communication system having a low crosstalk level is implemented similarly to the generally known communication system utilizing the CDMA system. Further, the CDMA code serves also as an identification code for the portable telephone 181, and hence an effect of preventing illegal use can also be attained. Needless to say, not only the TFTs 101 but also the resistive elements 43 shown in FIG. 16 or the capacitive elements 91 shown in FIG. 17 can be employed for the semiconductor element 401.

Figure 66:
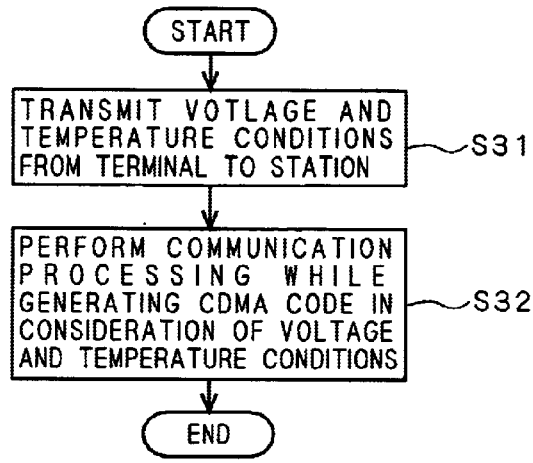

The communications common carrier equipment 180 and the portable telephone 181 can stably share a common CDMA code while eliminating influence by fluctuation of the characteristics of the semiconductor element 401 caused by the power supply voltage and the temperature. FIG. 66 is a flow chart showing operations of a communication system having such a structure. When communication is started in this system, a portable telephone first transmits temperature data and voltage data to communications common carrier equipment at a step S31. Then, the communications common carrier equipment generates a CDMA code in consideration of the temperature and the voltage at a step S32, to make communication.

Figure 67:
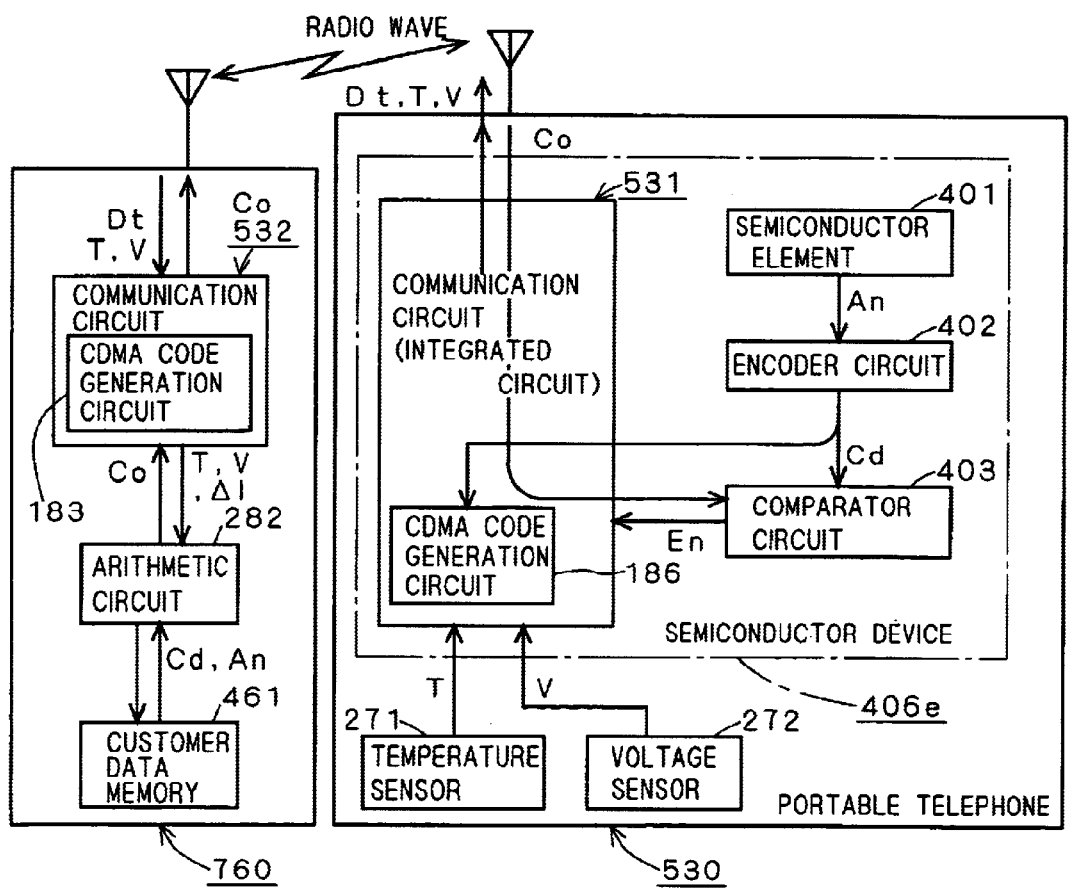
FIG. 67 is a block diagram of another communication system according to the eighth embodiment of the present invention.

FIG. 67 shows an exemplary structure of a portable telephone 530 implementing this communication system. The portable telephone 530 shown in FIG. 67 includes a semiconductor device 406e identical to the semiconductor device 406 shown in FIG. 7. The semiconductor device 406e comprises a communication circuit 531 as the prescribed circuit 405 (FIG. 7). The communication circuit 531 includes a CDMA code generation circuit 186, a modulation circuit 188 (FIG. 64; not shown in FIG. 67) and a demodulation circuit 185 (FIG. 64; not shown in FIG. 67). The CDMA code generation circuit 186 generates a CDMA code on the basis of a code Cd output from an encoder circuit 402. An enable signal En output from a comparator circuit 403 controls the communication circuit 531 in relation to authorization and inhibition of communication, similarly to the communication circuit 405 in the thirteenth embodiment.

The portable telephone 530 further includes a temperature sensor 271 and a voltage sensor 272. The temperature sensor 271 detects the temperature and transmits detected temperature data T to the communication circuit 531. The voltage sensor 272 detects the power supply voltage for the semiconductor device 406e, particularly the power supply voltage for a semiconductor element 401, and transmits detected voltage data V to the communication circuit 531.

Communications common carrier equipment 760 mediating communication through the portable telephone 530 includes an arithmetic circuit 282 and a customer data memory 461 similar to those in the thirteenth embodiment, in addition to a communication circuit 532. The communication circuit 532 includes a CDMA code generation circuit 183 generating a CDMA code on the basis of a code Co output from the arithmetic circuit 282. The customer data memory 461 stores a code Co to be compared with the code Cd or an analog signal An as the function of the temperature and the voltage, similarly to the thirteenth embodiment.

The portable telephone 530 and the communications common carrier equipment 460 make communication along a procedure identical to that shown in FIG. 50 in relation to the thirteenth embodiment. At the step S4, however, communication is made through modulation and demodulation employing the CDMA code. At this time, the communications common carrier equipment 760 employs the CDMA code generated on the basis of the code Co output from the arithmetic circuit 282, i.e., the code Co generated in consideration of the temperature data T and the voltage data V.

Therefore, communication based on the common CDMA code can be stably maintained while eliminating influence by fluctuation of the characteristics of the semiconductor element 401 caused by the power supply voltage and the temperature. Further, the codes Cd and Co are utilized for both authentication and generation of the CDMA code, whereby a user terminal having both functions can be efficiently manufactured at a low cost.

Nineteenth Embodiment

With reference to the nineteenth embodiment of the present invention, a preferred method of manufacturing a bottom gate TFT 101 identical to that shown in FIGS. 1 and 2 is described. FIGS. 68 to 71 are manufacturing step diagrams showing the manufacturing method. As shown in FIG. 68, a gate electrode 11 is first formed on an insulator film 12. The gate electrode 11 is formed in a thickness of 150 nm, for example. Following the step shown in FIG. 68, an insulator film 10 is formed to cover the insulator film 12 and the overall exposed surface of the gate electrode 11 as shown in FIG. 69. The insulator film 10 is formed in a thickness of 20 nm, for example.

Then, a semiconductor layer 1 is formed on the insulator film 10, as shown in FIG. 70. The semiconductor layer 1 is formed by executing CVD (chemical vapor deposition) with $Si_2H_6$ gas as reactive gas under a temperature of about 460° C. for depositing amorphous silicon in a thickness of about 200 nm and thereafter performing annealing for about 12 hours under a temperature of about 600° C., for example. Thus, the semiconductor layer 1 is formed as a polysilicon layer of at least 0.1 $\mu$m (e.g., about 1 $\mu$m) in crystal grain size. Thereafter arsenic (As), for example, is implanted into the overall surface of the semiconductor layer 1 with energy of 20 keV and density of $3 \times 10^{12}$ cm$^{-2}$. Thus, a channel region is formed. Then, the semiconductor layer 1 is patterned so as to be selectively left in an area corresponding to the regions 2, 3 and 4 of FIG. 1. Since the semiconductor layer 1 is formed as a polysilicon layer of at least 0.1 $\mu$m (e.g., about 1 $\mu$m) in crystal grain size, the channel length and the channel width can be readily set within the optimum ranges described with reference to the third embodiment.

Figure 71:
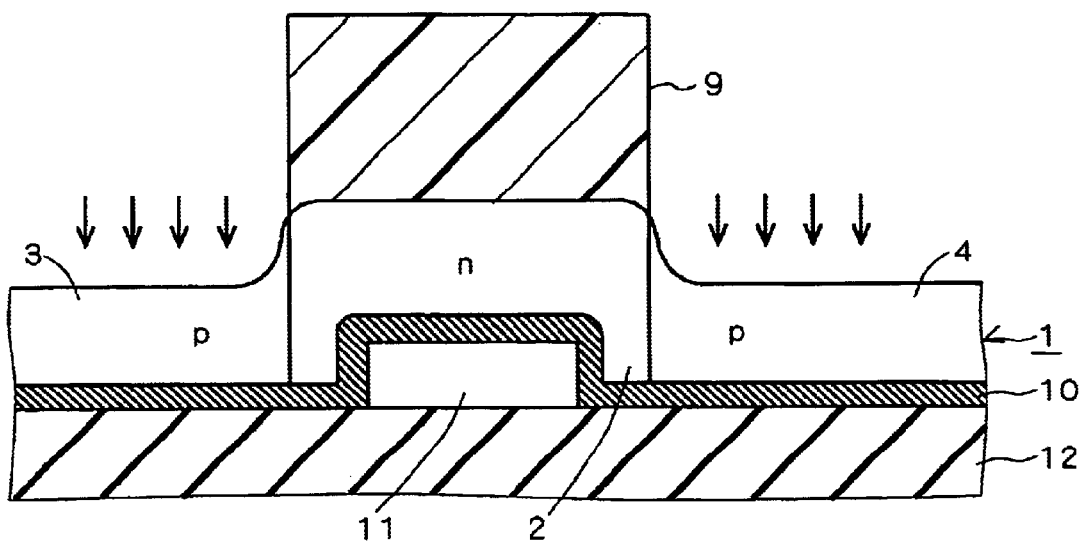

At a subsequent step shown in FIG. 71, a patterned resist film 9 is formed on a portion of the semiconductor layer 1 for forming a channel region 2. Then, $BF_2$ is selectively implanted into the semiconductor layer 1 through the resist film 9 serving as a screen with energy of 20 keV and density of $5 \times 10^{14}$ cm$^{-2}$. Thus, a source region 3 and a drain region 4 are formed. Thereafter the resist film 9 is removed thereby completing a TFT 101 identical to that shown in FIGS. 1 and 2.

Twentieth Embodiment

In place of the bottom gate TFT 101 illustrated in FIGS. 1 and 2, a top gate TFT can be employed for the semiconductor element 401 or the like. With reference to the twentieth embodiment of the present invention, the structure of a top gate TFT 104 and a method of manufacturing the same are described.

Figure 72:
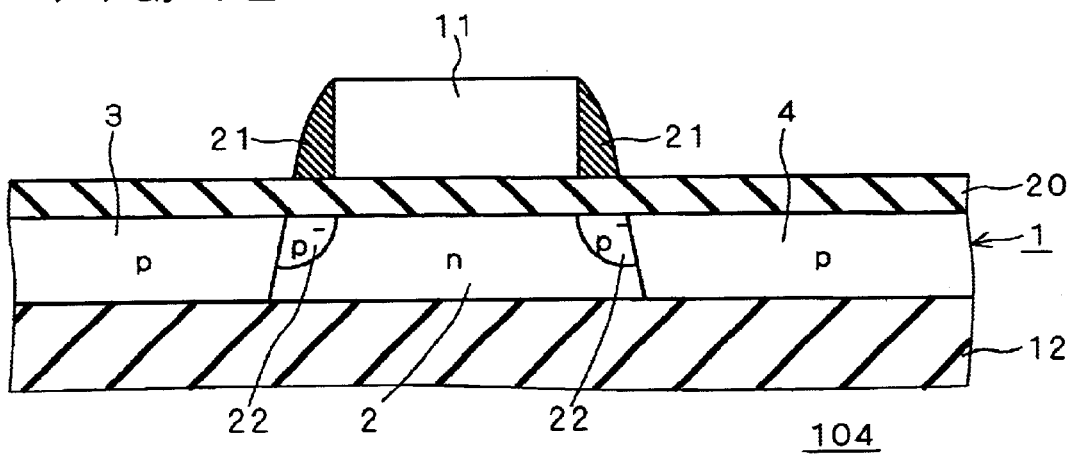
FIGS. 72 to 75 are step diagrams of a manufacturing method according to a twentieth embodiment of the present invention.

FIG. 72 is a longitudinal sectional view of the top gate TFT 104. In this TFT 104, a semiconductor layer 1 is formed on an insulator film 12, and an insulator film 20 is formed thereon. A gate electrode 11 is selectively formed on the insulator film 20, and side walls 21 are formed on both side surfaces of the gate electrode 11. As to exemplary materials for the respective elements, the insulator film 12 is made of a silicon oxide, the gate electrode 11 is made of polysilicon doped with an impurity, the insulator film 20 and the side walls 21 are made of silicon oxides, and the semiconductor layer 1 is mainly composed of silicon.

The semiconductor layer 1 has a channel region 2 located immediately under the gate electrode 11 as well as a source region 3 and a drain region 4 holding the channel region 2 therebetween. A portion of the insulator film 20 in contact with the channel region 2 serves as a gate insulator film. In junctions between the source and drain regions 3 and 4 and the channel region 2, LDD regions 22 containing an impurity in low concentration are formed as parts of the source and drain regions 3 and 4. In the example shown in FIG. 72, the channel region 2 is of an n type and the source and drain regions 3 and 4 are of p types. In other words, the TFT 104 is formed as a p-channel MOS-TFT, for example.

The semiconductor layer 1, formed as a polycrystalline semiconductor layer, contains crystal grains (not shown) and grain boundaries (hot shown). Even if a number of such TFTs 104 are manufactured through the same manufacturing steps, therefore, the crystal structure of the semiconductor layer 1 varies with each individual TFT 104 and the characteristics thereof are randomly dispersed, similarly to the TFT 101. The top gate TFT 104 can advantageously obtain a larger drain current as compared with the bottom gate TFT 101.

Figure 73:
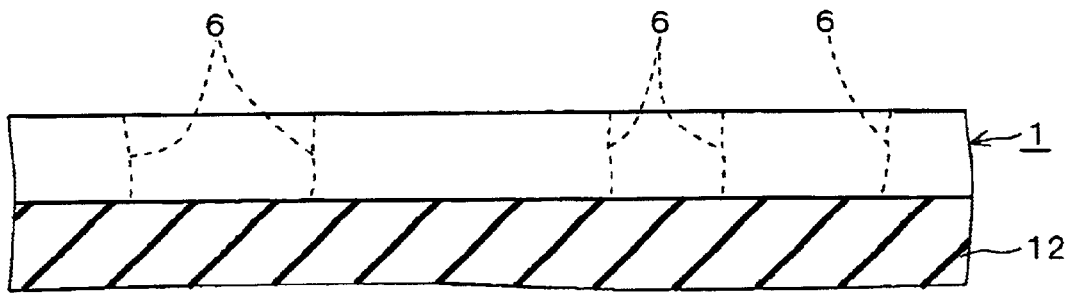
Figure 74:
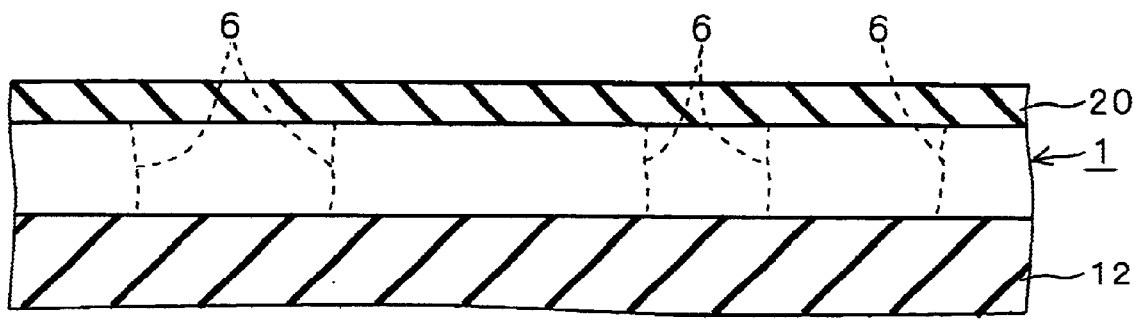
Figure 75:
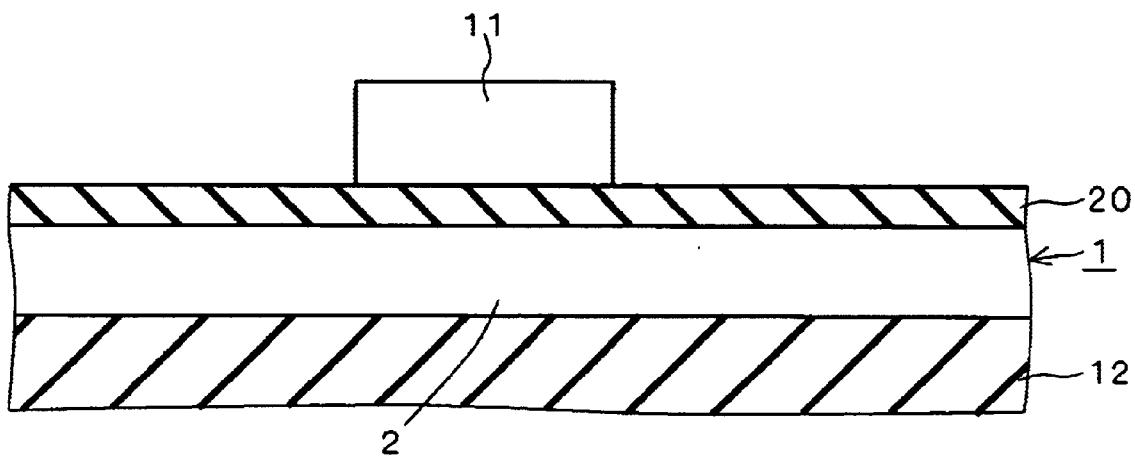

FIGS. 73 to 75 are manufacturing step diagrams showing a preferred method of manufacturing the TFT 104. First, the semiconductor layer 1 is formed on the insulator film 12, as shown in FIG. 73. The semiconductor layer 1 is formed by carrying out the same step as that of the nineteenth embodiment shown in FIG. 70. Then, the semiconductor layer 1 is patterned so as to be selectively left in an area corresponding to the regions 2, 3 and 4 of FIG. 1. Then, the insulator film 20 is formed on the semiconductor layer 1, as shown in FIG. 74.

In a subsequent step shown in FIG. 75, the gate electrode 11 is formed on the insulator film 20 similarly to the step shown in FIG. 68. Then, a p-type impurity is selectively implanted into the semiconductor layer 1 in low concentration through the gate electrode 11 serving as a screen, thereby forming the LDD regions 22. Then, the side walls 21 are formed as shown in FIG. 72 and thereafter a p-type impurity is selectively implanted into the semiconductor layer 1 in high concentration through the gate electrode 11 and the side walls 21 serving as screens, thereby forming the source and drain regions 3 and 4. The TFT 104 is completed through the aforementioned steps.

Twenty-First Embodiment

For each of the semiconductor devices shown in FIGS. 5 to 7, 39 and others, it is possible to employ such a configuration that the semiconductor element 401 includes TFTs, the encoder circuit 402 and others include bulk MOS transistors and these circuits are formed on a single semiconductor chip. With reference to the twenty-first embodiment of the present invention, a semiconductor device 105 having TFTs and bulk MOS transistors formed on the same semiconductor chip and a preferred method of manufacturing the same are described.

Figure 76:
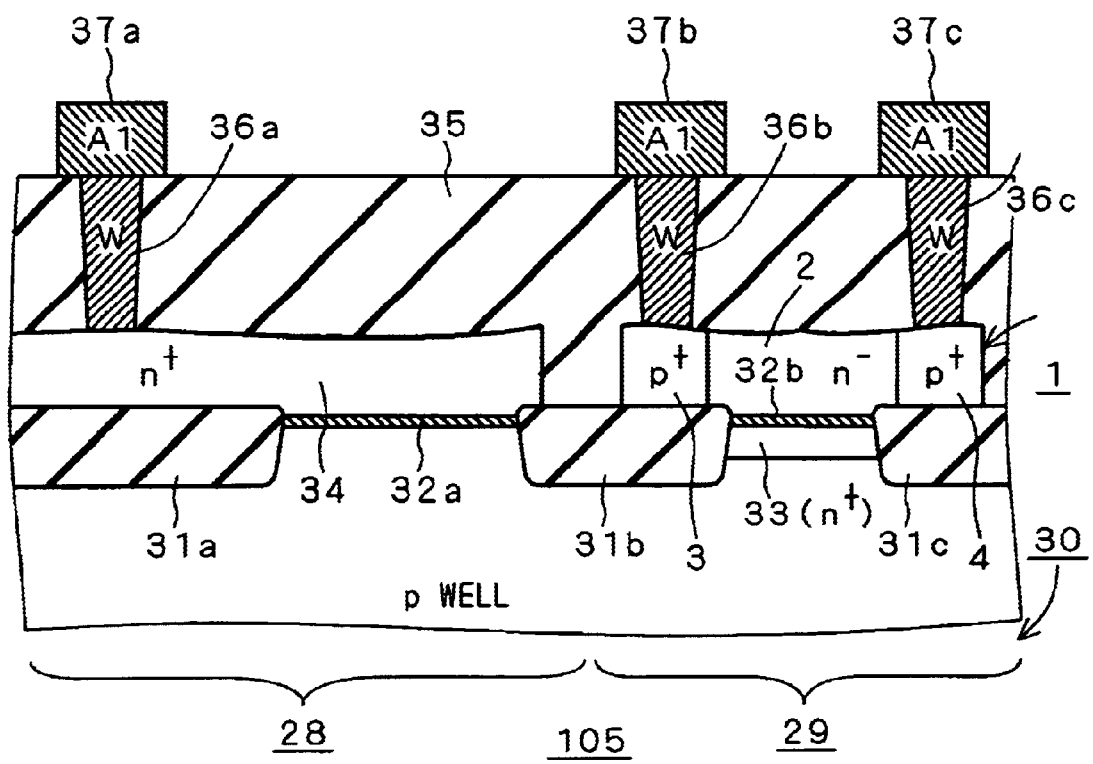
FIGS. 76 to 79 are step diagrams of a manufacturing method according to a twenty-first embodiment of the present invention.

In the semiconductor device 105 shown in FIG. 76, a single semiconductor substrate 30 includes a bulk MOS transistor region 28 and a TFT region 29. Trench isolation insulator layers 31*a*, 31*b* and 31*c* for element isolation are selectively formed on the main surface of the single-crystalline semiconductor substrate 30 formed with a p well. The semiconductor substrate 30 is a silicon substrate, for example, and the trench isolation insulator layers 31*a*, 31*b* and 31*c* are formed as silicon oxide layers, for example.

Parts of the main surface of the semiconductor substrate 30 not formed with the trench isolation insulator layers 31*a*, 31*b* and 31*c* are covered with insulator films 32*a* and 32*b*. The insulator films 32*a* and 32*b* are formed as silicon oxide films, for example. A gate electrode 34 is formed on a portion of the semiconductor substrate 30 corresponding to the MOS transistor region 28 to cover the trench isolation insulator layer 31*a* and the insulator film 32, while a semiconductor layer 1 is formed on a portion of the semiconductor substrate 30 corresponding to the TFT region 29 to cover the trench isolation insulator layers 31*b* and 31*c* and the insulator film 32*b*.

Both the gate electrode 34 and the semiconductor layer 1 are formed as polycrystalline semiconductor layers such as polysilicon layers, for example. The gate electrode 34 is doped with an n-type impurity, and the semiconductor layer 1 has a channel region 2 doped with an n-type impurity, a source region 3 doped with a p-type impurity and a drain region 4 doped with a p-type impurity. The channel region 2 is formed on the insulator film 32b, and a gate electrode 33 doped with an n-type impurity is formed on a portion of the main surface of the semiconductor substrate 30 opposed to the channel region 2.

An insulator layer 35 electrically isolates the gate electrode 34 and the semiconductor layer 1 from each other. Contact holes are selectively formed in the insulator layer 35, and tungsten plugs 36a, 36b and 36c charged in these contact holes are connected with the gate electrode 34, the source region 3 and the drain region 4 respectively. Patterned wires 37a, 37b and 37c are formed on the insulator layer 35, and connected with the tungsten plugs 36a, 36b and 36c respectively.

Figure 77:
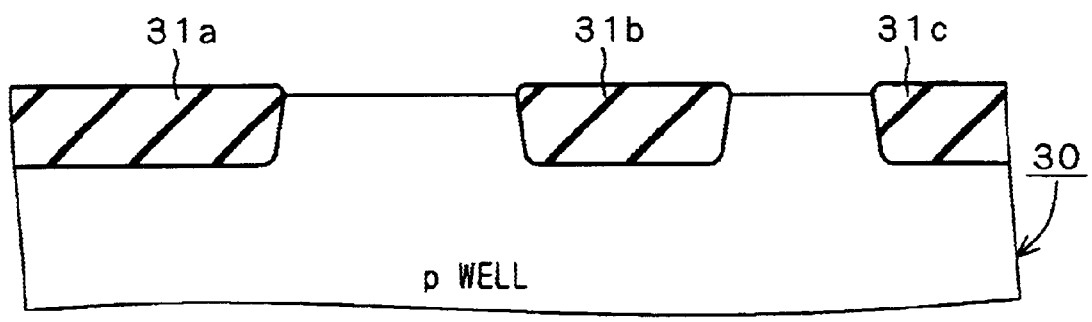
Figure 78:
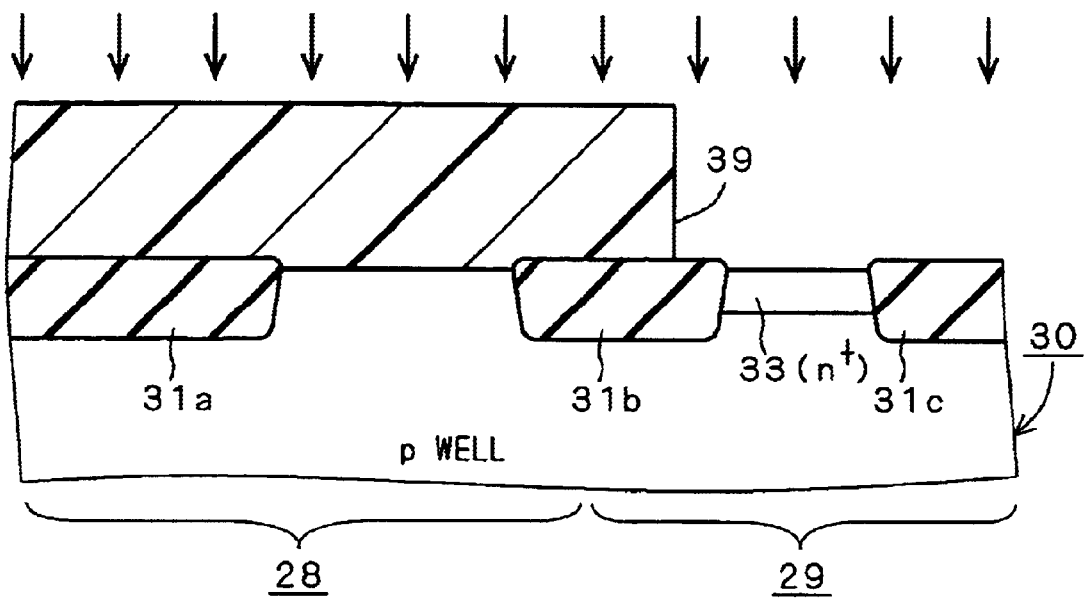
Figure 79:
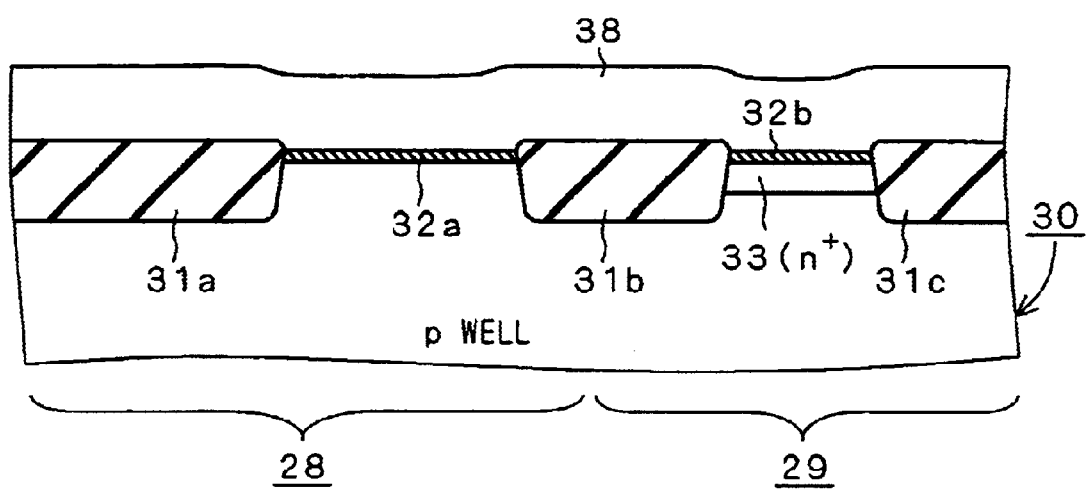

The gate electrode 34 and the semiconductor layer 1, both formed as polycrystalline semiconductor layers as described above, can be manufactured through the same steps. FIGS. 77 to 79 are manufacturing step diagrams showing such a preferred manufacturing method. In this manufacturing method, the trench isolation insulator layers 31a, 31b and 31c are first formed in a thickness of 300 nm, for example, on the semiconductor substrate 30 formed with the p well, as shown in FIG. 77.

In a subsequent step shown in FIG. 78, a patterned resist film 39 is formed to selectively cover an upper portion of the semiconductor substrate 30 corresponding to the MOS transistor region 28. Thereafter phosphorus or arsenic is selectively implanted into the main surface of the semiconductor substrate 30 with density of $5\times10^{15}$ cm$^{-2}$ through the resist film 39 serving as a screen, thereby selectively forming the gate electrode 33 on the portion of the main surface of the semiconductor substrate 30 corresponding to the TFT region 29.

In a subsequent step shown in FIG. 79, the resist layer 39 is removed and thereafter the insulator films 32a and 32b are formed on the exposed main surface of the semiconductor substrate 30. Thereafter polysilicon, for example, is deposited to cover the overall upper surface of the product in this stage, thereby forming a polycrystalline semiconductor layer 38. Then, the polycrystalline semiconductor layer 38 is patterned into the shapes of the gate electrode 34 and the semiconductor layer 1, as shown in FIG. 76. Impurities are selectively introduced through a known step, thereby forming the gate electrode 34, the channel region 2, the source region 3 and the drain region 4.

Thereafter channel, source and drain regions (not shown) of bulk MOS transistors (not shown) are selectively formed on the main surface of the semiconductor substrate 30 through a known step. Then, the insulator layer 35, the tungsten plugs 36a, 36b and 36c and the wires 37a, 37b and 37c are formed through known steps.

The gate electrode 34 and the semiconductor layer 1 are formed as part of the common semiconductor layer 38 as described above, whereby the number of the manufacturing steps and the manufacturing cost can be advantageously reduced.

Twenty-Second Embodiment

Figure 80:
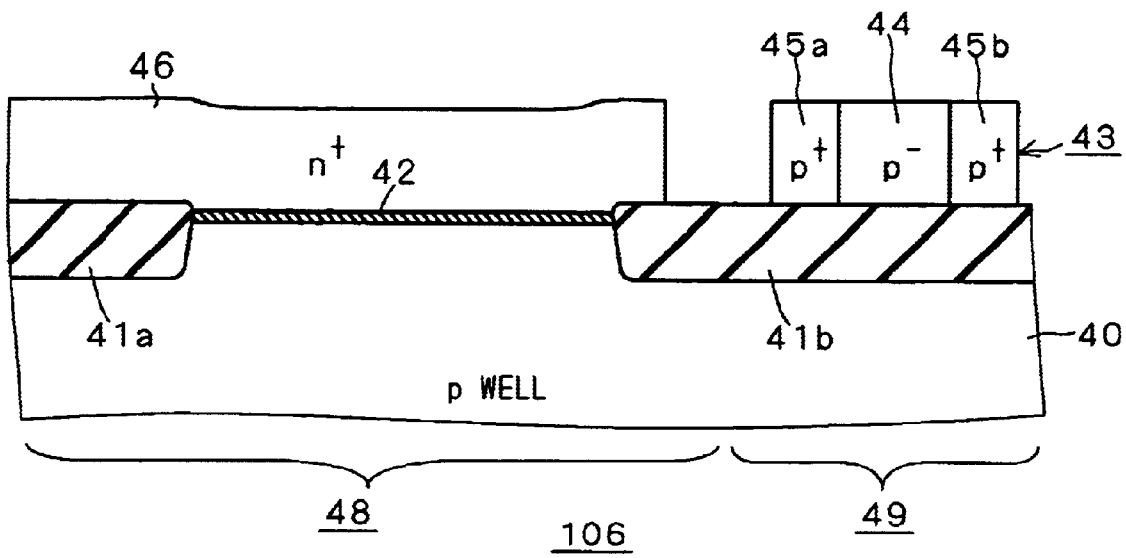
FIG. 80 is a step diagram of a manufacturing method according to a twenty-second embodiment of the present invention.

For each of the semiconductor devices shown in FIGS. 5 to 7 and others, it is possible to employ such a configuration that the semiconductor element 401 includes the polycrystalline resistive elements 43, the encoder circuit 402 and others include bulk MOS transistors and these circuits are formed on a single semiconductor chip. FIG. 80 is a longitudinal sectional view showing an exemplary semiconductor device 106 having such a configuration. In this semiconductor device 106, a single semiconductor substrate 40 includes a bulk MOS transistor region 48 and a resistive element region 49. Trench isolation insulator layers 41a and 41b ifor element isolation are selectively formed on the main surface of the single-crystalline semiconductor substrate 40 having a p well.

An insulator film 42 covers a portion of the main surface of the semiconductor substrate 40 not having the trench isolation insulator layers 41 and 41b. A gate electrode 46 is formed on a portion of the semiconductor substrate 40 corresponding to the MOS transistor region 48 to cover the trench isolation insulator layer 41a and the insulator film 42, while a semiconductor layer 43 is formed above a portion of the semiconductor substrate 40 corresponding to the resistive element region 49 on the trench isolation insulator layer 41b.

Both the gate electrode 46 and the semiconductor layer 43 are formed as polycrystalline semiconductor layers such as polysilicon layers, for example. The gate electrode 46 is doped with an n-type impurity, and the semiconductor layer 43 is formed with a resistive region 44 doped with a p-type impurity in low concentration and electrode regions 45a and 45b doped with a p-type impurity in high concentration.

The gate electrode 46 and the semiconductor layer 43, both formed as polycrystalline semiconductor layers as described above, can be formed through the same steps. The manufacturing method is equivalent to that described with reference to the twenty-first embodiment except the pattern shape of the trench isolation insulator layers 41a and 41b, the feature that no gate electrode 33 is formed and difference of the conductivity type of the resistive region 44, and hence redundant description is omitted.

Twenty-Third Embodiment

Figure 81:
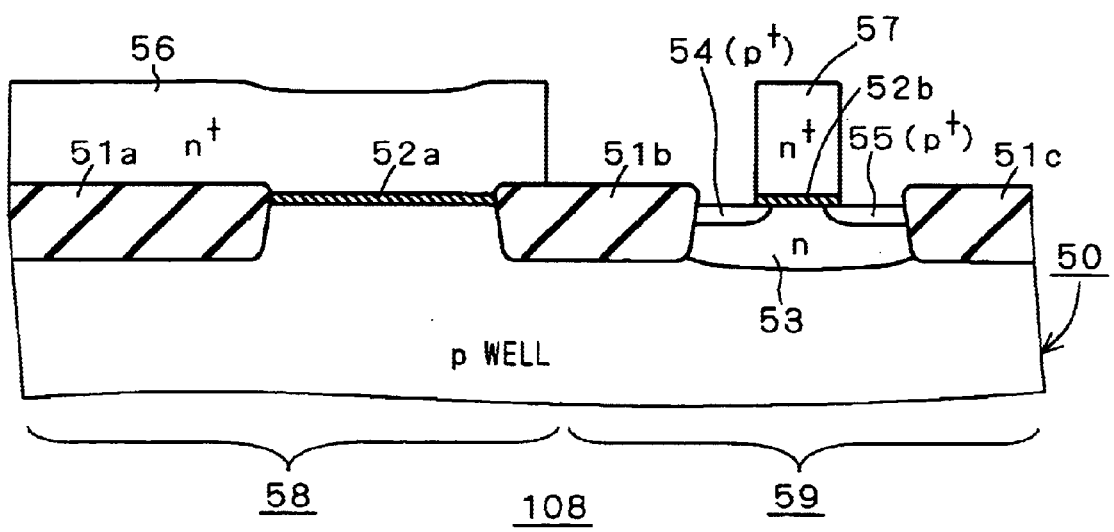
FIGS. 81 to 84 are step diagrams of a manufacturing method according to a twenty-third embodiment of the present invention.

For each of the semiconductor devices shown in FIGS. 5 to 7, 39 and others, it is possible to employ such a configuration that the semiconductor element 401 includes bulk polycrystalline MOS transistors formed on a semiconductor substrate instead of TFT, the encoder circuit 402 and others include bulk single-crystalline MOS transistors and these circuits are formed on a single semiconductor chip. FIG. 81 is a longitudinal sectional view showing an exemplary semiconductor device 108 having such a configuration. In this semiconductor device 108, a single semiconductor substrate 50 includes a single-crystalline MOS transistor region 58 and a polycrystalline MOS transistor region 59. Trench isolation insulator layers 51a, 51b and 51c for element isolation are selectively formed on the main surface of the semiconductor substrate 50 having a p well.

The semiconductor substrate 50 is a silicon substrate, for example. An n-type polycrystalline region 53 is selectively formed on a portion of the main surface of the polycrystalline MOS transistor region 59 held between the trench isolation insulator layers 51b and 51c. A source region 54 and a drain region 55 into which a p-type impurity is introduced are selectively formed on the main surface of the polycrystalline region 53 to hold a channel region therebetween. A gate electrode 57 is formed on the channel region through a gate insulator film 52b. The gate electrode 57 is formed as a polycrystalline semiconductor layer doped with an impurity such as a polysilicon layer doped with an n-type impurity, for example.

An insulator film 52a covers a portion of the single-crystalline MOS transistor region 58 not having the trench isolation insulator layers 51a and 51b. A gate electrode 56 is formed on a portion of the semiconductor substrate 50 corresponding to the single-crystalline MOS transistor region 58 to extend over the trench isolation insulator layers 51*a* and 51*b* and the insulator film 52*a*. The gate electrode 56 is formed as a polycrystalline semiconductor layer doped with an impurity such as a polysilicon layer doped with an n-type impurity, for example. Therefore, the gate electrodes 56 and 57 can be formed by patterning a common polycrystalline semiconductor layer.

Also in bulk polycrystalline MOS transistors formed in the semiconductor substrate 50, characteristics such as drain currents are dispersed due to dispersion of the quantity of grain boundaries in the channel region, similarly to the TFT 101 shown in FIGS. 1 and 2. Therefore, the bulk polycrystalline MOS transistors can also be employed as components of the semiconductor element 401, for example, similarly to the TFT 101.

Figure 82:
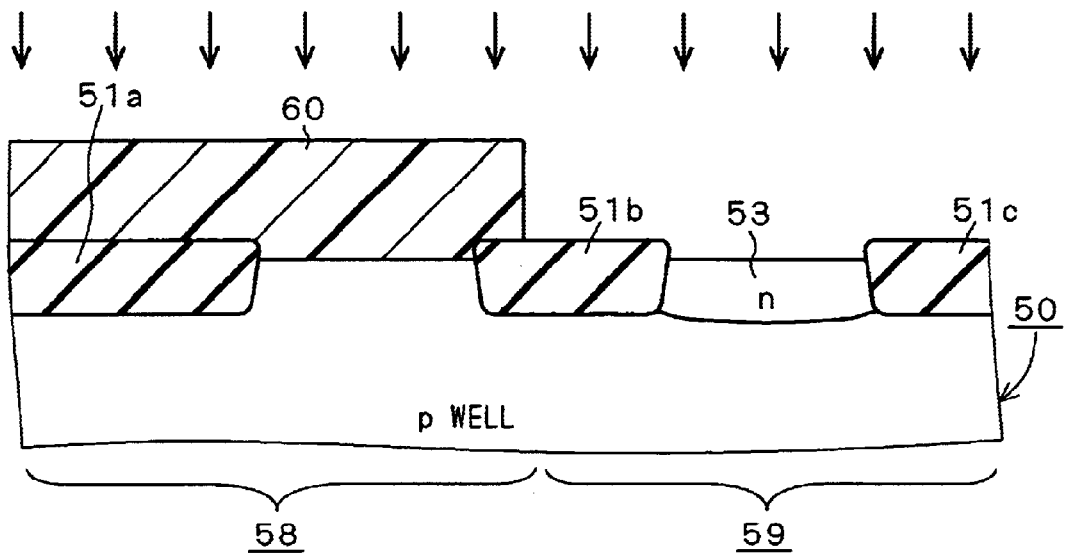

FIG. 82 is a manufacturing step diagram showing a step of forming the polycrystalline region 53 in a method of manufacturing the semiconductor device 108 shown in FIG. 81. In this step, a resist film 60 is first selectively formed to cover the upper portion of the single-crystalline MOS transistor region 58. Needless to say, the semiconductor substrate 50 is prepared as a single-crystalline semiconductor substrate. Then, the main component of the semiconductor substrate 50 such as silicon, for example, is selectively implanted into the main surface of the semiconductor substrate 50 through the resist film 60 serving as a screen.

If the semiconductor substrate 50 is a silicon substrate, silicon may be implanted with energy of 10 keV and density of $1\times10^{15}$ cm$^{-2}$, for example. Thus, the portion of the main surface of the semiconductor substrate 50 subjected to implantation of silicon is converted to an amorphous state. Thereafter annealing is performed (at a temperature of 1000° C. for 30 sec., for example), for recrystallizing the amorphous region thereby forming the polycrystalline region 53.

Both the polycrystalline and single-crystalline MOS transistors are formed on the single semiconductor substrate 50 as bulk transistors, whereby common steps can be carried out for both transistors for forming the source region 54, the drain region 55 and the gate electrode 57 and the like, and the number of the manufacturing steps and the manufacturing cost can be reduced. The manufacturing steps other than that shown in FIG. 81 can be executed in a well-known manner, and hence redundant description is omitted. Needless to say, source and drain regions (not shown) of the single-crystalline MOS transistors are also selectively formed on the main surface of the semiconductor substrate 50.

Figure 83:
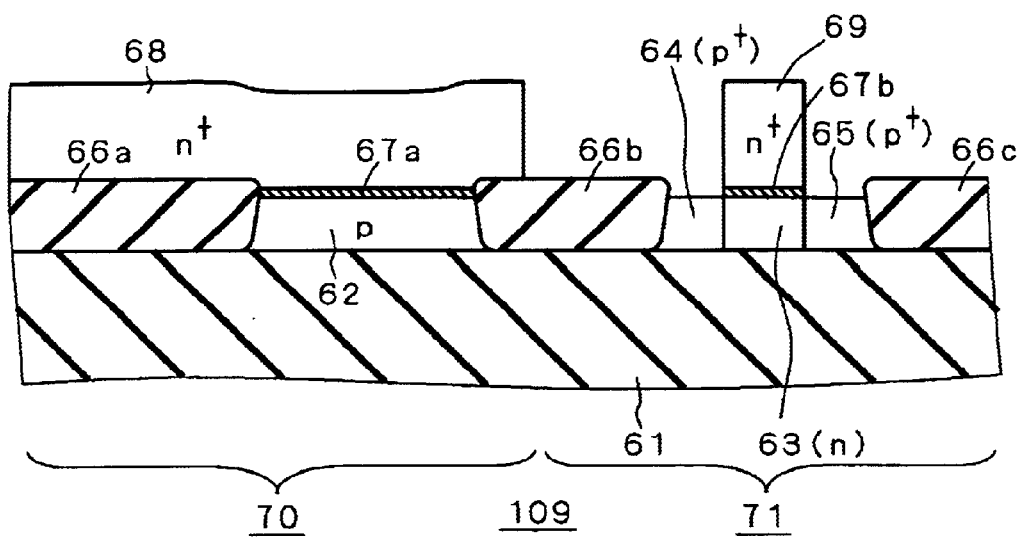

In the semiconductor device 108 shown in FIG. 81, a polycrystalline semiconductor region can be readily formed by employing an SOI (semiconductor on insulator) substrate (an SOI substrate is also referred to as a semiconductor substrate throughout the specification) as the semiconductor substrate 50. FIG. 83 shows a semiconductor device 109 having an SOI layer formed on an insulator layer 61. The SOI layer includes a single-crystalline MOS transistor region 70 and a polycrystalline MOS transistor region 71, which are isolated by trench isolation insulator layers 66*a*, 66*b* and 66*c* from each other.

The SOI layer is a silicon layer, for example. The polycrystalline MOS transistor region 71 held between the trench isolation insulator layers 66*b* and 66*c* defines a polycrystalline semiconductor region in which an n-type channel region 63 as well as p-type source and drain regions 64 and 65 holding the n-channel region 63 therebetween are selectively formed. A gate electrode 69 is formed on the channel region 63 through a gate insulator film 67*b*. The gate electrode 69 is formed as a polycrystalline semiconductor layer doped with an impurity such as a polysilicon layer doped with an n-type impurity, for example.

An insulator film 67*a* covers the main surface of the single-crystalline MOS transistor region 62. A gate electrode 68 is formed on the single-crystalline MOS transistor 62 to extend over the trench isolation insulator layers 66*a* and 66*b* and the insulator film 67*a*. The gate electrode 68 is formed as a polycrystalline semiconductor layer doped with an impurity such as a polysilicon layer doped with an n-type impurity, for example. Therefore, the gate electrodes 68 and 69 can be formed by patterning a common polycrystalline semiconductor layer.

Also in polycrystalline MOS transistors formed in the SOI layer, characteristics such as drain currents are dispersed due to dispersion of the quantity of grain boundaries in the channel region similarly to the bulk polycrystalline MOS transistors shown in FIG. 81. Therefore, the polycrystalline MOS transistors formed in the SOI layer can also be employed as the components of the semiconductor element 401, for example, similarly to the TFT 101. Since the single-crystalline MOS transistors are formed on the SOI layer, an effect of increasing the operating speed and reducing power consumption is attained.

Figure 84:
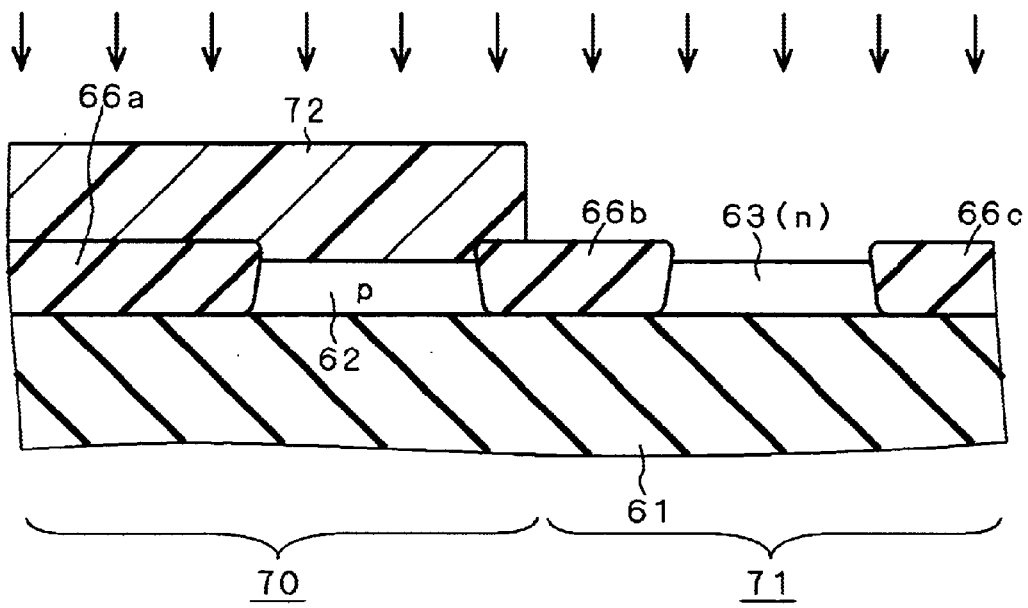

FIG. 84 is a manufacturing step diagram showing a step of forming the polycrystalline region 63 in a method of manufacturing the semiconductor device 109 shown in FIG. 83. In this step, a resist film 72 is first selectively formed to cover an upper portion of the single-crystalline MOS transistor region 70 of the SOI layer. Needless to say, the SOI layer is formed as a single-crystalline semiconductor layer. Then, the main component of the SOI layer such as silicon, for example, is selectively implanted into the SOI layer through the resist film 72 serving as a screen.

If the SOI layer is a silicon layer, silicon may be implanted with energy of 10 keV and density of $1\times10^{15}$ cm$^{-2}$, for example. Thus, the portion of the SOI layer subjected to implantation of silicon is converted to an amorphous state. Thereafter annealing is performed at a temperature of 600° C. for 12 hours, for example, for recrystallizing the amorphous region thereby forming the polycrystalline region 63.

Both the polycrystalline and single-crystalline MOS transistors are formed on the single SOI layer, whereby common steps can be carried out for both transistors for forming the source region 64, the drain region 65 and the gate electrode 69 and the like, and the number of the manufacturing steps and the manufacturing cost can be reduced. The manufacturing steps for the semiconductor device 109 other than that shown in FIG. 84 can be executed in a well-known manner, and hence redundant description is omitted.

Twenty-Fourth Embodiment

Figure 85:
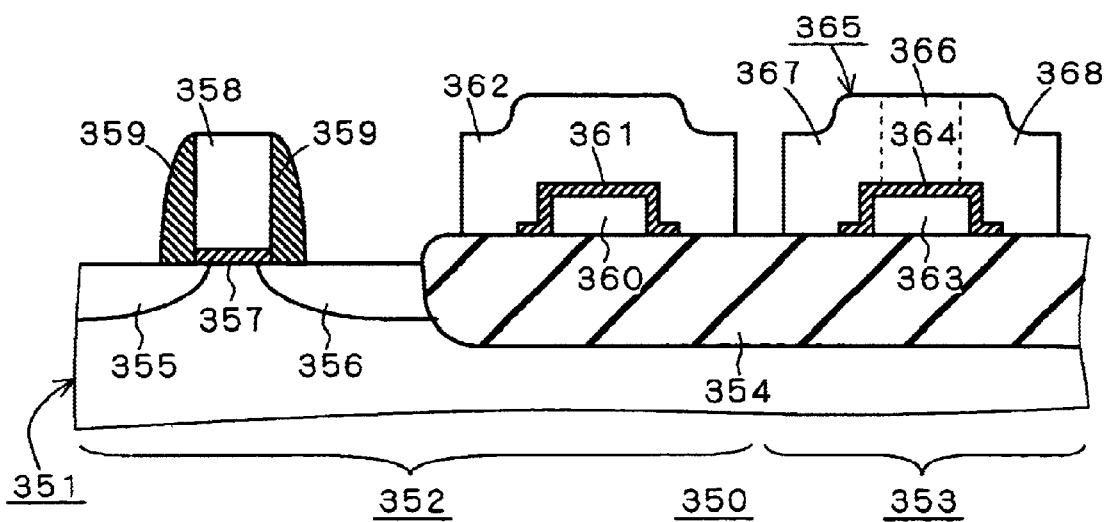
FIGS. 85 to 92 are step diagrams of a manufacturing method according to a twenty-fifth embodiment of the present invention.

With reference to the twenty-fourth embodiment of the present invention, another configuration of a semiconductor device having bulk (single-crystalline) MOS transistors and TFTs formed in a single semiconductor substrate is described. FIG. 85 shows a semiconductor device 350 having a single semiconductor substrate 351 including a MOS transistor region 352 and a TFT region 353. An isolation insulator layer 354 for element isolation and formation of capacitive elements and TFTs is selectively formed on the main surface of the semiconductor substrate 351. The semiconductor substrate 351 is a silicon substrate, for example.

Source and drain regions 355 and 356 and a channel region held therebetween are formed on a portion of the main surface of the MOS transistor region 352 having no trench isolation insulator layer 354. A gate electrode 358 is formed over the channel region through a gate insulator film 357, and side walls 259 are formed on side wall surfaces of the gate electrode 358.

A capacitive element having electrodes 360 and 362 and an insulator film 361 held therebetween and a TFT are formed on the trench isolation insulator layer 354 to align with each other. For example, the MOS transistor region 352 is a DRAM, and the capacitive element is that included in a memory cell. The TFT includes a gate electrode 363 made of the same material as the electrode 360, a gate insulator film 364, covering the gate electrode 363, made of the same material as the insulator film 361 and a polycrystalline semiconductor layer 365 covering the gate insulator film 364 over the trench isolation insulator layer 354. The polycrystalline semiconductor layer 365 includes a channel region 366 opposed to the gate electrode 363 and source and drain regions 367 and 368 holding the channel region 366 therebetween.

The polycrystalline semiconductor layer 365 is formed as a polysilicon layer, for example. The gate electrode 358 and the electrode 362 are formed by a polycrystalline semiconductor layer common with the polycrystalline semiconductor layer 365. Thus, the MOS transistor, the capacitive element and the TFT share the material for the components, whereby these elements can be formed through common steps and the number of manufacturing steps as well as the manufacturing cost can be reduced.

Figure 86:
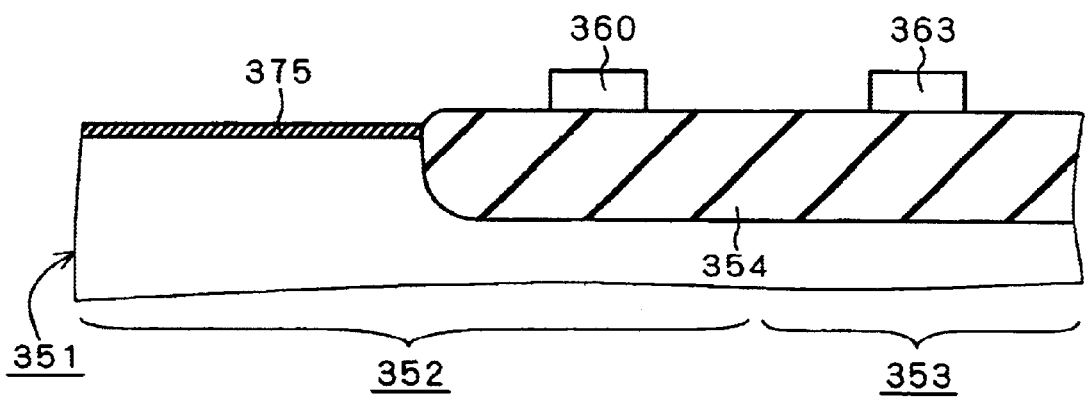

FIGS. 86 to 92 are manufacturing step diagrams showing such a preferred manufacturing method. In this manufacturing method, the step of FIG. 86 is first executed. In the step shown in FIG. 86, the isolation insulator layer 354 is first selectively formed on the main surface of the semiconductor substrate 351 to extend over part of the MOS transistor region 352 and the TFT region 353. An underlayer oxide film 375 is formed on a portion of the main surface of the semiconductor substrate 351 having no isolation insulator layer 354. Thereafter a polycrystalline semiconductor layer such as a polysilicon layer doped with an impurity, for example, is formed on the isolation insulator layer 354 and thereafter patterned thereby forming the electrode 360 and the gate electrode 363.

Figure 87:
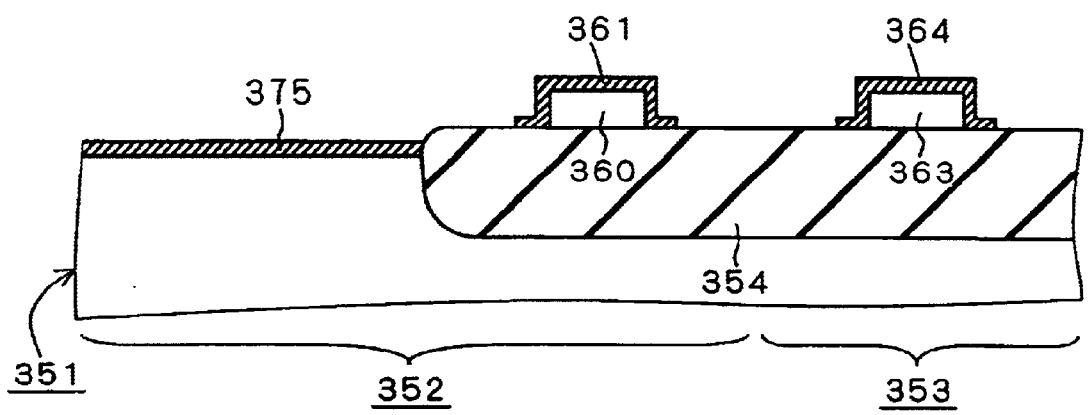
Figure 88:
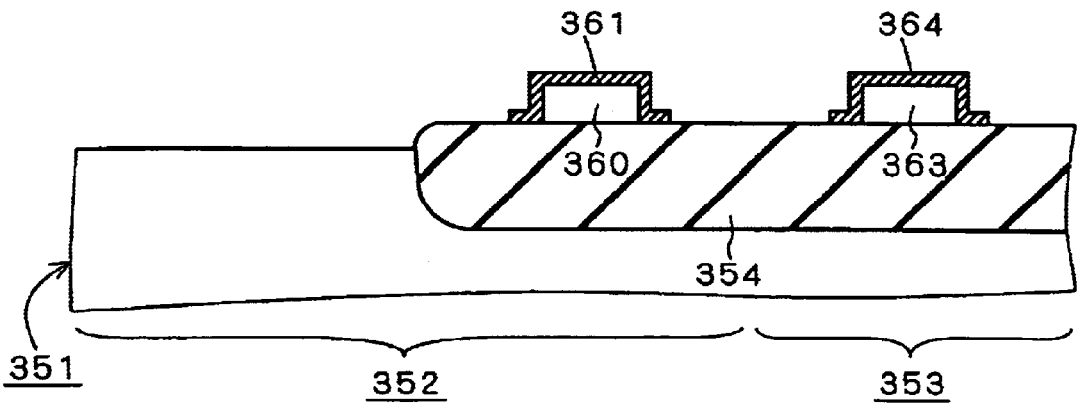

In the subsequent step shown in FIG. 87, the insulator films 361 and 364 are formed to cover the electrode 360 and the gate electrode 363. The insulator films 361 and 364 are formed as SiN films or two-layer films having $SiO_2$ and SiN layers, for example, in a thickness of 20 nm, for example. Then, the underlayer oxide film 375 is removed as shown in FIG. 88.

Figure 89:
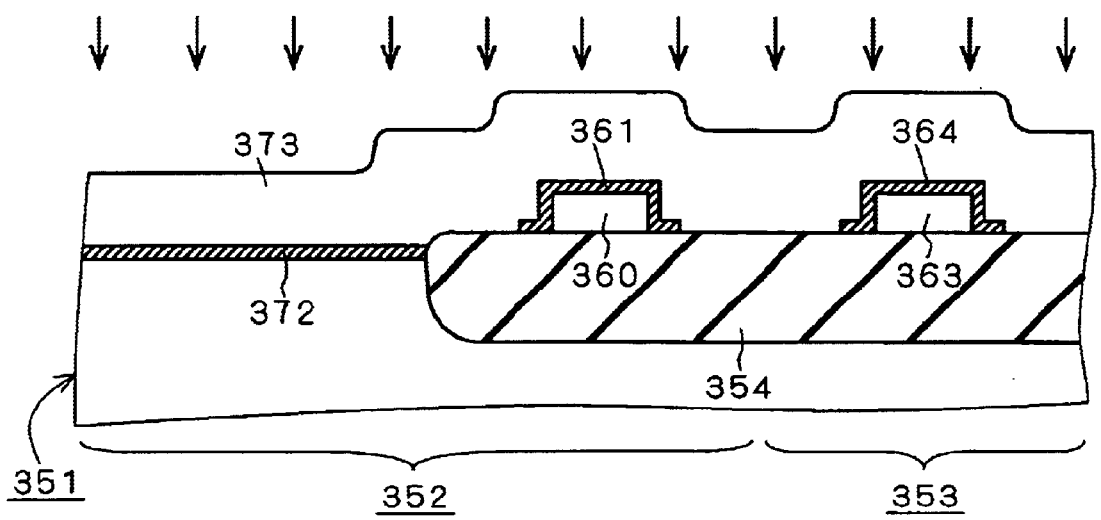

In the subsequent step shown in FIG. 89, an insulator film 372 is formed on the portion of the main surface of the semiconductor substrate 351 having no isolation insulator layer 354. The insulator film 372 is formed as an oxide film of 3.0 nm in thickness, for example. Thereafter polysilicon is deposited in a thickness of about 200 nm, for example, to cover the overall upper surface of the product in this stage, thereby forming the polycrystalline semiconductor layer 373. Thereafter an impurity is introduced into the polycrystalline semiconductor layer 373 to attain a gate threshold voltage of the TFT. If the TFT is of a p-channel type, arsenic may be implanted in density of $1\times10^{12}$ $cm^{-2}$, for example.

Figure 90:
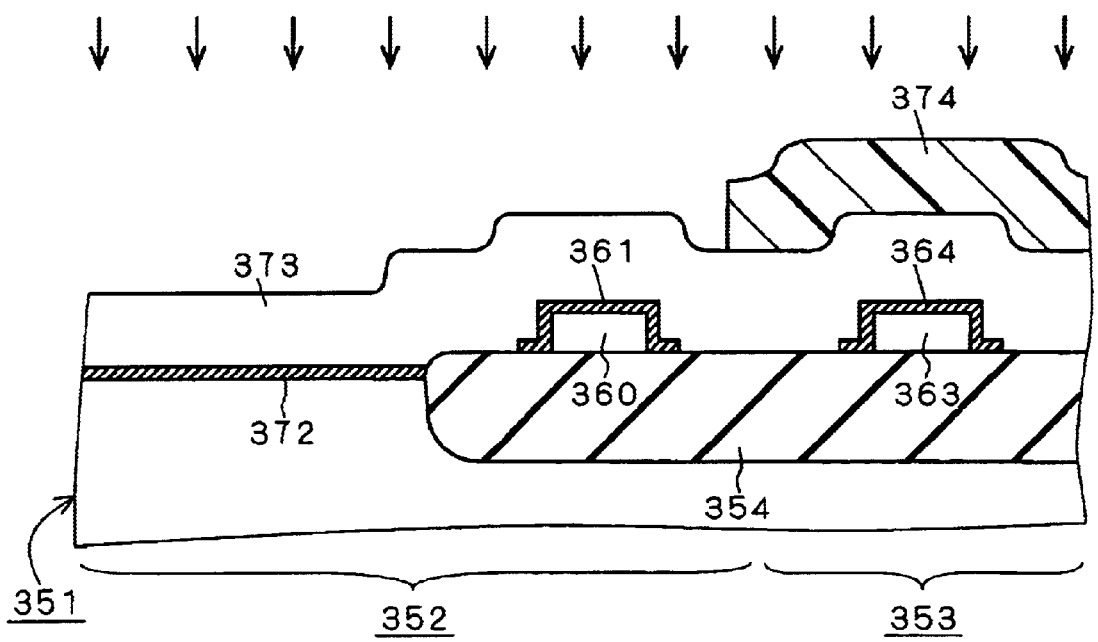

In the subsequent step shown in FIG. 90, a resist film 374 is selectively formed to cover a portion of the polycrystalline semiconductor layer 373 corresponding to the upper portion of the TFT region 353. Thereafter phosphorus, for example, is selectively implanted into the semiconductor layer 373 through the resist film 374 serving as a screen.

Figure 91:
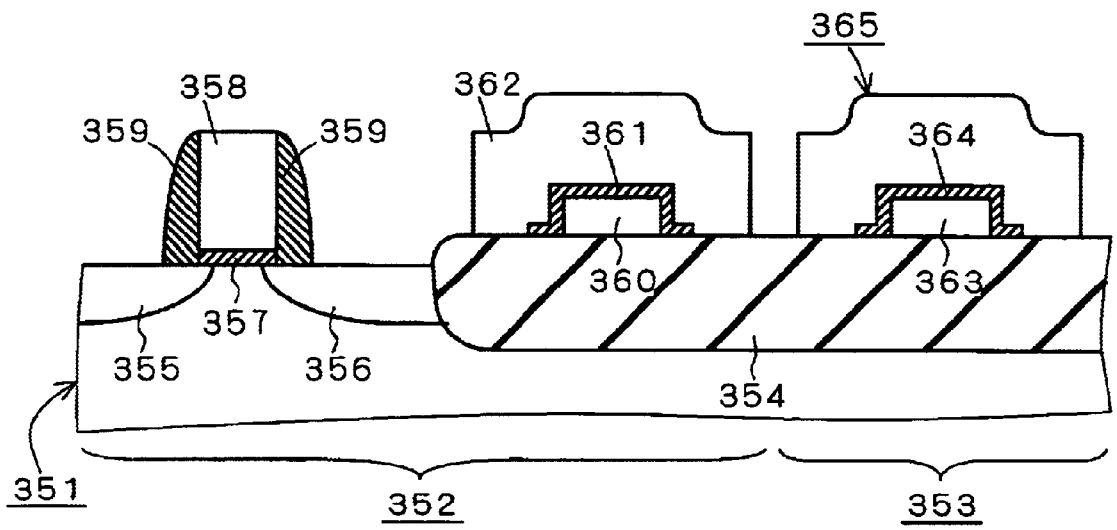

In the subsequent step shown in FIG. 91, the polycrystalline semiconductor layer 373 is first patterned thereby forming the gate electrode 358, the electrode 362 and the polycrystalline semiconductor layer 365. The semiconductor layer 365 is patterned so as to be selectively left in an area corresponding to the regions 2, 3 and 4 of FIG. 1. Then, an impurity is implanted into the main surface of the MOS transistor region 352 in low concentration through the gate electrode 358 serving as a screen, thereby selectively forming LDD regions. Thereafter side walls 359 are formed and then an impurity is implanted into the main surface of the MOS transistor region 352 in high concentration through the gate electrode 358 and the side walls 359 serving as masks, thereby selectively forming the source region 355 and the drain region 356.

Figure 92:
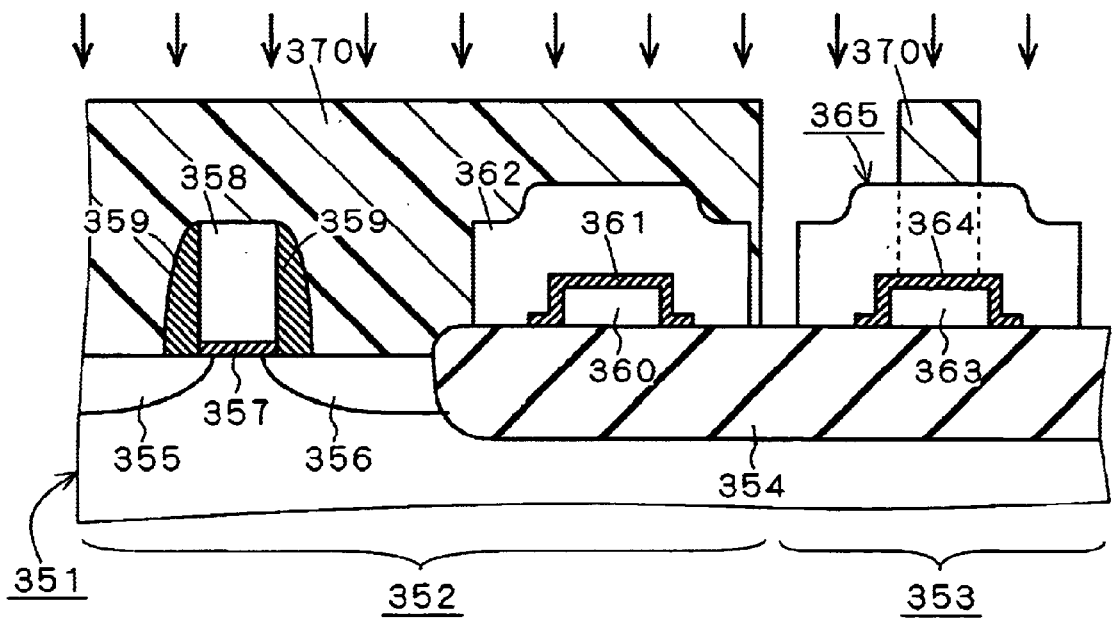

In the subsequent step shown in FIG. 92, resist films 370 are selectively formed to cover the upper surface portions of the product in this stage corresponding to the upper portion of the MOS transistor region 352 and the upper portion of the gate electrode 363 of the TFT region 353. Thereafter boron is implanted in concentration of $5\times10^{14}$ $cm^{-2}$, for example, through the resist films 370 serving as screens, thereby forming the source region 367 and the drain region 368 in the polycrystalline semiconductor layer 375. If the TFT is of an n-channel type, phosphorus or arsenic may be implanted in concentration of $5\times10^{14}$ $cm^{-2}$ in place of boron. Thereafter the resist films 370 are removed thereby completing the semiconductor device 350 shown in FIG. 85.

Modification

Japanese Patent Application No. 6-120224 (1994) (Japanese Patent Laying-Open Gazette No. 7-99207 (1996; hereinafter referred to as literature 7) and Japanese Patent Publication Gazette No. 61-1900 (1986) (hereinafter referred to as literature 8) disclose the details of conditions for forming polycrystalline semiconductor layers, gate electrodes and gate insulator films of TFTs in relation to methods of manufacturing TFTs. These conditions are applicable to the methods of manufacturing TFTs according to the nineteenth to twenty-fourth embodiments.

Incorporation by Reference

The entire contents of all of the eight documents referred to as literature 1 to 8 are incorporated herein by reference.

While the invention has been shown and described in detail, the foregoing description is in all aspects illustrative and not restrictive. It is therefore understood that numerous modifications and variations can be devised without departing from the scope of the invention.

What is claimed is:

1. A semiconductor device comprising:
    a semiconductor element having a polycrystalline structure; and
    an encoder circuit converting an electrical characteristic of said semiconductor element to a digital signal having a value that is a derivation from dispersion of the crystal structure of said polycrystalline thereby generating and outputting a code.

2. The semiconductor device according to claim 1, further comprising a comparator circuit regarding said code output from said encoder circuit as a first code, comparing an externally input second code with said first code, determining agreement or approximation between said codes and outputting a prescribed signal indicating the result of determination.

3. The semiconductor device according to claim 2, further comprising a prescribed circuit including a circuit part selectively entering an operating or non-operating state in response to said prescribed signal.

4. The semiconductor device according to claim 3, wherein said prescribed circuit is a communication circuit transmitting and receiving a signal to and from an external device, and receiving said second code and transmitting the same to said comparator circuit.

5. The semiconductor device according to claim 4, further comprising:
- a temperature sensor measuring the temperature of said semiconductor element, and
- a voltage sensor measuring a power supply voltage applied to said semiconductor element, wherein
- said communication circuit transmits temperature data obtained by said temperature sensor through measurement and voltage data obtained by said voltage sensor through measurement.

6. The semiconductor device according to claim 4, further comprising:
- an error operation circuit comparing said electric characteristic of said semiconductor element with characteristic data and calculating an error thereof, and
- an error memory storing said error, wherein
- said communication circuit receives said characteristic data and transmitting the same to said error operation circuit while reading and transmitting said error stored in said error memory.

7. The semiconductor device according to claim 2, wherein said semiconductor element includes a MOS transistor, at least a channel region of said MOS transistor is made of a polycrystalline semiconductor serving as said polycrystal, and
said comparator circuit includes:
- a sweep circuit sweeping a gate voltage of said MOS transistor,
- an approximation level calculation circuit calculating an approximation level between said first code output from said encoder circuit and said second code in the process of sweeping said gate voltage, and
- an evaluation circuit determining whether or not the approximation level calculated by said approximation level calculation circuit exceeds a reference value and outputting a signal indicating the result of determination as said prescribed signal.

8. The semiconductor device according to claim 7, wherein said reference value can be set from outside said semiconductor device.

9. The semiconductor device according to claim 2, wherein said comparator circuit includes:
- a measuring circuit measuring said electric characteristic of said semiconductor element and outputting the measured value as a digital signal,
- a data memory storing said digital signal,
- a code supervisory circuit determining whether or not said first code suffers fluctuation on the basis of said digital signal output from said measuring circuit and said digital signal stored in said data memory and updating said digital signal stored in said data memory with said digital signal obtained by new measurement,
- a code correction circuit outputting said first code while correcting the value of said first code when said code supervisory circuit detects said fluctuation or without correcting the value when no said fluctuation is detected, and
- a determination circuit comparing said code output from said code correction circuit with said second code, determining agreement or approximation between said codes and outputting a signal indicating the result of determination as said prescribed signal.

10. The semiconductor device according to claim 9, wherein said code supervisory circuit determines presence/absence of said fluctuation and updates said digital signal stored in said data memory with said digital signal obtained by new measurement only when every said digital signal obtained by said measuring circuit through a prescribed number of a plurality of times of measurement is different from said digital signal stored in said data memory.

11. The semiconductor device according to claim 1, wherein said semiconductor element and said encoder circuit are formed on a single semiconductor substrate.

12. The semiconductor device according to claim 11, wherein said encoder circuit includes:
- a conversion circuit converting an electric characteristic of said semiconductor element to a digital signal so that the value is dispersed in derivation from dispersion of the crystal structure of said polycrystal thereby generating a code, and
- a code memory formed on said single semiconductor substrate for storing said code generated by said conversion circuit in a nonvolatile manner and reading said code thereby outputting the same as said code output from said encoder circuit.

13. The semiconductor device according to claim 11, further comprising a comparator circuit formed on said single semiconductor substrate for regarding said code output from said encoder circuit as a first code, comparing an externally input second code with said first code, determining agreement or approximation between said codes and outputting a prescribed signal indicating the result of determination.

14. The semiconductor device according to claim 13, further comprising a prescribed circuit, formed on said single semiconductor substrate, including a circuit part selectively entering an operating or non-operating state in response to said prescribed signal.

15. The semiconductor device according to claim 11, wherein said semiconductor element includes a first polycrystalline thin-film transistor, and
said semiconductor device further comprises a static RAM, formed on said single semiconductor substrate, having a second polycrystalline thin-film transistor in a memory cell.

16. The semiconductor device according to claim 1, wherein said semiconductor element includes a MOS transistor, at least a channel region of said MOS transistor is made of a polycrystalline semiconductor serving as said polycrystal, and the channel width and the channel length of said MOS transistor are set in the range of 0.5 to 10 times the mean crystal grain size of said polycrystalline semiconductor.

17. The semiconductor device according to claim 1, further comprising:
- a CDMA generation circuit generating a CDMA code on the basis of said code output from said encoder circuit,
- a modulation circuit modulating a transmitted signal on the basis of said CDMA code, and
- a demodulation circuit demodulating a received signal on the basis of said CDMA code.

18. The semiconductor device according to claim 1, wherein said semiconductor element includes:
- M ($\geq 2$) by N ($\geq 1$) MOS transistors arranged in the form of a matrix of M rows and N columns, at least channel regions of said M by N MOS transistors being made of polycrystalline semiconductor;
- a power supply line connected to either source electrodes or drain electrodes of said M by N MOS transistors;

M bit lines respectively corresponding to said M rows, each one of said M bit lines being connected in common to the other ones of said source electrodes or said drain electrodes of said N MOS transistors belonging to corresponding one of said M rows; and N word lines respectively corresponding to said N columns, each one of said N word lines being connected in common to gate electrodes of said M transistors belonging to corresponding one of said N columns.

19. A semiconductor device comprising:

M ($\geq 2$) by N ($\geq 1$) resistive elements arranged in the form of a matrix of M rows and N columns, having resistors made of a polycrystalline semiconductor;

M bit lines respectively corresponding to said M rows, each one of said M bit lines being connected in common to first ends of said N resistive elements belonging to corresponding one of said M rows; and N word lines respectively corresponding to said N columns, each one of said N word lines being connected in common to second ends of said M by N resistive elements belonging to corresponding one of said M rows.

20. A semiconductor device comprising:

a semiconductor element having a polycrystalline structure; and an encoder circuit converting an electrical characteristic of said semiconductor element to a digital signal having a value that is a derivation from dispersion of the electrical characteristic of said semiconductor element thereby generating and outputting a code.

21. The semiconductor device according to claim 20, further comprising a comparator circuit regarding said code output from said encoder circuit as a first code, comparing an externally input second code with said first code, determining agreement or approximation between said codes and outputting a prescribed signal indicating the result of determination.

22. The semiconductor device according to claim 21, further comprising a prescribed circuit including a circuit part selectively entering an operating or non-operating state in response to said prescribed signal.

23. The semiconductor device according to claim 22, wherein said prescribed circuit is a communication circuit transmitting and receiving a signal to and from an external device, and receiving said second code and transmitting the same to said comparator circuit.

24. The semiconductor device according to claim 23, further comprising:

a temperature sensor measuring the temperature of said semiconductor element, and a voltage sensor measuring a power supply voltage applied to said semiconductor element, wherein said communication circuit transmits temperature data obtained by said temperature sensor through measurement and voltage data obtained by said voltage sensor through measurement.

25. The semiconductor device according to claim 23, further comprising:

an error operation circuit comparing said electrical characteristic of said semiconductor element with characteristic data and calculating an error thereof, and an error memory storing said error; wherein said communication circuit receives said characteristic data and transmitting the same to said error operation circuit while reading and transmitting said error stored in said error memory.

26. The semiconductor device according to claim 21, wherein said semiconductor element includes a MOS transistor, at least a channel region of said MOS transistor is made of a polycrystalline semiconductor serving as said polycrystal, and said comparator circuit includes:

a sweep circuit sweeping a gate voltage of said MOS transistor, an approximation level calculation circuit calculating an approximation level between said first code output from said encoder circuit and said second code in the process of sweeping said gate voltage, and an evaluation circuit determining whether or not the approximation level calculated by said approximation level calculation circuit exceeds a reference value and outputting a signal indicating the result of determination as said prescribed signal.

27. The semiconductor device according to claim 26, wherein said reference value can be set from outside said semiconductor device.

28. The semiconductor device according to claim 21, wherein said comparator circuit includes:

a measuring circuit measuring said electrical characteristic of said semiconductor element and outputting the measured value as a digital signal, a data memory storing said digital signal, a code supervisory circuit determining whether or not said first code suffers fluctuation on the basis of said digital signal output from said measuring circuit and said digital signal stored in said data memory and updating said digital signal stored in said data memory with said digital signal obtained by new measurement, a code correction circuit outputting said first code while correcting the value of said first code when said code supervisory circuit detects said fluctuation or without correcting the value when no said fluctuation is detected, and a determination circuit comparing said code output from said code correction circuit with said second code, determining agreement or approximation between said codes and outputting a signal indicating the result of determination as said prescribed signal.

29. The semiconductor device according to claim 28, wherein said code supervisory circuit determines presence/absence of said fluctuation and updates said digital signal stored in said data memory with said digital signal obtained by new measurement only when every said digital signal obtained by said measuring circuit through a prescribed number of a plurality of times of measurement is different from said digital signal stored in said data memory.

30. The semiconductor device according to claim 20, wherein said semiconductor element and said encoder circuit are formed on a single semiconductor substrate.

31. The semiconductor device according to claim 30, wherein said encoder circuit includes:

a conversion circuit converting an electrical characteristic of said semiconductor element to a digital signal so that the value is dispersed in derivation from dispersion of the crystal structure of said polycrystal thereby generating a code, and a code memory formed on said single semiconductor substrate for storing said code generated by said conversion circuit in a nonvolatile manner and reading said code thereby outputting the same as said code output from said encoder circuit.

32. The semiconductor according to claim 30, further comprising a comparator circuit formed on said single semiconductor substrate for regarding said code output from said encoder circuit as a first code, comparing an externally input second code with said first code, determining agreement or approximation between said codes and outputting a prescribed signal indicating the result of determination.

33. The semiconductor device according to claim 32, further comprising a prescribed circuit, formed on said single semiconductor substrate, including a circuit part selectively entering an operating or non-operating state in response to said prescribed signal.

34. The semiconductor device according to claim 30, wherein said semiconductor element includes a first polycrystalline thin-film transistor, and said semiconductor device further comprises a static RAM, formed on said single semiconductor substrate, having a second polycrystalline thin-film transistor in a memory cell.

35. The semiconductor device according to claim 20, wherein said semiconductor element includes a MOS transistor, at least a channel region of said MOS transistor is made of a polycrystalline semiconductor serving as said polycrystal, and the channel width and the channel length of said MOS transistor are set in the range of 0.5 to 10 times the mean crystal grain size of said polycrystalline semiconductor.

36. The semiconductor device according to claim 20, further comprising:

a CDMA generation circuit generating a CDMA code on the basis of said code output from said encoder circuit, a modulation circuit modulating a transmitted signal on the basis of said CDMA code, and a demodulation circuit demodulating a received signal on the basis of said CDMA code.

37. The semiconductor device according to claim 20, wherein said semiconductor element includes:

M ($\geqq 2$) by N ($\geqq 1$) MOS transistors arranged in the form of a matrix of M rows and N columns, at least channel regions of said M by N MOS transistors being made of polycrystalline semiconductor;

a power supply line connected to either source electrodes or drain electrodes of said M by N MOS transistors;

M bit lines respectively corresponding to said M rows, each one of said M bit lines being connected in common to the other ones of said source electrodes or said drain electrodes of said N MOS transistors belonging to corresponding one of said M rows; and N word lines respectively corresponding to said N columns, each one of said N word lines being connected in common to gate electrodes of said M transistors belonging to corresponding one of said N columns.

* * * * *